US010432425B2

(12) United States Patent
Wang et al.

(10) Patent No.: US 10,432,425 B2
(45) Date of Patent: Oct. 1, 2019

(54) INTERNET PROTOCOL BASED ENCAPSULATION FOR BIT INDEXED EXPLICIT REPLICATION (BIER)

(71) Applicant: Cisco Technology, Inc., San Jose, CA (US)

(72) Inventors: Xiaorong Wang, Shanghai (CN); Yicheng Liu, Shanghai (CN); Lianxiang Wang, Shanghai (CN); Fang Yang, Shanghai (CN); Gaofeng Tao, Shanghai (CN); Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 169 days.

(21) Appl. No.: 15/487,626

(22) Filed: Apr. 14, 2017

(65) Prior Publication Data

US 2018/0287935 A1    Oct. 4, 2018

Related U.S. Application Data

(63) Continuation of application No. 15/474,583, filed on Mar. 30, 2017.

(51) Int. Cl.
*H04L 12/753* (2013.01)
*H04L 12/781* (2013.01)
(Continued)

(52) U.S. Cl.
CPC .......... *H04L 12/44* (2013.01); *H04L 12/4625* (2013.01); *H04L 12/4633* (2013.01); *H04L 2212/00* (2013.01)

(58) Field of Classification Search
CPC ... H04L 29/06455; H04L 45/16; H04L 45/48; H04L 47/15; H04L 47/806
See application file for complete search history.

(56) References Cited

U.S. PATENT DOCUMENTS 5,088,091 A    2/1992   Schroeder ...................... 370/406
5,138,615 A    8/1992   Lamport ....................... 370/400
(Continued)

FOREIGN PATENT DOCUMENTS

CN    1754 353    3/2006
CN    1792 065    6/2006    ............. H04L 12/56
(Continued)

OTHER PUBLICATIONS

Wijnands, Ijsbrand et al., "Area Specific Broadcasting Using Bit Indexed Explicit Replication"; U.S. Appl. No. 15/347,443, filed Nov. 9, 2016; consisting of Specification, Claims, Abstract, and Drawings (65 pages).
(Continued)

*Primary Examiner* — Scott M Sciacca
(74) *Attorney, Agent, or Firm* — Campbell Stephenson LLP

(57) ABSTRACT

Methods and network devices are disclosed for internet protocol (IP) based encapsulation in bit indexed explicit replication (BIER) forwarding. In one embodiment, a method includes receiving a multicast message comprising an inner IP header, an intervening header, and an outer IP header. The embodiment further includes accessing a message bit array stored in the intervening header, retrieving an IP address from an entry in a bit indexed forwarding table, replacing an IP destination address in the outer IP header of a copy of the multicast message with the retrieved IP address, and sending the copy of the multicast message toward a second node in the network, where the retrieved IP address is assigned to the second node. An embodiment of a network device includes a processor operably coupled to a plurality of storage locations and to one or more network interfaces and adapted to perform steps of the method.

20 Claims, 26 Drawing Sheets

(51) Int. Cl.
*H04L 12/761* (2013.01)
*H04L 12/44* (2006.01)
*H04L 12/46* (2006.01)

(56) References Cited

U.S. PATENT DOCUMENTS

| | | | |
|---|---|---|---|
| 5,764,624 A | 6/1998 | Endo | 370/218 |
| 5,999,531 A | 12/1999 | Ferolito | 370/390 |
| 6,130,881 A | 10/2000 | Stiller | 370/238 |
| 6,147,976 A | 11/2000 | Shand | 370/254 |
| 6,148,000 A | 11/2000 | Feldman | 370/394 |
| 6,240,188 B1 | 5/2001 | Dondeti | 380/284 |
| 6,615,336 B1 | 9/2003 | Chen | 370/351 |
| 6,771,673 B1 | 8/2004 | Baum | 370/535 |
| 6,778,532 B1 | 8/2004 | Akahane | 370/389 |
| 6,873,627 B1 | 3/2005 | Miller | 370/432 |
| 7,111,101 B1 | 9/2006 | Bourke | 326/40 |
| 7,281,085 B1 | 10/2007 | Garg | 370/235 |
| 7,519,733 B1 | 4/2009 | Thubert | 709/232 |
| 7,551,599 B2 | 6/2009 | Levit | 370/254 |
| 7,925,778 B1 | 4/2011 | Wijnands | 370/389 |
| 8,320,374 B2 | 11/2012 | de Heer | 370/390 |
| 8,325,726 B2 | 12/2012 | Baban et al. | 370/390 |
| 8,670,146 B1 | 3/2014 | Van Couvering | 358/1.15 |
| 8,774,179 B1 | 7/2014 | Gaggara | 370/389 |
| 8,787,400 B1 | 7/2014 | Barth | 370/419 |
| 8,830,826 B2 | 9/2014 | Chen | 370/228 |
| 8,848,728 B1 | 9/2014 | Revah | 370/386 |
| 8,880,869 B1 | 11/2014 | Shah | 713/151 |
| 8,890,903 B2 | 11/2014 | Russell | 345/690 |
| 8,942,256 B1 | 1/2015 | Barth | 370/255 |
| 9,065,766 B2 | 6/2015 | Matsuoka | |
| 9,455,918 B1 | 9/2016 | Revah | |
| 2002/0126661 A1 | 9/2002 | Ngai | 370/380 |
| 2002/0191628 A1 | 12/2002 | Liu | 370/428 |
| 2003/0043802 A1 | 3/2003 | Yazaki | 370/389 |
| 2003/0048779 A1 | 3/2003 | Doherty | 370/389 |
| 2003/0088696 A1 | 5/2003 | McCanne | 709/238 |
| 2003/0142685 A1 | 7/2003 | Bare | 370/410 |
| 2003/0210695 A1 | 11/2003 | Henrion | 370/392 |
| 2004/0190527 A1 | 9/2004 | Okura | 370/395.21 |
| 2004/0240442 A1 | 12/2004 | Grimminger | 370/389 |
| 2004/0264374 A1 | 12/2004 | Yu | 370/230 |
| 2005/0016469 A1 | 1/2005 | Ganichev | 370/429 |
| 2005/0157724 A1 | 7/2005 | Montuno | 370/392 |
| 2005/0169270 A1 | 8/2005 | Mutou | 370/390 |
| 2005/0181807 A1 | 8/2005 | Dowling | |
| 2005/0232272 A1 | 10/2005 | Deng | 370/390 |
| 2006/0133298 A1 | 6/2006 | Ng | 370/254 |
| 2006/0182035 A1 | 8/2006 | Vasseur | 370/238 |
| 2006/0187817 A1 | 8/2006 | Charzinski | 370/216 |
| 2006/0280192 A1 | 12/2006 | Desanti | 370/409 |
| 2006/0291444 A1 | 12/2006 | Alvarez | 370/351 |
| 2007/0127474 A1 | 6/2007 | Mirtorabi et al. | 370/390 |
| 2007/0189291 A1 | 8/2007 | Tian | 370/390 |
| 2008/0069125 A1 | 3/2008 | Reed | 370/410 |
| 2008/0159285 A1 | 7/2008 | De Heer | 370/390 |
| 2008/0165783 A1 | 7/2008 | Desanti | 370/392 |
| 2008/0194240 A1 | 8/2008 | Dowling | 455/414.3 |
| 2008/0212465 A1 | 9/2008 | Yan | 370/225 |
| 2008/0240105 A1 | 10/2008 | Abdallah | 370/392 |
| 2008/0316916 A1 | 12/2008 | Tazzari | 370/216 |
| 2009/0067348 A1 | 3/2009 | Vasseur | 370/256 |
| 2009/0185549 A1 | 7/2009 | Shon | 370/379 |
| 2009/0196289 A1 | 8/2009 | Shankar | 370/390 |
| 2009/0213735 A1 | 8/2009 | Check | 370/236 |
| 2009/0219817 A1 | 9/2009 | Carley | 370/235.1 |
| 2009/0225650 A1 | 9/2009 | Vasseur | 370/218 |
| 2009/0310610 A1 | 12/2009 | Sandstrom | 370/394 |
| 2010/0046400 A1 | 2/2010 | Wu | 370/256 |
| 2010/0046515 A1 | 2/2010 | Wong | 370/390 |
| 2010/0124225 A1 | 5/2010 | Fedyk | |
| 2010/0191911 A1 | 7/2010 | Heddes | 711/118 |
| 2011/0149973 A1 | 6/2011 | Esteve Rothenberg | 370/392 |
| 2011/0202761 A1 | 8/2011 | Sarela et al. | 716/163 |
| 2011/0228770 A1 | 9/2011 | Dholakia | 370/390 |
| 2011/0238816 A1 | 9/2011 | Vohra | |
| 2011/0274112 A1 | 11/2011 | Czaszar | 370/392 |
| 2011/0299531 A1 | 12/2011 | Yu | 370/392 |
| 2012/0075988 A1 | 3/2012 | Lu | 370/218 |
| 2012/0099591 A1 | 4/2012 | Kotha | 370/392 |
| 2012/0106560 A1 | 5/2012 | Gumaste | 370/401 |
| 2012/0198064 A1 | 8/2012 | Boutros | |
| 2012/0236857 A1 | 9/2012 | Manzella | 370/390 |
| 2012/0243539 A1 | 9/2012 | Keesara | 370/392 |
| 2013/0034097 A1 | 2/2013 | Dharmapurikar | 370/390 |
| 2013/0051376 A1 | 2/2013 | Hatashita | 370/338 |
| 2013/0107725 A1 | 5/2013 | Jeng | |
| 2013/0114595 A1 | 5/2013 | MacK-Crane | 370/390 |
| 2013/0114619 A1 | 5/2013 | Wakumoto | 370/406 |
| 2013/0136117 A1 | 5/2013 | Schrum, Jr. | 370/338 |
| 2013/0136123 A1 | 5/2013 | Ge | 370/390 |
| 2013/0170450 A1 | 7/2013 | Anchan | 370/329 |
| 2013/0195001 A1 | 8/2013 | Liu | 370/312 |
| 2013/0201988 A1 | 8/2013 | Zhou | 370/390 |
| 2013/0308948 A1 | 11/2013 | Swinkels | 398/66 |
| 2013/0329728 A1 | 12/2013 | Ramesh | 370/390 |
| 2013/0336315 A1 | 12/2013 | Guichard | 370/389 |
| 2013/0343384 A1 | 12/2013 | Shepherd | 370/390 |
| 2014/0010223 A1 | 1/2014 | Wang | 370/338 |
| 2014/0043964 A1 | 2/2014 | Gabriel | 370/229 |
| 2014/0064081 A1 | 3/2014 | Morandin | |
| 2014/0098813 A1 | 4/2014 | Mishra | 370/390 |
| 2014/0119191 A1 | 5/2014 | Onoue | 370/236 |
| 2014/0126575 A1 | 5/2014 | Janneteau | 370/390 |
| 2014/0160925 A1 | 6/2014 | Xu | 370/235 |
| 2014/0189174 A1 | 7/2014 | Ajanovic | 710/106 |
| 2014/0362846 A1 | 12/2014 | Li | 370/338 |
| 2014/0369356 A1 | 12/2014 | Bryant | 370/392 |
| 2015/0003458 A1 | 1/2015 | Li | 370/392 |
| 2015/0009823 A1 | 1/2015 | Ganga | 370/235 |
| 2015/0023328 A1 | 1/2015 | Thubert et al. | 370/336 |
| 2015/0049760 A1 | 2/2015 | Xu | 370/390 |
| 2015/0078377 A1 | 3/2015 | Wijnands et al. | 370/390 |
| 2015/0078378 A1 | 3/2015 | Wijnands et al. | 370/390 |
| 2015/0078379 A1 | 3/2015 | Wijnands et al. | 370/390 |
| 2015/0078380 A1 | 3/2015 | Wijnands et al. | 370/390 |
| 2015/0081941 A1 | 3/2015 | Brown | 710/116 |
| 2015/0085635 A1 | 3/2015 | Wijnands et al. | 370/216 |
| 2015/0092546 A1 | 4/2015 | Baratam | 370/230 |
| 2015/0131658 A1 | 5/2015 | Wijnands et al. | 370/390 |
| 2015/0131659 A1 | 5/2015 | Wijnands et al. | 370/390 |
| 2015/0131660 A1 | 5/2015 | Shepherd et al. | 370/390 |
| 2015/0138961 A1 | 5/2015 | Wijnands et al. | 370/228 |
| 2015/0139228 A1 | 5/2015 | Wijnands et al. | 370/390 |
| 2015/0181309 A1 | 6/2015 | Wijnands et al. | 725/109 |
| 2015/0249587 A1 | 9/2015 | Kozat | 370/222 |
| 2015/0334006 A1 | 11/2015 | Shao | 370/225 |
| 2016/0119159 A1 | 4/2016 | Zhao | 370/390 |
| 2016/0127142 A1 | 5/2016 | Tian et al. | 370/390 |
| 2016/0142248 A1 | 5/2016 | Thubert et al. | 370/372 |
| 2016/0182353 A1 | 6/2016 | Garcia-Luna-Aceves | 709/241 |
| 2016/0191372 A1 | 6/2016 | Zhang | 370/390 |
| 2016/0205588 A1 | 7/2016 | Liu | 370/392 |
| 2016/0218961 A1 | 7/2016 | Lindem | 370/389 |
| 2016/0226725 A1 | 8/2016 | Iizuka | |
| 2016/0254987 A1 | 9/2016 | Eckert et al. | 370/390 |
| 2016/0254988 A1 | 9/2016 | Eckert et al. | 370/390 |
| 2016/0254991 A1 | 9/2016 | Eckert et al. | 370/225 |
| 2016/0344616 A1 | 11/2016 | Roch | |
| 2017/0012880 A1 | 1/2017 | Yang | |
| 2017/0099232 A1 | 4/2017 | Shepherd | 370/390 |
| 2017/0126416 A1 | 5/2017 | McCormick | |
| 2017/0142006 A1 | 5/2017 | Wijnands et al. | 370/390 |
| 2018/0102965 A1 | 4/2018 | Hari | |
| 2018/0205636 A1* | 7/2018 | Hu | H04L 45/16 |
| 2018/0278470 A1 | 9/2018 | Wijnands | 370/390 |
| 2018/0309664 A1 | 10/2018 | Balasubramanian | |

FOREIGN PATENT DOCUMENTS

| | | | |
|---|---|---|---|
| CN | 101242413 | 8/2008 | H04L 29/06 |
| CN | 101385275 | 3/2009 | H04L 12/18 |
| CN | 101572667 | 11/2009 | H04L 12/56 |

(56) References Cited

FOREIGN PATENT DOCUMENTS

| CN | 101689 172 | 3/2010 | ............ G06F 15/173 |
|---|---|---|---|
| CN | 102025538 | 4/2011 | ............ H04L 12/56 |
| CN | 102577 238 | 7/2012 | ............ H04L 12/18 |
| WO | WO 2007/095331 | 8/2007 | .................... 370/390 |
| WO | WO-2016177087 A1 * | 11/2016 | ............ H04L 45/16 |

OTHER PUBLICATIONS

Wang, Xiaorong et al., "Multicast Traffic Steering Using Tree Identity in Bit Indexed Explicit Replication (BIER)," U.S. Appl. No. 15/474,583, filed Mar. 30, 2017; consisting of Specification, Claims, Abstract, and Drawings (97 pages).
Wijnands, Ijsbrand et al., "Unicast Media Replication Fabric Using Bit Indexed Explicit Replication," U.S. Appl. No. 15/581,806, filed Apr. 28, 2017; consisting of Specification, Claims, Abstract, and Drawings (64 pages).
Wijnands, Ijsbrand et al., "Bridging of Non-Capable Subnetworks in Bit Indexed Explicit Replication," U.S. Appl. No. 15/582,090, filed Apr. 28, 2017; consisting of Specification, Claims, Abstract, and Drawings (68 pages).
Aggarwal, R., et al., "BGP Encodings and Procedures for Multicast in MPLS/BGP IP VPNs," Internet Engineering Task Force (IETF), Request for Comments 6514, Feb. 2012, pp. 1-59.
Aguilar, L., "Datagram Routing for Internet Multicasting," SRI International, Menlo Park, California, ACM SIGCOMM Computer Communication Review Newsletter, vol. 14, Issue 2, Jun. 1984, pp. 58-63.
Artel Video Systems, White Paper; "The Broadcaster's Guide to SMPTE 2022: Applications in Video Contribution and Distribution," Oct. 2014, pp. 1-7.
Bates, T. et al.; "Multiprotocol Extensions for BGP-4," Network Working Group, Request for Comments 4760, Jan. 2007, pp. 1-12.
Boivie, Rick, and N. Feldman, IBM Watson Research Center; "Small Group Multicast," draft-boivie-sgm-02.txt, Internet-Draft, Feb. 2001, pp. 1-17.
Boivie, Rick, et al., "Explicit Multicast (Xcast) Concepts and Options, draft-ooms-xcast-basic-spec-13.txt," Internet-Draft, Jul. 2007, pp. 1-34.
Cisco Systems, Inc., "Multi-Topology Routing," Feb. 2007, pp. 1-72.
Cisco Systems, Inc., White Paper, "Diffsery—The Scalable End-To-End Quality of Service Model," Aug. 2005, pp. 1-18.
Das, Kaushik, "IPv6 Header Deconstructed"; http://www.ipv6.com/articles/general/IPv6-Header.htm; Apr. 18, 2008; 2 pages.
Deering, S., Cisco Systems, Inc. and R. Hinden, Nokia; "Internet Protocol, Version 6 (IPv6)," Network Working Group, Request for Comments 2460, Dec. 1998, pp. 1-39.
Eckert, T., "Traffic Engineering for Bit Index Explicit Replication BIER-TE, draft-eckert-bier-te-arch-00," Network Working Group, Internet-Draft, Mar. 5, 2015, pp. 1-21.
Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.
Gharai, L. et al., "RTP Payload Format for Society of Motion Picture and Television Engineers (SMPTE) 292M Video," Network Working Group, Request for Comments 3497, Mar. 2003, pp. 1-12.
Hinden, R., Nokia and S. Deering, Cisco Systems, Inc.; "IP Version 6 Addressing Architecture," Network Working Group, Request for Comments 4291, Feb. 2006, pp. 1-25.
Kompella, K. et al., "The Use of Entropy Labels in MPLS Forwarding," Internet Engineering Task Force (IETF), Request for Comments 6790, Nov. 2012, pp. 1-25.
Kumar, N. et al., Cisco Systems, Inc., "OSPF Extension for Bit Index Explicit Replication, draft-kumar-ospf-bier-extension-00," Internet-Draft, May 19, 2014, pp. 1-7.
Kumar, N., et al., "BIER Use Cases, draft-kumar-bier-use-cases-00," Network Working Group, Internet-Draft, Oct. 25, 2014, pp. 1-7.

Laabs, Matthias, "SDI over IP—Seamless Signal Switching in SMPTE 2022-6 and a Novel Multicast Routing Concept," EBU Technical Review, 2012 Q4, pp. 1-7.
Li, Tony et al., "IGP Requirements for Traffic Engineering With MPLS, draft-li-mpls-igp-te-00.txt," Network Working Group, Internet-Draft, Feb. 1999, pp. 1-6.
Microsoft, "IPv6 Addressing (TechRef)"; Apr. 3, 2011; https://technet.microsoft.com/en-us/library/dd392266(v=ws.10).aspx; pp. 1-30.
Moy, J., Ascend Communications, Inc., "OSPF Version 2," Network Working Group, Request for Comments 2328, Apr. 1998, pp. 1-244.
Przygienda, T. et al., "M-ISIS: Topology (MT) Routing in Intermediate System to Intermediate Systems (IS-ISs)," Network Working Group, Request for Comments 5120, Feb. 2008, pp. 1-14.
Psenak, P. et al., "Multi-Topology (MT) Routing in OSPF," Network Working Group, Request for Comments 4915, Jun. 2007, pp. 1-20.
Psenak, P. et al., Cisco Systems; "OSPF Extensions for BIER, draft-psenak-ospf-bier-extensions-00," OSPF, Internet-Draft, Sep. 27, 2014, pp. 1-6.
Psenak, P. et al., Cisco Systems; "OSPF Extensions for BIER, draft-psenak-ospf-bier-extensions-01," OSPF, Internet-Draft, Oct. 24, 2014, pp. 1-8.
Psenak, P. et al., "OSPF Extensions for Segment Routing, draft-psenak-ospf-segment-routing-extension-05," Open Shortest Path First IGP, Internet-Draft, Jun. 2014, pp. 1-33.
Rekhter, Ed. Y. et al., "A Border Gateway Protocol 4 (BGP-4)," Network Working Group, Request for Comments 4271, Jan. 2006, pp. 1-104.
Rosen, Ed. E. et al., "Multicast VPN Using BIER, draft-rosen-l3vpn-mvpn-bier-01," Internet Engineering Task Force, Internet-Draft, Oct. 16, 2014, pp. 1-9.
Schulzrinne, H. et al.,; "RTP: A Transport Protocol for Real-Time Applications," Network Working Group, Request for Comments 3550, Jul. 2003, pp. 1-89.
Shen, Naiming et al., "Calculating IGP Routes Over Traffic Engineering Tunnels, draft-ietf-rtgwg-igp-shortcut-01.txt," Network Working Group, Internet-Draft, May 2004, pp. 1-7.
Shen, N et al., "Calculating Interior Gateway Protocol (IGP) Routes Over Traffic Engineering Tunnels," Network Working Group, Request for Comments 3906, Oct. 2004, pp. 1-8.
SMPTE, "Beyond the Digital Conversion, The Integration of Information Technology and Professional Media, The Convergence of 2 Industries—The Adoption of Information Technology by the Professional Media Industry; Report of the SMPTE Study Group on Media Production System Network Architecture," Mar. 31, 2014, © 2014 by the Society of Motion Picture and Television Engineers, Inc. (SMPTE), pp. 1-65.
SMPTE, "Transport of High Bit Rate Media Signals Over IP Networks (HBRMT)," ST 2022-6:2012, © 2015 by the Society of Motion Picture and Television Engineers, Inc. (SMPTE), p. 1.
SMPTE, "Definition of Vertical Interval Switching Point for Synchronous Video Switching," RP 168:2009, © 2015 by the Society of Motion Picture and Television Engineers, Inc. (SMPTE), p. 1.
Whitcomb, Leigh, "Real-Time Professional Broadcast Signals Over IP Networks," Harris Corporation, Technology Conference, Apr. 2011, pp. 1-60.
Wijnands, Ijsbrand, et al., Cisco Systems, Inc.; "Multipoint Label Distribution Protocol In-Band Signaling in a VPN Context, draft-wijnands-mpls-mldp-vpn-in-band-signaling-00," Internet-Draft, Oct. 7, 2011, pp. 1-13.
Wijnands, Ijsbrand, Cisco Systems, Inc., "Bit Index Explicit Replication using MPLS Encapsulation, draft-wijnands-mpls-bmf-encapsulation-00," Internet-Draft, Feb. 2014, pp. 1-9.
Wijnands, Ijsbrand, et al., "Multicast Using Bit Index Explicit Replication, draft-wijnands-bier-architecture-01," Internet Engineering Task Force, Internet-Draft, Oct. 16, 2014, pp. 1-24.
Wijnands, Ijsbrand, et al., "Multicast Using Bit Index Explicit Replication, draft-wijnands-bier-architecture-02," Internet Engineering Task Force, Internet-Draft, Dec. 4, 2014, pp. 1-27.
Wijnands, Ijsbrand, et al., "Multicast Using Bit Index Explicit Replication, draft-wijnands-bier-architecture-03," Internet Engineering Task Force, Internet-Draft, Jan. 27, 2015; pp. 1-29.

(56) References Cited

OTHER PUBLICATIONS

Xu, X. et al., "BIER Encapsulation, draft-xu-bier-encapsulation-00," Network Working Group, Internet-Draft, Sep. 30, 2014, pp. 1-6.

Xu, X. et al., "BIER Encapsulation, draft-xu-bier-encapsulation-01," Network Working Group, Internet-Draft, Oct. 20, 2014, pp. 1-6.

Yongliang Li, et al., Abstract Translation of CN-201010573400-A and CN 102025538, Database EPODOC [Online], European Patent Office, Apr. 20, 2011, pp. 1-2 [XP 002740355 on Extended EP SR].

Wijnanads, Ijsbrand et al., "Bit Indexed Explicit Replication Using Internet Protocol Version 6"; U.S. Appl. No. 15/919,552, filed Mar. 13, 2018 consisting of Specification, Claims, Abstract, and Drawings (49 pages).

\* cited by examiner

| Tree Definition Table 600 | | | | | | |
|---|---|---|---|---|---|---|
| Tree ID | Nodes along path | | | | | |
| 0 | A | B | D | F | J | |
| 0 | A | B | D | F | K | |
| 0 | A | B | D | G | L | |
| 0 | A | B | E | H | M | |
| 0 | A | B | E | I | N | |
| 0 | A | B | E | I | O | |
| 1 | A | B | C | D | F | J |
| 1 | A | B | C | D | F | K |
| 1 | A | B | C | D | G | L |
| 1 | A | B | C | E | H | M |
| 1 | A | B | C | E | I | N |
| 1 | A | B | C | E | I | O |
| 2 | A | B | D | F | J | |
| 2 | A | B | D | F | K | |
| 2 | A | B | D | F | K | L |
| 2 | A | B | E | H | M | |
| 2 | A | B | E | I | N | |
| 2 | A | B | E | I | O | |

*Fig. 6A*

| Bit Indexed Forwarding Table E 620 | | | | |
|---|---|---|---|---|
| Tree ID | Set ID | Bit Position | Neighbor Bit Array | Neighbor |
| 0 | 0 | 4 | 0000 1000 | H |
| 0 | 0 | 5 | 0011 0000 | I |
| 0 | 0 | 6 | 0011 0000 | I |
| 1 | 0 | 4 | 0000 1000 | H |
| 1 | 0 | 5 | 0011 0000 | I |
| 1 | 0 | 6 | 0011 0000 | I |
| 2 | 0 | 4 | 0000 1000 | H |
| 2 | 0 | 5 | 0011 0000 | I |
| 2 | 0 | 6 | 0011 0000 | I |

*Fig. 6B*

Tree Definition and Performance Table -- T1  700

| Tree ID | Nodes along path | | | | | | Performance (Path Delay) |
|---|---|---|---|---|---|---|---|
| 0 | A | B | D | F | J | | 15 ms |
| | A | B | D | F | K | | 16 ms |
| | A | B | D | G | L | | 15 ms |
| | A | B | E | H | M | | 18 ms |
| | A | B | E | I | N | | 16 ms |
| | A | B | E | I | O | | 15 ms |
| 1 | A | B | C | D | F | J | 18 ms |
| | A | B | C | D | F | K | 20 ms |
| | A | B | C | D | G | L | 18 ms |
| | A | B | C | E | H | M | 24 ms |
| | A | B | C | E | I | N | 20 ms |
| | A | B | C | E | I | O | 18 ms |

*Fig. 7A*

Tree Definition and Performance Table -- T2  720

| Tree ID | Nodes along path | | | | | | Performance (Path Delay) |
|---|---|---|---|---|---|---|---|
| 0 | A | B | D | F | J | | 16 ms |
| | A | B | D | F | K | | 15 ms |
| | A | B | D | G | L | | 40 ms |
| | A | B | E | H | M | | 17 ms |
| | A | B | E | I | N | | 18 ms |
| | A | B | E | I | O | | 15 ms |
| 1 | A | B | C | D | F | J | 19 ms |
| | A | B | C | D | F | K | 18 ms |
| | A | B | C | D | G | L | 45 ms |
| | A | B | C | E | H | M | 22 ms |
| | A | B | C | E | I | N | 24 ms |
| | A | B | C | E | I | O | 18 ms |

*Fig. 7B*

Tree Definition and Performance Table -- T3  740

| Tree ID | Nodes along path | | | | | | Performance (Path Delay) |
|---|---|---|---|---|---|---|---|
| 0 | A | B | D | F | J |  | 16 ms |
|  | A | B | D | F | K |  | 15 ms |
|  | A | B | D | G | L |  | 40 ms |
|  | A | B | E | H | M |  | 17 ms |
|  | A | B | E | I | N |  | 18 ms |
|  | A | B | E | I | O |  | 15 ms |
| 1 | A | B | C | D | F | J | 19 ms |
|  | A | B | C | D | F | K | 18 ms |
|  | A | B | C | D | G | L | 45 ms |
|  | A | B | C | E | H | M | 22 ms |
|  | A | B | C | E | I | N | 24 ms |
|  | A | B | C | E | I | O | 18 ms |
| 2 | A | B | D | F | J |  | 16 ms |
|  | A | B | D | F | K |  | 15 ms |
|  | A | B | D | F | K | L | 20 ms |
|  | A | B | E | H | M |  | 17 ms |
|  | A | B | E | I | N |  | 18 ms |
|  | A | B | E | I | O |  | 15 ms |

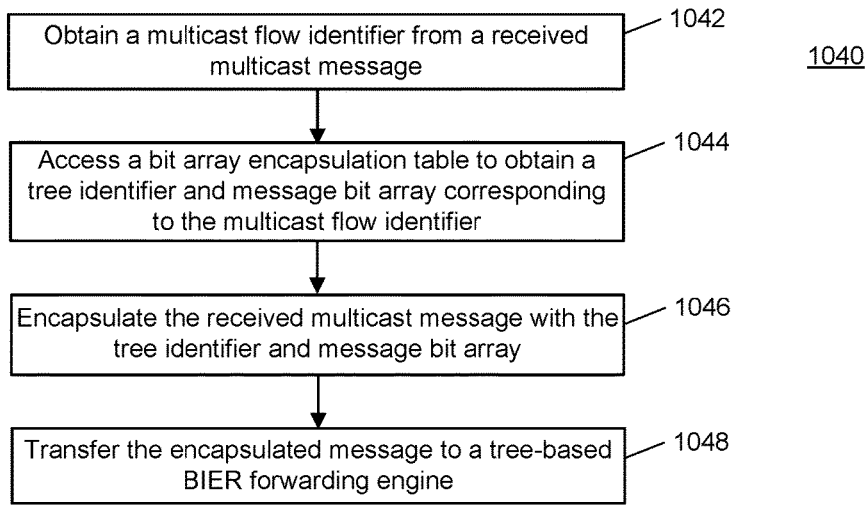
Fig. 10C
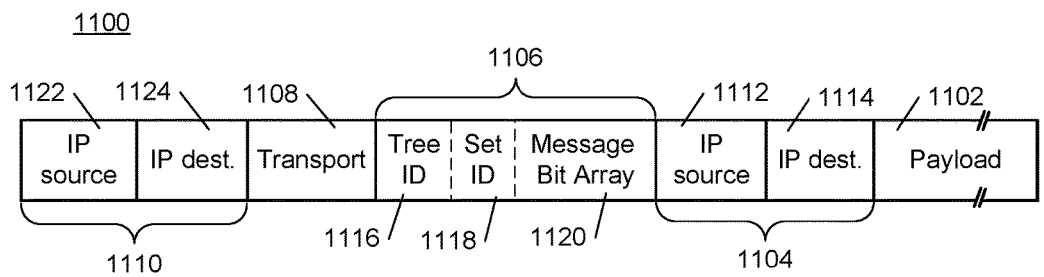
Fig. 11A
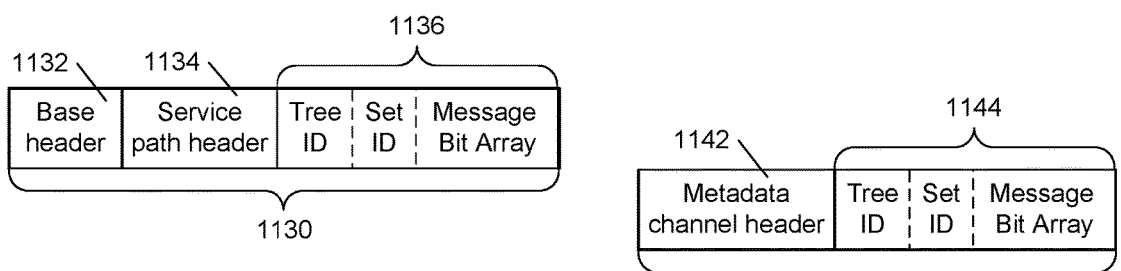
Fig. 11B
Fig. 11C

Bit Indexed Forwarding Table C  1300

| Tree ID | Bit position | Neighbor bit array | Neighbor |
|---|---|---|---|
| 1 | 1 | 0000 0111 | 9.9.14.4 |
|   | 2 | 0000 0111 | 9.9.14.4 |
|   | 3 | 0000 0111 | 9.9.14.4 |
|   | 4 | 0011 1000 | 9.9.15.5 |
|   | 5 | 0011 1000 | 9.9.15.5 |
|   | 6 | 0011 1000 | 9.9.15.5 |

*Fig. 13A*

Bit Indexed Forwarding Table G  1320

| Tree ID | Bit position | Neighbor bit array | Neighbor |
|---|---|---|---|
| 0 | 3 | 0000 0100 | 9.9.23.12 |
| 1 | 3 | 0000 0100 | 9.9.23.12 |
| 2 | 3 | 0000 0100 | 9.9.23.12 |

*Fig. 13B*

Bit Indexed Forwarding Table H  1340

| Tree ID | Bit position | Neighbor bit array | Neighbor |
|---|---|---|---|
| 0 | 4 | 0001 0000 | 9.9.24.13 |
| 1 | 4 | 0001 0000 | 9.9.24.13 |
| 2 | 4 | 0001 0000 | 9.9.24.13 |

*Fig. 13C*

Bit Indexed Forwarding Table D  1420

| Tree ID | Bit position | Neighbor bit array | Neighbor |
|---|---|---|---|
| 0 | 1 | 0000 0011 | 9.9.16.6 |
|   | 2 | 0000 0011 | 9.9.16.6 |
|   | 3 | 0000 0100 | 9.9.23.12 |
| 1 | 1 | 0000 0011 | 9.9.16.6 |
|   | 2 | 0000 0011 | 9.9.16.6 |
|   | 3 | 0000 0100 | 9.9.23.12 |
| 2 | 1 | 0000 0111 | 9.9.16.6 |
|   | 2 | 0000 0111 | 9.9.16.6 |
|   | 3 | 0000 0111 | 9.9.16.6 |

*Fig. 14B*

INTERNET PROTOCOL BASED ENCAPSULATION FOR BIT INDEXED EXPLICIT REPLICATION (BIER)

RELATED APPLICATION

This application is a continuation of U.S. application Ser. No. 15/474,583, entitled "Multicast Traffic Steering Using Tree Identity in Bit Indexed Explicit Replication (BIER)" and filed Mar. 30, 2017, which application is hereby incorporated by reference in its entirety and for all purposes as if completely and fully set forth herein.

TECHNICAL FIELD

This disclosure relates generally to network communications and more particularly to multicast transmission in networks.

BACKGROUND

Network nodes forward data. Network nodes may take the form of one or more routers, one or more bridges, one or more switches, one or more servers, or any other suitable communications processing device. The data is commonly formatted as messages and forwarded using forwarding tables. A message is a formatted unit of data that typically contains control information and payload data. Control information may include information that identifies sources and destinations, such as addresses, error detection codes like checksums, sequencing information, etc. Control information is typically found in message headers and trailers. Payload data is typically located between the message headers and trailers. Depending on factors such as the network level and network protocol used, a message may be formatted and/or referred to as one of various specific types such as packets, datagrams, segments, or frames.

Operation of routing mechanisms within a network can be described in terms of a "control plane" and a "data plane." The data plane, also referred to as the "forwarding plane," does the actual forwarding of messages coming into a node. Data plane decisions may involve accessing a forwarding table that relates the appropriate message identifier to the specific network interface, or egress interface, the message should be sent to in order to send it in the right direction. Generating such a forwarding table, based on a map, database, or other information reflecting the topology of the network, is a function of the control plane.

The control plane generates and updates its network topology information using one or more routing protocols. Within an autonomous system, an interior gateway protocol (IGP) can be used for exchanging network topology information between nodes. An autonomous system, or routing domain, as used herein refers to a collection of interconnected network nodes under a common administration for purposes of network configuration. Exchange of routing information between autonomous systems can be done using an exterior gateway protocol such as Border Gateway Protocol (BGP).

The processes involved in forwarding messages in networks may vary depending on the forwarding configuration used. Overall forwarding configurations include unicast, broadcast, and multicast forwarding. Unicast is a method of point-to-point communication most often used when a particular node (known as a source) has instructions to send data to another particular node (known as a receiver) and is not concerned with sending the data to multiple receivers. Broadcast is method used when a source has instructions to send data to all receivers in a domain, and multicast allows a source to send data to a group of receivers in a domain while preventing the data from being sent to other receivers in the domain.

Multicast is the preferred method of data forwarding for many popular applications, such as streaming media distribution. One reason for this is that multicast is a bandwidth-conserving technology that allows delivery of data to multiple receivers while avoiding transmission of multiple copies of the same message over the same network link. However, in traditional multicast systems, a relatively large amount of control plane information is used. Setting up and maintaining this control information has a tendency to become complex and costly in terms of computing resources, and can become a major limiting factor in overall network performance.

BRIEF DESCRIPTION OF THE DRAWINGS

The present disclosure may be better understood, and its numerous objects, features and advantages made apparent to those skilled in the art, by referencing the accompanying drawings.

FIG. 6A illustrates an example of tree definition table for the network of FIG. 2.

FIG. 6B illustrates an example of a bit indexed forwarding table for a node in the network of FIG. 2.

FIGS. 7A-7C illustrate examples of tree definition and performance tables for the network of FIG. 2 at different times.

FIG. 10C is a flowchart illustrating an example of a method for encapsulating a message for forwarding through a network as described herein.

FIG. 11A illustrates an example of an encapsulation header arrangement for a message traversing a network as described herein.

FIGS. 11B and 11C illustrate variations of a portion of the encapsulation header arrangement of FIG. 11A.

FIGS. 13A-13C illustrate examples of bit indexed forwarding tables for nodes in the network of FIG. 12A.

FIG. 14B illustrates an example of a bit indexed forwarding table for a node in the network of FIG. 14A.

FIG. 18B illustrates an example of a bit indexed forwarding table for a node in the network of FIG. 18A.

DETAILED DESCRIPTION

Overview

Figure 1A:
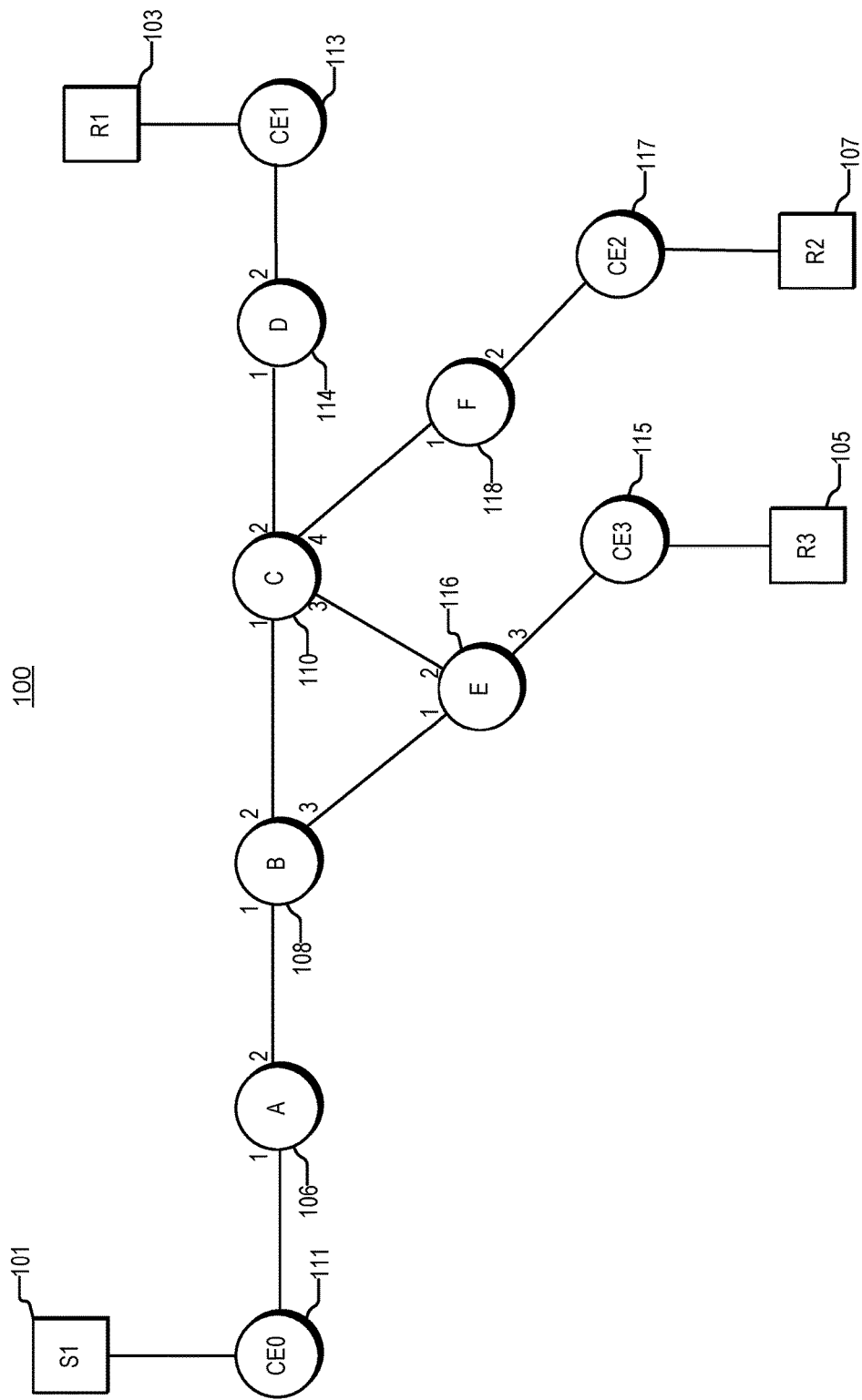
FIG. 1A is a simplified block diagram illustrating certain components of an example network.

Methods and network devices are disclosed for internet protocol (IP) based encapsulation in bit indexed explicit replication (BIER) forwarding. In one embodiment, a method includes receiving a multicast message comprising an inner IP header, an intervening header, and an outer IP header. The embodiment further includes accessing a message bit array stored in the intervening header, retrieving an IP address from an entry in a bit indexed forwarding table, replacing an IP destination address in the outer IP header of a copy of the multicast message with the retrieved IP address, and sending the copy of the multicast message toward a second node in the network, where the retrieved IP address is assigned to the second node.

Multicast

Multicast transmission delivers multicast packets (packets that traditionally include information identifying a multicast group, such as a multicast group address) from a source to multiple receivers without unduly burdening the source. Although some of the discussion in this disclosure is in terms of packets, it should be understood that the disclosures made herein may also be applicable to other types of network messages, such as datagrams or data frames. Generally speaking, a multicast receiver is a host (such as a computing device or application) that has subscribed to a multicast group. Instead of the source replicating a multicast packet and sending a copy of the multicast packet to each receiver, the source sends a single copy of a multicast packet and multicast-enabled routers (or, more generally, nodes) replicate the packet at the point(s) where paths to various receivers diverge. Multicast routing protocols enable multicast transmission (i.e., one-to-many connections and many-to-many connections) by replicating a multicast packet close to the destination of that multicast packet, obviating the use of multiple unicast connections for the same purpose. This saves network bandwidth and improves throughput.

Typical multicast routing protocols require that each node's multicast forwarding table include, for example, information that maps source and group identifiers for each multicast flow to the interfaces over which the node must forward a packet replica for that group, and the interface over which a packet for that group should properly arrive. The multicast forwarding tables maintained by each multicast-enabled node can become quite large in networks with many multicast sources, many multicast groups, or both. Maintaining such multicast forwarding tables imposes limitations on network scalability.

Bit Indexed Explicit Replication (BIER)

In a "stateless multicast" technique known as Bit Indexed Explicit Replication (BIER), the amount of state information within a multicast network is reduced. In BIER forwarding, receiver information is encoded in the packet rather than looked up in tables at each node based on multicast source and group information. Specifically, the receiver information is encoded in a bit array carried by the packet. Generally speaking, each node associated with a multicast receiver is assigned a bit position in the bit array. A node connected to a receiver may also be referred to as a "receiver node," a "destination node" or an "egress node" herein. The value of the bit at a given bit position indicates whether the receiver node corresponding to that bit position is an intended receiver, or destination, for the multicast packet carrying the bit array.

In forwarding a BIER multicast packet containing a packet bit array (or, more generally, a BIER multicast message containing a message bit array), a BIER-enabled node determines whether any intended destination nodes for the packet are also reachable nodes from the BIER-enabled node. This is done using a bit indexed forwarding table stored at the BIER-enabled node, the forwarding table having an entry for each of the BIER-enabled node's neighbor (directly connected next-hop) nodes. In an embodiment, the entry for each neighbor node includes a neighbor bit array with the same mapping of bit positions to destination nodes as that of the packet bit array. In a neighbor bit array, however, the value of the bit at a given bit position indicates whether the corresponding receiver node is reachable from the neighboring node associated with the forwarding table entry containing the neighbor bit array. In one embodiment, whether a node is "reachable," for purposes of BIER forwarding, from a neighboring node depends on whether the neighboring node is included in the shortest path to the destination node, as determined through an interior gateway protocol (IGP) used in the network. A message bit array may also be called a "bit string" herein, and a neighbor bit array may be called a "bit mask."

If comparison of the packet bit array of an incoming BIER packet with a neighbor bit array in a forwarding table entry shows that at least one intended destination node for the multicast packet is reachable via a neighbor node, a replica of the multicast packet is forwarded to the neighbor node. In an embodiment, the replica is forwarded using routing information from the forwarding node's unicast routing table. This process is repeated for forwarding table entries associated with any other neighbor nodes, and each forwarded replica packet is in turn handled in a similar manner when received by the respective BIER-enabled neighbor node. In this manner the multicast packet is replicated and forwarded as needed to reach the intended destinations. In some embodiments, modifications are made to a packet bit array during the forwarding process, either as a packet bit array is compared to neighbor bit arrays in successive forwarding table entries at the node, or before a replica packet carrying a packet bit array is forwarded to a neighbor node, or in both situations. Such modifications can prevent looping and replication of packets.

Figure 1B:
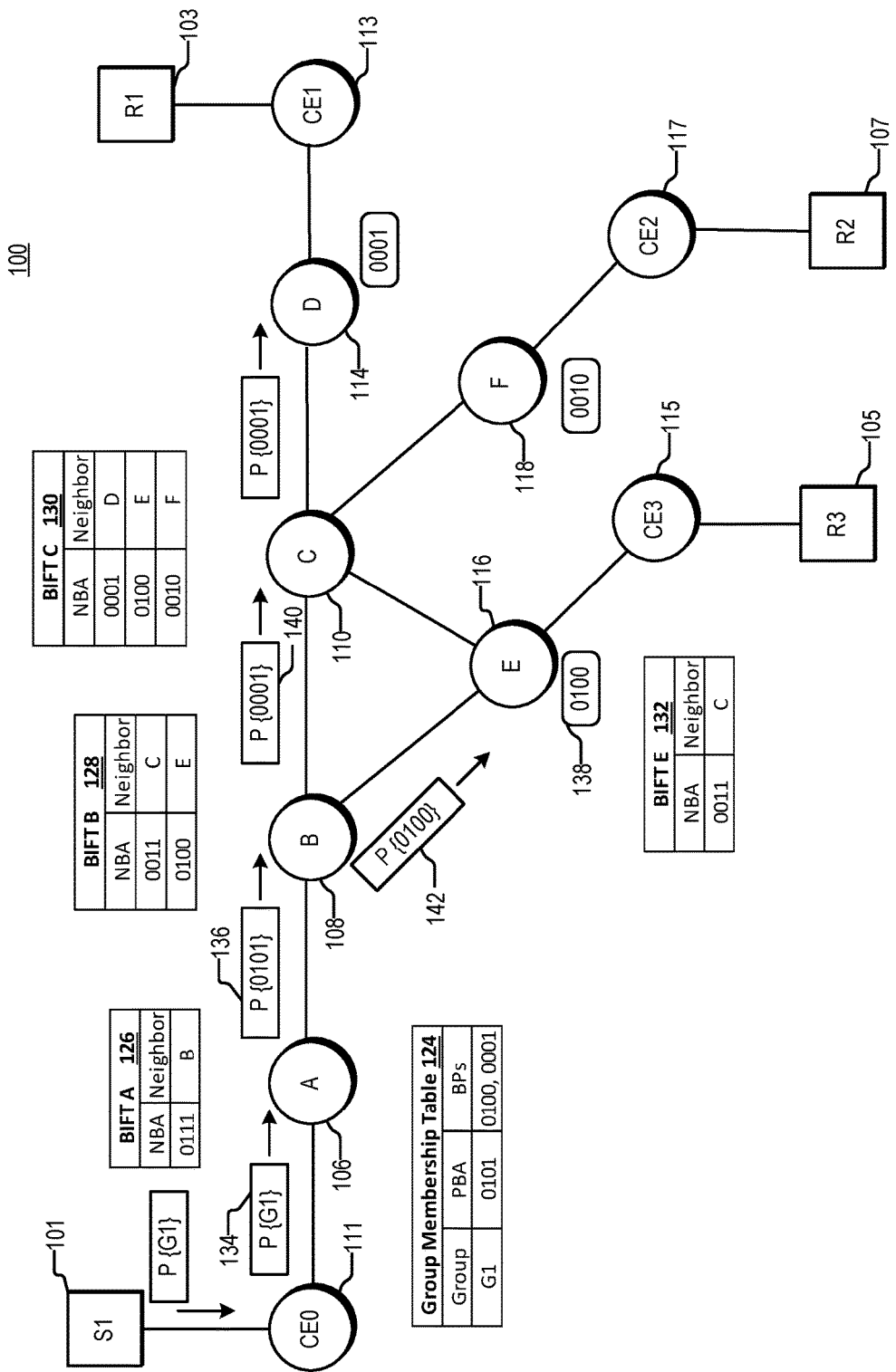
FIG. 1B is a diagram illustrating BIER forwarding through an example network.

Configuration and operation of a BIER-enabled network is described further with reference to FIGS. 1A and 1B. FIG. 1A shows an example network 100. Network 100 includes BIER-enabled nodes 106, 108, 110, 114, 116 and 118. BIER-enabled nodes are configured to forward packets using BIER. For example, BIER-enabled nodes are configured to store and use bit indexed forwarding tables, as explained further below. A BIER-enabled node may also be referred to as a "bit-forwarding router" (BFR) herein. Although "node" and "router" may be used interchangeably herein, the described nodes may in some embodiments be implemented using switches or other devices capable of carrying out the described functions. The BIER-enabled nodes in FIG. 1A form a provider network, or domain. Such a provider network could be employed by an Internet service provider to transport packets to customers. The domain includes core nodes 108 and 110, and provider edge nodes 106, 114, 116, and 118. The provider edge nodes are coupled to customer edge nodes 111, 113, 115, and 117. Hosts 101, 103, 105, and 107 are coupled to the customer edge nodes. In the embodiment of FIG. 1A, host 101 is a multicast source, while hosts 103, 105 and 107 are configured as multicast receivers, or subscribers.

Each of the BIER-enabled nodes 106, 108, 110, 114, 116 and 118 has interfaces that are identified as shown. For example, BIER-enabled node 108 has three interfaces designated 1-3, respectively. Each BIER-enabled node is assigned a unique identifier or routable address known as a router identifier (RID). The RID can be implemented as, for example, an internet protocol (IP) address, prefix, or loopback address. The RID may also be referred to as a "BFR-Prefix" herein. In network 100 and other network diagrams described herein, these unique router identifiers are represented by capital letters such as "A" through "F". Network 100 and the other BIER-enabled networks described herein are not limited to any particular version of IP or to any particular routing or routed protocol at all. In an embodiment, each BIER-enabled node advertises or floods the routable address to all other BIER-enabled nodes in network 100. Each BIER-enabled node builds a unicast topology of the BIER-enabled nodes in network 100 using the advertised routable addresses.

BIER-enabled node 106 is configured as an ingress router for multicast data packets. A BIER-enabled ingress router may also be referred to as a "bit-forwarding ingress router" (BFIR) herein. The ingress router is coupled, via customer edge node 111, to source 101. Multicast data packets from source 101 enter the BIER network via the ingress router (BIER-enabled node 106). Each of BIER-enabled nodes 114, 116, and 118 is configured as an egress router. The egress routers can be connected (directly or via customer edge routers) to hosts, such as receivers, or other networks. An egress router is a BIER-enabled node that is the last BIER-enabled node on a path between a source and a receiver. As such, an egress router is a destination node when forwarding using BIER. The egress router may be a provider edge node that is coupled to the receiver either directly or indirectly (e.g., through a non-BIER-enabled customer edge node). A BIER-enabled egress router may also be referred to as a "bit-forwarding egress router" (BFER) herein.

In an embodiment, receiver information is included in the packet by assigning each edge router in a BIER network a bit position (BP) within a packet bit array carried by the packet (or, more generally, a message bit array carried by a network message). In an embodiment, an edge router assigned a bit position in this manner is also associated with the same relative bit position in a neighbor bit array stored in a bit indexed forwarding table at a BIER-enabled node. Either or both of the packet bit array and neighbor bit array may also be referred to as a bit mask (BM) herein. In some embodiments, the packet bit array is referred to as a bit string or BitString and the neighbor bit array is referred to as a bit mask. As used herein, the term bit array, bit string or bit mask refers to a set of bits that has a fixed or variable length.

Bit Indexed Routing and Forwarding Tables

In an embodiment, each BIER-enabled node in the BIER network uses the BPs and router identifiers (RIDs) of the other BIER-enabled nodes to generate one or more bit indexed routing tables (BIRTs) and bit indexed forwarding tables (BIFTs). A bit indexed routing table is a table that stores BP-to-router identifier mappings. In an embodiment, the BIER-enabled nodes learn about the BP-to-router ID mappings through advertisements sent by the BIER-enabled nodes having assigned bit positions.

In response to a BP being assigned to an egress router, the egress router, in some embodiments, advertises its BP along with its router identifier to some or all of the other nodes in the BIER network. In one embodiment, the ER advertises its BP via an interior gateway protocol (IGP). Within an autonomous system, an IGP is used for exchanging network topology information between nodes (all nodes, whether BIER-enabled or not). There are different types of IGPs, which vary in terms of, for example, the particular information exchanged between nodes, whether information is shared only with neighbor nodes or "flooded" throughout the autonomous system, and how often the exchanged information is updated. In one type of IGP called a link-state routing protocol, every router constructs a topological map of network connectivity in the form of a graph, showing which routers are connected to which other routers. Each router can use its map to independently calculate the best logical path from it to every possible destination in the network. The collection of best paths will then form the routing table. Examples of link-state routing protocols include the intermediate system to intermediate system (IS-IS) and the Open Shortest Path First (OSPF) protocols. Messages called advertisements are used in IGPs to exchange information. Nodes in an IP network automatically exchange network topology information through IGP advertisements.

In an embodiment, ISIS and/or OSPF protocols can be modified to assist in distributing BP-to-router ID mappings through the BIER network using link state updates. In OSPF, such a link state update is called a link-state advertisement (LSA). Certain types of LSAs are "opaque" LSAs which are forwarded through the network even by nodes that do not themselves have the capability to use the information in the LSA. Such opaque LSAs may be useful in networks having both BIER-enabled and non-BIER enabled nodes. Other flooding mechanisms to distribute the information are possible. All BIER-enabled nodes in a BIER network, not just the egress routers, also flood their respective router identifiers, which are used in building network topology, routing and forwarding tables. BIER-enabled nodes, in one embodiment, advertise additional information as well, such as a bit mask size that the BIER-enabled node is configured to use. Adding such BIER information to the advertised information is a relatively small amount of additional information, as compared with the usual topology information exchanged through IGP advertisements, and the state information maintained on a per-group basis in traditional multicast.

Using a mechanism such as IGP advertisements, each BIER-enabled node receives BP-to-router identifier mappings and stores them in a BIRT. Other information can be included in the BIRT, depending on the particular BIER implementation. In an embodiment using an MPLS implementation of BIER, for example, the BIER-enabled node also includes at least one label range in the BIRT for each router ID.

Using the router identifiers, a BIER-enabled node, in an embodiment, performs a recursive lookup in unicast routing tables to identify a directly connected next hop BIER-enabled node (referred to herein as a neighbor) on the shortest path from the BIER-enabled node toward the BIER-enabled node associated with the BP, and the interface via which the neighbor is reachable. In one embodiment, the neighbor is the next hop on a shortest path towards the egress router that originated the advertisement of the bit position. Each BIER-enabled node translates its BIRT(s) into one or more bit indexed forwarding tables (BIFTs) used for forwarding of BIER messages. A BIFT maps each neighbor node (and/or the egress interface for reaching the neighbor node) to the bit positions of destination nodes reachable via that neighbor node.

BIER Packet Forwarding Example

To illustrate the operation of BIER packet forwarding, network 100 of FIG. 1A is shown again with additional annotation in FIG. 1B. In the embodiment of FIG. 1B, BIER-enabled node 114 (an egress router) signals to BIER-enabled node 106 (an ingress router) that BIER-enabled node 114 is interested in receiving packets associated with a given multicast group or flow. BIER-enabled node 116 likewise signals BIER-enabled node 106 that BIER-enabled node 116 is interested in the same multicast group. In an embodiment, this signaling is done via an "overlay" mechanism not explicitly shown in FIG. 1B, such as an exterior gateway protocol or a control protocol used by a network controller. BIER-enabled node 106 updates an entry in group membership table (GMT) 124 (or creates one if one does not already exist) for the multicast group and updates a packet bit array (PBA) in the entry by setting bits corresponding to BIER-enabled nodes 114 and 116. The bit position 138 for node 116 has a value represented by bit string 0100 having bit 3 of the four bits (counting from the least significant bit at the right) set to 1. Similarly, the bit position assigned to node 114 has a value represented by the bit string 0001 having bit 1 set. Assuming that only BIER-enabled nodes 114 and 116 are interested in the flow, the PBA includes set bits for each of these two bit positions, for an array of {0101}.

In the simplified example of FIG. 1B, the packet bit array and neighbor bit arrays used are four bits long, which is sufficient to represent the three egress routers in network 100, each connected to a respective one of the three receivers in the network. In this example, a "1" value in a bit position of a packet bit array indicates that the corresponding destination node is an intended destination for the packet. An alternative convention for the value at a bit position could be used in another embodiment, but in any case the value of the bit at a bit position in a packet bit array indicates whether the corresponding destination node is an intended destination. In FIG. 1B, icons representing multicast packets, such as original packet 134 and BIER-encapsulated packet 136, are superimposed onto the diagram of network 100. The icons represent snapshots taken at successive times as the packet (or replicas of the packet) moves through the network in the direction of the arrows. At one point in time, for example, packet 136 is moving from node 106 ("A") to node 108 ("B"). At a subsequent point in time, packet 136 has been replicated and forwarded on, so that packet replicas 140 and 142 are moving from node B toward nodes 110 ("C") and 116 ("E"), respectively.

BIER-enabled node (and ingress router) 106 is configured to receive a multicast data packet 134 addressed to the multicast group or flow G1 (e.g., from source 101 via customer edge node 111). In the embodiment of FIG. 1B, BIER-enabled node 106 uses the multicast group address and/or source address included in the multicast data packet to access its GMT 124 and select a packet bit array associated with the multicast group. After selecting a PBA that corresponds to the multicast group from GMT 124, BIER-enabled node 106 encapsulates the packet bit array into the multicast data packet, resulting in BIER packet 136. Ingress node 106 also identifies the neighbors to which packet 136 will be forwarded. In an embodiment, the neighbors are identified using the bit indexed forwarding table (BIFT) of node 106, a portion 126 of which is shown in FIG. 1B. In a further embodiment, this involves performing an AND operation between the packet bit array and each neighbor bit array (NBA) in BIER-enabled node 106's BIFT. In this example, there is only one entry in the BIFT and the entry corresponds to BIER-enabled node 108. This means that the shortest path from BIER-enabled node 106 to all three of the egress routers in network 100 runs through BIER-enabled node 108. Since the result of the AND is TRUE for neighbor B (BIER-enabled node 108), BIER-enabled node 106 forwards the multicast data packet to BIER-enabled node 108. This forwarding may involve other information from the BIFT for node 106 not shown in portion 126, such as egress interface information.

In an embodiment, in response to receiving the multicast data packet, BIER-enabled node 108 performs an AND between the packet bit array in the multicast data packet, {0101}, and the neighbor bit array in each entry in its BIFT (a portion 128 of which is shown). The result for neighbor C is TRUE so BIER-enabled node 108 forwards replica 140 of the multicast data packet to BIER-enabled node 110. In the embodiment of FIG. 1B, BIER-enabled node 108 modifies the packet bit array in the multicast data packet it forwards, as discussed further below. The result for neighbor E is also TRUE, so BIER-enabled node 108 replicates the multicast data packet and forwards replica 142 of the multicast data packet to BIER-enabled node 116, which is an egress router. In the example of FIG. 1B, a "1" value in a bit position of a neighbor bit array indicates that the destination node assigned to the bit position is reachable from the neighboring node corresponding to the forwarding table entry containing the neighbor bit array. An alternative convention for the value at a bit position could be used in another embodiment, but in any case the value of the bit at a bit position in a neighbor bit array indicates whether the corresponding destination node is a reachable destination from the neighbor associated with the neighbor bit array.

In an embodiment, BIER-enabled node 110, in response to receiving a copy of the multicast data packet, performs an AND between the packet bit array in the multicast data packet, {0001}, and the neighbor bit array in each entry in its BIFT (portion 130 of which is shown). The result for neighbor D is TRUE so BIER-enabled node 110 forwards the multicast data packet to BIER-enabled node 114 which is an egress router. The result for neighbor F is FALSE, so BIER-enabled node 110 refrains from forwarding the multicast data packet to BIER-enabled node 118. In this way the multicast data packet travels from the ingress router (BIER-enabled node 106) through the BIER network to the two egress routers that signaled an interest in the multicast group (BIER-enabled nodes 114 and 116).

In the embodiment of FIG. 1B, each time the BIER packet is forwarded using an entry in a bit indexed forwarding table, the packet bit array in the forwarded packet is altered to clear any set bits in bit positions corresponding to nodes not reachable from the neighbor that the packet is being forwarded to. For example, when the multicast packet arrives at node B, it has an incoming packet bit array of {0101}. Comparison of the packet bit array to the neighbor bit arrays shown in BIFT portion 128 shows that the set first (rightmost) bit of the PBA corresponds to a destination node reachable through neighbor C, while the set third bit corresponds to a node reachable through neighbor E. The packet bit array in the packet forwarded to neighbor C accordingly has only the first bit set, and the PBA in the packet forwarded to neighbor E has only the third bit set. This modification of the packet bit array when a BIER packet is forwarded prevents looping and duplication by ensuring that a BIER-enabled node forwards a given multicast data packet only once based on a given bit position. This alteration of the packet bit array to clear bits that are not also set in the neighbor bit array can be interpreted as a form of masking by the neighbor bit array.

In addition to alteration of the packet bit array sent with a forwarded packet (which may also be called a forwarded packet bit array herein), the packet bit array used at a BIER-enabled node for comparison to each neighbor bit array within a BIFT may be modified each time a packet is sent. Specifically, if a packet is sent as a result of comparing the incoming PBA to a neighbor bit array in a bit indexed forwarding table at the node, the PBA used for comparison to the next neighbor bit array in the forwarding table is altered to remove the destinations of the just-sent packet as intended destinations. In one embodiment, this alteration includes performing a bitwise AND operation between the incoming PBA and the inverse of the neighbor bit array corresponding to the neighbor node to which a packet was just sent. This has the effect of clearing those bits corresponding to bit positions which were set in the forwarded PBA of the outgoing packet. This alteration can prevent sending of a duplicate packet in a case for which multiple forwarding table entries have an NBA with the same bit set. This can happen, for example, in equal cost multi-path (ECMP) arrangements.

The above-described modifications to the packet bit array are not needed in embodiments in which the network has a loop-free topology. One example of a loop-free topology is a point-to-multipoint (P2MP) label switched path (LSP) in a network employing multiprotocol label switching (MPLS). Modifications to the packet bit array may also be omitted in embodiments in which some amount of looping and/or duplication can be tolerated.

Bit Array Length

The length of the bit arrays used in a particular BIER network—i.e., the number of bits in the array—can be statically configured or dynamically assigned and distributed through the BIER network. In an embodiment, the length is determined in view of the size and capabilities of the network. One factor affecting the length of a message bit array that can be carried by a message is the type of encapsulation used to include the message bit array in the message.

In some embodiments, existing encapsulations such as Internet Protocol version 6 (IPv6) or Multiprotocol Label Switching (MPLS) can be adapted or extended to carry BIER-related information. For example, a message bit array is written to the destination address field of an IPv6 header in one embodiment. In another embodiment, a message bit array is written to one or more IPv6 extension headers. In an embodiment employing MPLS encapsulation, a message bit array is included in a stack of MPLS labels. In another MPLS embodiment, the message bit array may be encoded outside of the MPLS label structure, between the MPLS label stack and the payload of the message. Although use of existing encapsulations to encode BIER-related information has advantages in terms of leveraging existing network infrastructure, existing encapsulations may impose limitations on the size of a message bit array. In one currently-used MPLS implementation, for example, the message bit array is limited to 256 bits. As another example, one currently-envisioned IPv6 implementation limits the message bit array to approximately 100 bits.

Limitation of the size of a message bit array, whether arising from the message encapsulation used or from other network factors, in turn limits the size of a BIER network, since at least one bit position is needed for each receiver or destination node being addressed. One way that the number of receivers in a BIER network can be increased beyond the network's bit array length is by associating a "set identifier" with the bit array. The receivers to be addressed can be grouped into sets of, say, 256 receivers (or whatever number can be addressed by the bit array). The same bit position can then be used to represent one receiver in, for example, Set 0 and a different receiver in Set 1. In BIER networks employing a set identifier, a message may be sent using multiple message bit arrays, one for each set identifier. In an embodiment, a separate copy of the message is sent for each set identifier/message bit array combination. The bit indexed forwarding tables at each node can include multiple neighbor bit arrays associated with each neighbor, one bit array for each set identifier.

Traffic Engineering

The usual BIER forwarding mechanism referenced above depends on the use of a forwarding node's unicast routing information. The BIER packet bit array tells a BIER-enabled node which destinations the packet must reach, but not the path to use to get them there. The path used for forwarding a given replica packet is the path determined by the forwarding node's unicast routing table, which is typically built using a shortest-path-first algorithm. This BIER implementation does not allow routing of a packet along an explicit path (also called "traffic engineering").

There are situations in which explicit routing of multicast packets is desirable. For example, explicit paths are often used in Operations, Administration and Maintenance (OAM) activities designed to monitor or measure network path variables such as packet loss or transmission delay. Another application in which explicit routing can be useful is that of professional media networks using Internet Protocol (IP) for video broadcasting. Video broadcasting networks typically involve capture of content in multiple locations, processing of the content, and transmission of content (known as contribution) to one or more other locations. Content from various sources can be merged into a continuous stream and provided to potentially numerous receivers, based on control signals generated by a controller. Switching between content sources and modifying the selection of receivers that receive the stream is extremely time-critical. If these transitions do not occur on very specific boundaries or time intervals, video and audio distortions or discontinuities can result. Video transmission is also very sensitive to errors caused by the packet loss that may occur in IP networks. As such, some error correction schemes involve sending matching packet streams over alternate paths so that a receiver can switch between the streams to reconstruct an error-free signal. The stringent timing requirements involved in video broadcasting generally, along with the requirement for multiple independent paths in certain situations, makes an ability to define explicit paths desirable.

Certain existing technologies allow for traffic engineering. In a network employing Multiprotocol Label Switching (MPLS), for example, an explicit path can be established using a protocol called Resource Reservation Protocol with Traffic Engineering (RSVP-TE). An explicit path, or "tunnel" is specified using RSVP-TE when the initial node sends a request message from node to node along the length of the requested path, and the final node of the path confirms by sending back along the path the MPLS labels to be used for the path. These labels must then be added to the forwarding tables of the nodes along the path. The reservation process must be done again if the explicit path is altered in response to a change in network topology or conditions. The RSVP-TE process can be extended to multicast trees using point-to-multipoint (P2MP) RSVP-TE. Each multicast group will have its own tree reservation process and its own set of labels, requiring significant state at each node for forwarding tables relating labels to group and source information, in addition to the time and bandwidth required for the reservation process.

Another forwarding mechanism allowing creation of explicit paths is segment routing. Segment routing is described in detail in, for example, U.S. Pat. No. 9,369,371. In segment routing, path information is carried with the packet in the form of a set of segment identifiers, where the path is constructed from topological sub-paths with each sub-path associated with a segment identifier. The set of segment identifiers carried by the packet can be implemented in various data plane technologies, such as through a stack of MPLS labels, or through a string of identifiers embedded in an Internet Protocol version 6 (IPv6) extension header. Segment identifiers can be advertised and exchanged using the existing IGP used for exchanging unicast routing information in the IP network, so that a control plane protocol such as the Label Distribution Protocol (LDP) or RSVP-TE protocols used in MPLS networks is not needed. A set of segment identifiers defining the path for a packet is determined by, for example, an ingress node or a network controller and added to the encapsulation of the packet. The encapsulation arranges the segment identifiers in sequential order along the defined path. Forwarding then proceeds by lookup, in a segment routing forwarding table of the forwarding node, of the first segment identifier (e.g., the uppermost identifier, in an MPLS implementation using a label stack). When the sub-path corresponding to a segment identifier has been traversed, that identifier is removed from the active set of segment identifiers carried by the packet. The path for the packet is accordingly defined by accessing the segment identifiers carried by the packet in sequential order. Although segment routing allows an explicit path to be defined with relatively minimal "state" (storage of identifiers, labels, etc.) at each forwarding node, segment routing as currently defined does not allow for multicast path definition or forwarding.

BIER-TE

Still another forwarding method has been proposed which allows explicit multicast paths to be used with a bit-array-based forwarding mechanism. This method, referred to herein as "BIER-TE," is described in detail in, for example, co-pending U.S. patent application Ser. No. 14/814,575. In BIER-TE, the bit positions in the bit array carried by the packet represent individual "links" between nodes along a path, functioning as path segments or sub-paths, such that the path for a message is formed from a series of connected links. This is in contrast to the BIER mechanism described above, in which the bit positions in the bit array correspond to destination nodes for a packet. A bit-indexed forwarding table in a BIER-TE implementation includes an entry for each outgoing link connected to the forwarding node, if the outgoing link has a bit position assigned to it (each link included in a multicast tree defined for the network has a bit position assigned). The BIER-TE forwarding table is typically populated by information provided by an external controller.

In an embodiment, a BIER-TE message arriving at a forwarding node carries a message bit array having a set bit for each link (path segment) included in a multicast tree that the message is to be distributed over. If a set bit in the message bit array shares the bit position of an outgoing link in the forwarding table, a replica of the message is forwarded over the link. In a further embodiment, bits in bit positions corresponding to links that the message is forwarded over are reset in the message bit array of the forwarded message, to prevent duplication in the event of a loop in the network. In effect, storage of only the locally-relevant links in each node's BIER-TE forwarding table results in a kind of self-assembly process for the path or tree, as a message starts its journey carrying bits reflecting the entire tree, but the bits are gradually used in building the path as the messages (or replica messages) progress from node to node.

The assignment of bit positions to network links in BIER-TE, as opposed to receiver nodes as in non-TE BIER, allows explicit paths and trees to be defined but also requires a relatively high number of bit positions. Various measures can be taken to reduce the number of bit positions needed, such as identifying links that can share the same bit position or identifying portions of a network through which an explicitly-defined path is not needed. Even so, the number of bits used to define an explicit multicast tree in BIER-TE can in some embodiments be much higher than the number needed to create a non-explicit tree to the same receiver nodes using non-TE BIER. As noted above in the discussion of non-TE BIER, the number of bit positions in that a message can carry in a message bit array may be limited, depending on the type of encapsulation used to attach the bit array to the message. The use of set identifiers, also described above, can allow a large number of BIER-TE bit positions to be accommodated. In an embodiment, a BIER-TE network is divided into portions such that links in one portion are not included in the same paths or trees as links in another portion of the network. In such an embodiment, the same set of bit positions can be used for BIER-TE assignments in each portion of the network, with a different set identifier value associated with each portion. Because a separate message copy is sent for each set identifier/message bit array combination, this use of sets can result in significant loading at the ingress node of a BIER network. This loading may be particularly severe for applications such as video distribution, where a single source may be connected to a large tree supplying many receivers.

Tree-Based BIER

This disclosure presents a new way of implementing traffic engineering in a network configured for BIER. In contrast to the BIER-TE method described above, the approach described herein employs a message bit array in which the bit positions represent egress nodes of a BIER network, in a manner similar to that discussed above in connection with FIG. 1B. In addition to a message bit array and, in some embodiments, a set identifier, a message transmitted using this new approach includes a "tree identifier" associated with a tree defined within the network. A "tree" as used herein includes a set of paths connecting a source, or ingress, node in a BIER-enabled network to each of multiple destination, or egress, nodes for the network. The new approach may be referred to herein as "tree-based BIER" or "BIER-Tr."

Figure 2:
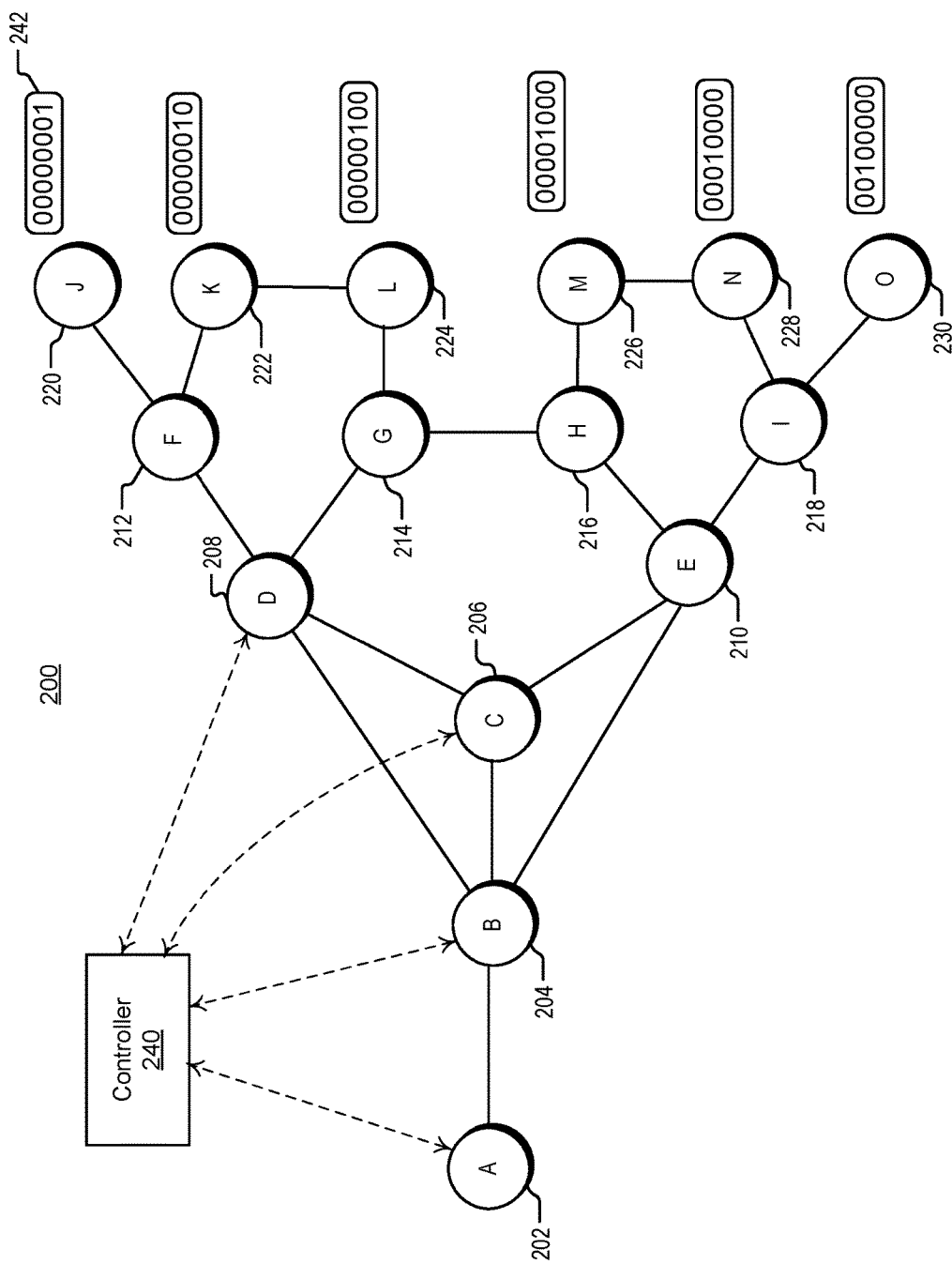
FIG. 2 is a simplified block diagram illustrating certain components of an example network.

An example of a network that can be configured for tree-based BIER is shown in FIG. 2. Network 200 of FIG. 2 includes nodes 202 through 230 as shown. In the embodiment of FIG. 2, each of these nodes is BIER-Tr-enabled, or adapted to forward messages using tree-based BIER. For example, these BIER-Tr-enabled nodes are adapted or configured to store and use respective bit-indexed forwarding tables based on bit positions and tree identifiers, as explained further below. In some embodiments, some or all of these BIER-Tr-enabled nodes are also enabled to forward non-BIER-Tr packets, using different forwarding tables. In a similar manner to that described above for network 100 of FIG. 1A, letters A through O denote respective unique router identifiers for the BIER-Tr-enabled nodes, such as IP loopback addresses (in the case of an IP network). For brevity, these letters are used herein to reference the respective nodes in network 200. The solid lines between the nodes represent data connections between them; in an embodiment, the connections are physical point-to-point links. Although not specifically identified in FIG. 2, each of the BIER-Tr enabled nodes in network 200 has one or more interfaces through which the data connections represented by the solid lines are made.

In the embodiment of FIG. 2, BIER-Tr-enabled node A is configured as an ingress router for the BIER-Tr network. Each of nodes J through O is configured as an egress router. The egress routers can be connected (directly or via customer edge routers) to hosts, such as receivers, or other networks. An egress router as used herein is a BIER-Tr-enabled node that is the last BIER-Tr-enabled node on a path between a source and a receiver. The egress router may be a provider edge node that is coupled to the receiver either directly or indirectly (e.g., through a non-BIER-Tr-enabled customer edge node). Each of egress nodes J through O is assigned a respective bit position 242. In the embodiment of FIG. 2, the value of each bit position 242 is shown using a bit string having a set bit in the assigned bit position (counting from the right). The eight bits of the bit strings shown are sufficient to represent the six egress routers, assigned bit positions "1" through "6". Although bit positions 242 are assigned to respective egress nodes in the embodiment of FIG. 2, bit positions may also be assigned to individual interfaces of egress nodes in other embodiments, or to receivers associated with egress nodes.

Network 200 also includes a central controller 240. In an embodiment, controller 240 is a controller host external to the data path of the BIER-Tr network. In an alternative embodiment, ingress node A is configured to perform some or all of the functions of controller 240. In an embodiment, controller 240 interacts with each of the BIER-Tr-enabled nodes through a mechanism and/or protocol different than those used to forward multicast packets through network 200. This interaction may be referred to as "out-of-band" or "overlay" signaling. Exemplary interactions between controller 240 and nodes A, B, C and D are illustrated by dashed lines in FIG. 2. Although additional dashed lines are omitted from FIG. 2 for clarity, similar communications also occur between controller 240 and each of nodes E through O.

Communication between controller 240 and the BIER-Tr-enabled nodes may occur through one or more control protocols. As an example, communications with controller 240 may occur using the NETCONF and/or RESTCONF protocols and the YANG data modeling language. These protocols are described further in, for example, "Network Configuration Protocol (NETCONF)," by R. Enns, M. Bjorklund, J. Schoenwaelder, and A. Bierman, Eds., RFC 6241, June 2011, available at https://tools.ietf.org/html/rfc6241,"RESTCONF Protocol," by A. Bierman, M. Bjorklund, and K. Watsen, Jun. 4, 2015, available at https://tools.ietf.org/html/draft-ietf-netconf-restconf-05, and "YANG—A Data Modeling Language for the Network Configuration Protocol (NETCONF)," by M. Bjorklund, Ed., RFC 6020, October 2010, available at https://tools.ietf.org/html/rfc6020, which documents are incorporated by reference as if fully set forth herein. As another example, controller 240 may communicate with nodes A through O using a border gateway protocol (BGP), in an embodiment in which the BIER-Tr-enabled nodes are running a BGP. In some embodiments, controller 240 is implemented using a software defined networking platform such as OpenDaylight™. Communications with controller 240 are carried over data links to controller 240 that are not explicitly shown in FIG. 2. In an embodiment, control communications between nodes A through O and controller 240 are carried over some or all of the same physical links used for transmission of data messages through network 200, although different protocols are used for the data transmission and the control communications.

The functions of controller 240 in the embodiment of FIG. 2 include: generating one or more trees connecting ingress node A to egress nodes J through O; communicating respective tree identifiers for the one or more trees to the BIER-Tr-enabled nodes in network 200; communicating forwarding table information associated with the tree identifiers to BIER-Tr forwarding nodes in network 200; and communicating encapsulation information associated with the tree identifiers to ingress node A of network 200. In some embodiments, controller 240 may perform additional functions, such as assignment of BIER bit positions to egress nodes J through O, or assignment of router IDs to all of the nodes within network 200. Embodiments employing a controller such as controller 240 may be associated with software-defined networking (SDN) implementations. In generating trees, the controller uses topological information for the network. In an embodiment, the network nodes are running an interior gateway protocol (IGP), and controller 240 obtains the topology of network 200 through IGP advertisements. In an alternative embodiment, controller 240 obtains topology information through operation of a different protocol, or through manual configuration.

In some embodiments, controller 240 uses multicast group membership information in generating trees. In an embodiment, nodes A and J through O of network 200 are provider edge nodes and communicate with controller 240 to identify their respective hosts as either a source of or a receiver of (subscriber to) a particular multicast transmission, and inform the controller of any changes in group membership status. In a further embodiment, communication by a provider edge node with controller 240 is in response to receiving a multicast protocol message (such as a "join" or "prune" message) from the node's associated host.

Figure 3:
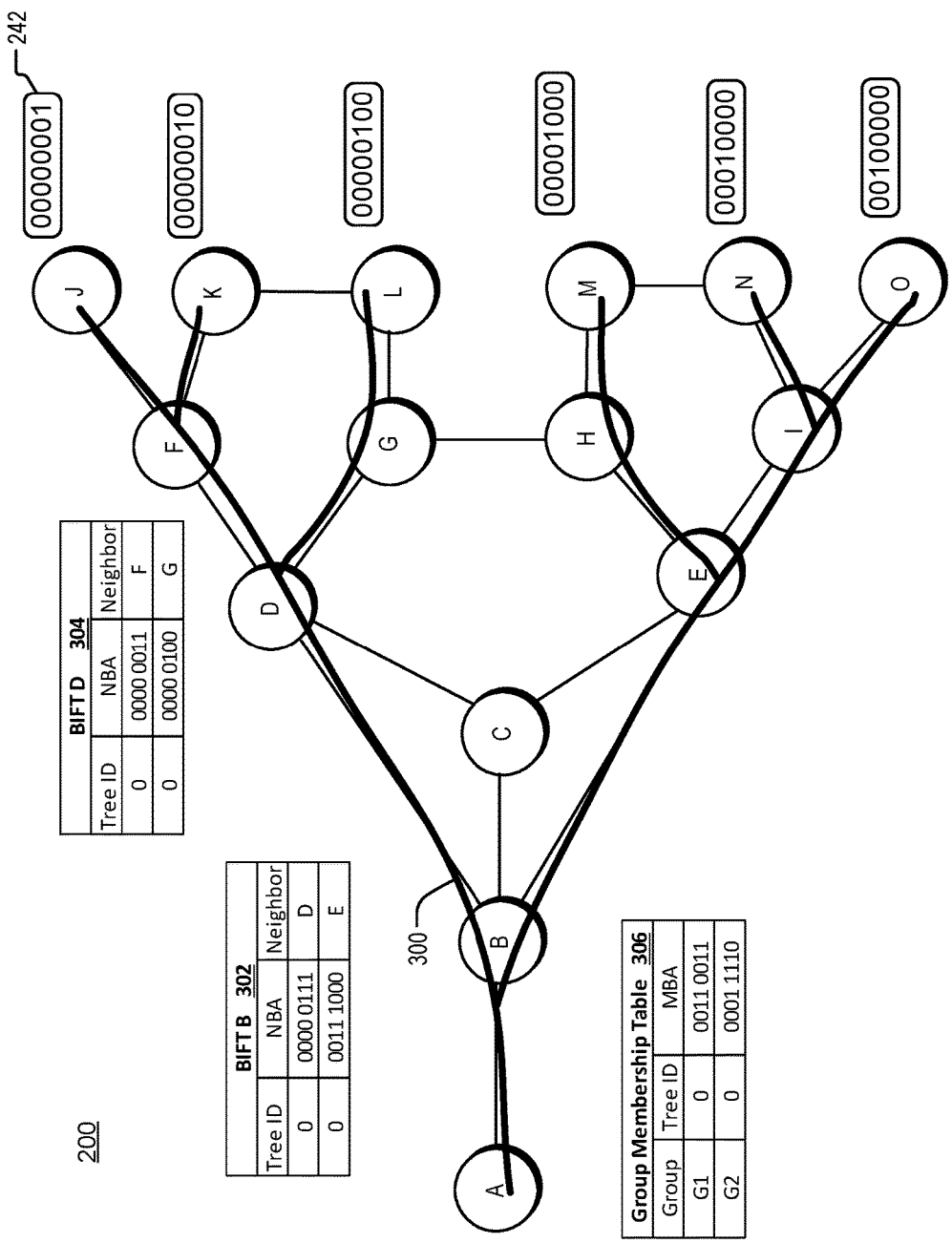
FIGS. 3-5 illustrate implementations of multicast trees in the network of FIG. 2.

An example of a tree that may be used for multicast transmission in network 200 is shown in FIG. 3. Tree 300 is designated in FIG. 3 with thick, solid lines superimposed over the diagram of network 200. Although certain features shown in FIG. 2 have been omitted from FIG. 3 for clarity, it should be understood that network 200 of FIG. 3 is the same as network 200 shown in FIG. 2, and that a controller such as controller 240 of FIG. 2 may be employed. Tree 300 comprises a combination of a set of paths connecting ingress node A to each of egress nodes J through O. In the embodiment of FIG. 3, tree 300 is assigned tree identifier ("ID") value "0". In some embodiments, tree ID value "0" is assigned to a tree calculated using a shortest-path algorithm. A shortest-path tree assigned tree ID value "0" may also serve as a default tree in some embodiments, for use in routing a message through a BIER-Tr network if no tree ID is identified in the message.

Tree 300 is implemented using entries in bit indexed forwarding tables at the forwarding nodes of network 200, two examples of which are shown in FIG. 3. Bit indexed forwarding table ("BIFT") 302 is for forwarding at node B, and BIFT 304 is for forwarding at node D. Each of the other BIER-Tr forwarding nodes in network 200 includes a similar table (not shown in FIG. 3). The bit indexed forwarding tables for network 200 shown in FIG. 3 are similar in some ways to those shown in FIG. 1B for network 100. Unlike the standard BIER forwarding tables of FIG. 1, however, the tables of FIG. 3 include a tree ID value for each entry. In the embodiment of FIG. 3, each of the bit indexed forwarding tables includes a neighbor bit array ("NBA") indicating which egress nodes are reachable via the neighbor identified by the entry. In table 302 for node B, for example, the entry including neighbor node D has a neighbor bit array with set bits in bit positions "1", "2" and "3". An incoming message at node B carrying a tree ID of "0" and a message bit array having a set bit in any of the first three bit positions will therefore be forwarded to node D. Similarly, an incoming message carrying a tree ID of "0" and a message bit array having a set bit in any of bit positions "4", "5" or "6" will instead be forwarded to node E, in accordance with the second entry of table 302. In a similar manner, BIFT 304 at node D forwards messages having tree ID "0" and intended for nodes J and/or K to node F, and those having tree ID "0" and intended for node L to node G. Bit arrays included in the tables illustrated herein may have the bits grouped into 4-bit subgroups for readability.

The tree ID and message bit array used for forwarding in BIER-Tr network 200 are attached to (i.e., incorporated into one or more headers of) an incoming message at ingress node A. Group path table 306 is an example of a data structure that can be stored at node A and used in encapsulating an incoming message to carry BIER-Tr information. Table 306 is similar in some ways to group path table 124 of FIG. 1B, except that table 306 includes tree identifier information. The "Group" column of table 306 includes identifiers of a group or flow that the incoming message is associated with. As an example, the group identifier could take the form of an IP group address of an incoming IP packet. Upon receiving an incoming multicast message, an encapsulation engine at node A determines the group identifier from a header of the message, and accesses group membership table 306 to determine the tree ID and message bit array (MBA) to be attached to the message. As noted above in connection with standard BIER forwarding, various types of encapsulation may be used to attach information such as a message bit array, set identifier, or tree ID to a message. In some embodiments, an existing encapsulation such as MPLS or IPv6 can be extended to carry BIER-related information. Alternatively, dedicated BIER encapsulations may be developed. A new IP-based encapsulation for incorporating BIER-Tr information is described elsewhere in this disclosure.

In an embodiment, a tree such as tree 300 of FIG. 3 includes a collection of paths reaching all BIER-Tr egress nodes, such as nodes J through O of network 200. A particular multicast flow is not necessarily directed to all of the egress nodes, however. The tree ID corresponding to a group identifier in table 306 determines the path that a message will take to reach a given egress node, while the message bit array corresponding to the group identifier determines which egress nodes the message is directed to. In table 306, for example, incoming messages with group identifier G1 are directed to the egress nodes corresponding to bit positions 1, 2, 5 and 6 (nodes J, K, N and O), as indicated by the set bits in the message bit array corresponding to group G1 in table 306. Messages in group G2, on the other hand, are directed to nodes K, L, M and N, as indicated by set bits 2, 3, 4 and 5 in the message bit array for group G2 in table 306. Any number of different multicast groups or flows can be forwarded using the same tree. It is noted that once a message is encapsulated at the ingress node with a tree ID and message bit array, multicast group identifiers such as G1 and G2 are not used in forwarding the message using BIER-Tr. There is therefore no need for multicast group state in nodes of the BIER-Tr network other than the ingress node. Accordingly, bit indexed forwarding tables such as tables 302 and 304 do not include multicast group information.

In an embodiment, tree 300 is generated by a network controller such as controller 240 of FIG. 2. In such an embodiment, the controller also provides information to populate tables at network nodes containing BIER-Tr information, such as group membership table 306 and bit indexed forwarding tables 302 and 304. In some embodiments, the controller assigns bit positions to egress nodes in addition to generating trees and maintaining multicast group membership information. In these embodiments, the controller can therefore provide to a network node all of the information needed to populate a bit indexed forwarding table or a group membership table, including tree IDs, neighbor nodes, bit position information, and (for the ingress node) multicast group information. Alternatively, bit position information may in some embodiments be distributed by egress nodes using a mechanism such as IGP advertisements, in a manner similar to that described above for standard BIER networks. In that case, a controller could, for example, supply tree ID, neighbor and egress node information, such as identifying node F as the neighbor used for reaching egress nodes J and K from node D. Upon receiving this information, node D could access its own information regarding bit positions associated with nodes J and K to generate the neighbor bit arrays in the entries of forwarding table 304. In general, tables at BIER-Tr nodes are populated, in various embodiments, using data from a controller or from some combination of a controller, manual configuration, and advertisements between nodes.

Figure 4:
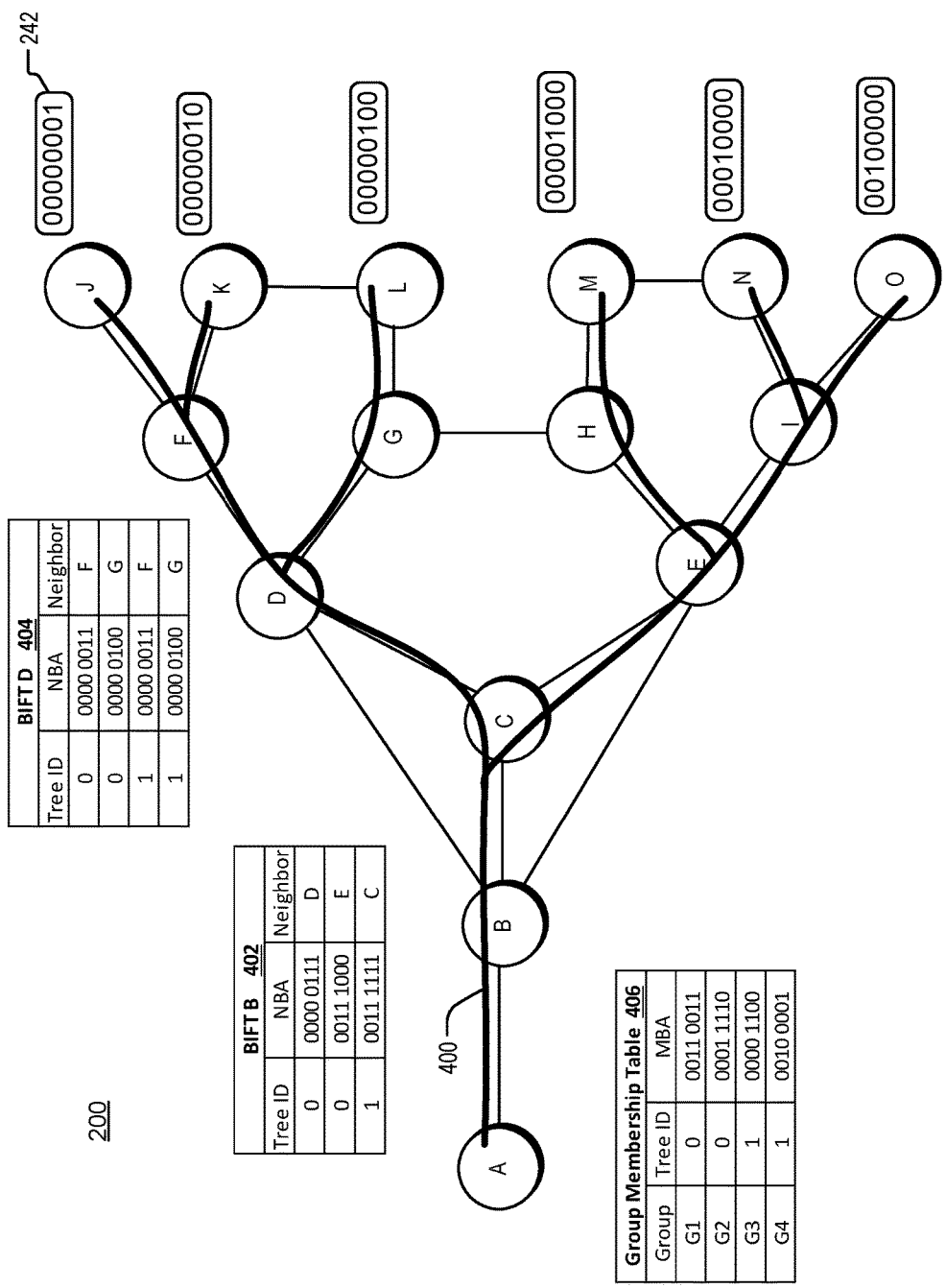

An additional example of a tree that may be used for multicast transmission in network 200 is shown in FIG. 4. Tree 400 of FIG. 4 is similar to tree 300 of FIG. 3, except that in tree 400 the branching to nodes D and E occurs at node C rather than node B. In the embodiment of FIG. 4, tree 400 is assigned tree ID value "1". Bit indexed forwarding tables 402 and 404 of FIG. 4 include entries for tree ID values of both 0 (tree 300, as also shown in tables 302 and 304 of FIG. 3) and 1. The distinction between the trees with tree ID 0 and 1 can be seen by comparison of the entries in table 402 at node B. In the case of tree ID 1, messages intended for any of nodes J through O (bit positions 1 through 6) are sent to node C. In table 404 at node D, on the other hand, entries with a tree ID of 1 contain the same neighbor bit arrays and neighbor nodes as the corresponding entries with a tree ID of 0, because the two trees are identical in the portion of the network between node D and egress nodes J, K and L.

Designation of multiple trees may be used in some embodiments to provide different levels of service to a group of egress nodes. For example, tree 300 may provide a lower path delay, or an improved value of some other performance metric, as compared to tree 400. Group membership table 406 at ingress node A includes the entries, also in table 306 of FIG. 3, mapping multicast groups G1 and G2 to tree ID 0 and respective message bit arrays identifying the egress nodes for each group. Table 406 also includes entries mapping multicast groups G3 and G4 to tree ID 1 and to respective message bit arrays. Although each of the message bit arrays shown in group membership table 406 includes a distinct arrangement of set and unset bits, in other embodiments the same bit array, but a different tree ID, could be assigned to two different multicast groups.

Figure 5:
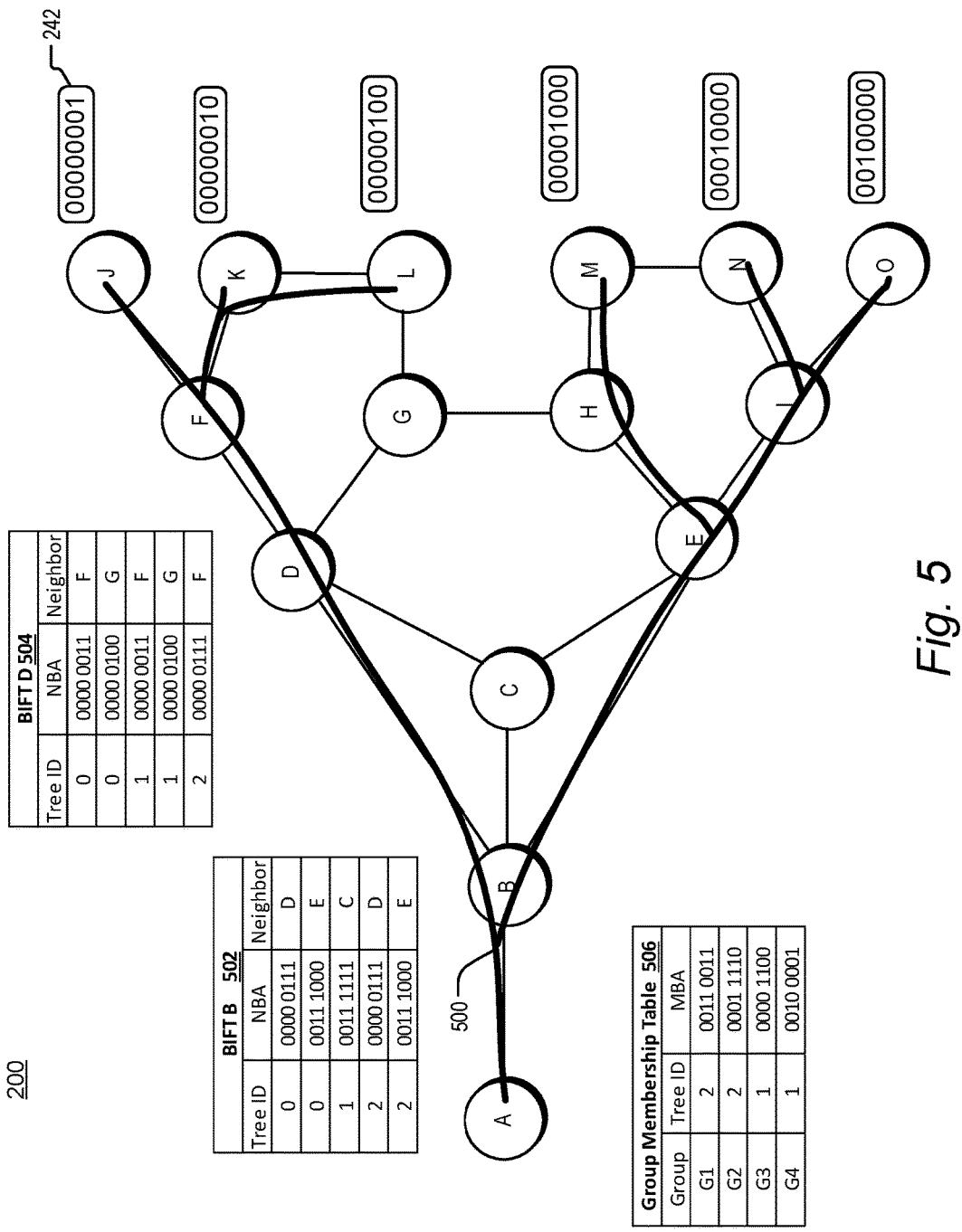

Still another example of a tree that may be used for multicast transmission in network 200 is shown in FIG. 5. Tree 500 of FIG. 5 is similar to tree 300 of FIG. 3, except that tree 500 includes a path to node L passing through node K rather than node G. In the embodiment of FIG. 5, tree 500 is assigned tree ID value "2". Bit indexed forwarding tables 502 and 504 of FIG. 5 include entries tree ID values of 0 (tree 300), 1(tree 400), and 2(tree 500). The distinction between the trees with tree ID values of 2 and 0 can be seen by comparison of the entries in bit indexed forwarding table 504 at node D. In the entry having a tree ID of 2, messages intended for any of egress nodes J, K and L are forwarded to neighbor node F, rather than being split between nodes F (for egress nodes J and K) and G (for egress node L) in the case of the entries for tree ID values of 0 and 1.

In group membership table 506 at ingress node A, tree ID 2 is used for encapsulation of incoming messages in multicast groups G1 and G2. This is in contrast to the mapping of tables 306 of FIG. 3 and 406 of FIG. 4, in which tree ID 0 is used for groups G1 and G2. The configuration of the tables shown in FIG. 5 could reflect, for example, an embodiment in which groups G1 and G2 were previously assigned to tree ID 0 (tree 300), but tree ID 2 (tree 500) was subsequently generated in response to a change in network conditions causing the path from node D to node L through node G to be an undesirable path. The change in network conditions could include, for example, a failure of node G or one of the links between node G and its neighbors, or some other condition causing transmission from D to G to L to be noncompliant with a desired performance metric. In an embodiment, tree 500 is generated in response to detection of a problem with tree 300, and its tree ID value is communicated to the nodes in network 200, along with associated forwarding information to populate forwarding tables such as tables 502 and 504 or associated flow information (such as multicast group identifiers and intended egress nodes) to populate group membership tables such as table 506. In some embodiments, tree ID 0 is maintained in the forwarding tables for some length of time even when not being used to encapsulate incoming packets. This may be useful in the event that the change in network conditions causing a switch to a different tree is later resolved and the original tree is put into use again. In such an embodiment, use of tree ID values may be monitored, either by a forwarding node or by a controller. If a tree ID represented in a forwarding table is not used for some identified length of time, the entries corresponding to the unused tree ID may be removed from the forwarding table. Such a monitoring and tree removal process can be beneficial in reducing memory requirements and table complexity at forwarding nodes.

An example of a table defining the paths included in trees 300, 400 and 500 is shown in FIG. 6A. In an embodiment, tree definition table 600 is stored at a network controller for the BIER-Tr network, or at a node configured to perform controller functions. Tree definition table 600 includes a tree ID column including tree ID values corresponding to the trees defined in the table. Table 600 also includes a set of columns for identifiers of successive nodes along each path from ingress node to egress node included in the tree identified by each tree ID value. Because each of trees 300, 400 and 500 (shown in FIGS. 3, 4, and 5) connects ingress node A to each of egress nodes J through O, each of the tree ID values in table 600 is associated with 6 rows, each containing a node sequence starting with A and ending with one of the egress nodes. Some of the paths, such as those in tree 400 or the path to egress node L in tree 500, include more nodes and therefore require more columns to define than others of the paths.

An example of an alternate form of a bit indexed forwarding table is shown in FIG. 6B. Bit indexed forwarding table 620 is configured for use at node E of network 200, and includes entries for trees 300, 400 and 500. In addition to the columns included in other bit indexed forwarding tables displayed herein, such as tables 502 and 504 of FIG. 5, table 620 includes a Set ID column and a Bit Position column. As noted above in the introduction to BIER forwarding, use of a set ID allows the same bit position to be assigned to more than one receiver or egress node, as long as the receivers are assigned different set ID values. In embodiments employing a set identifier, the set ID value is encapsulated into an incoming message at the BIER-Tr ingress node, along with the message bit array and tree ID value. At a BIER-Tr forwarding node, the tree ID and set ID values carried by the message are used to select the appropriate forwarding table entries to be used. In the embodiment of FIG. 6B, each of egress nodes J through O is assigned to set 0; only one set is needed since the total number of egress nodes is smaller than the number of available bit positions (eight) in the illustrated implementation of network 200.

The Bit Position column in table 620 is used to sort entries in table 620 in an alternative manner to that shown for the forwarding tables of FIGS. 3, 4, and 5. For a given tree ID and set ID, one entry is included in table 620 for each bit position corresponding to an egress node reachable from forwarding node E, where a reachable egress node in this context is on a path from node E within the tree corresponding to the tree ID. In the case of node E in network 200, the reachable egress nodes are nodes M, N and O, having bit positions 4, 5 and 6, respectively. In addition to the appropriate tree ID and set ID, the entry in table 620 for each bit position includes the neighbor node to be used in forwarding to the egress node corresponding to the bit position, and a neighbor bit array identifying bit positions of all egress nodes reachable using that neighbor. As shown in table 620, this arrangement results in three entries for each tree ID/set ID combination, one each for bit positions 4, 5 and 6. In the forwarding tables of FIGS. 3, 4 and 5, on the other hand, the number of entries for each tree ID is determined by the number of neighbors used to forward to the reachable egress nodes, resulting in either one or two entries for each tree ID in the tables shown.

The different entry structure and sorting of table 620 as compared to the forwarding tables of FIGS. 3, 4 and 5 can be used in a variation of the BIER forwarding process carried out at a forwarding node. In the process described above in the introduction to BIER forwarding, the message bit array carried by a received message is compared to the neighbor bit array in each forwarding table entry, to determine whether a copy of the message should be sent to the neighbor node identified in the entry. As an alternative to this process of comparing the message bit array to the neighbor bit array for each neighbor in the forwarding table, a process using forwarding table 620 of FIG. 6B includes first identifying a set bit in the message bit array of the received message. When a set bit is found, the forwarding table is checked for an entry including the bit position of that set bit. In networks for which the number of intended egress nodes or receivers for a received message (represented by set bits in the message bit array, according to the bit value convention used herein) is typically smaller than the total number of neighbor nodes represented in a bit indexed forwarding table, use of this alternative approach can be computationally efficient.

The tables of FIGS. 6A and 6B, along with any other tables described herein, are intended to illustrate certain kinds of data being provided without limiting the format or arrangement of such data. For example, values shown subtending multiple rows of certain tables, such as tree ID or set ID values in tables 600 and 620, may be implemented as multiple instances of each value, one in each row. As another example, bit positions of reachable egress nodes in a forwarding table such as table 620 may in some embodiments be encoded as one or more separate bit position numbers rather than with bit values in a bit array. Tables as described herein may have data arranged in multiple different ways, and may take the form of a database or some other data structure. Multiple tables for a single node may in an alternative embodiment take the form of portions of a single table. Single tables described herein may in alternate embodiments be split into more than one data structure. "Table" as used herein may refer to a relevant portion of a table or other data structure, or to a collection of multiple tables or data structures holding related data. Embodiments of the tables described herein may also include other data not expressly shown, such as interface information or other information that may typically be stored at network nodes.

An additional embodiment of a table defining paths included in network trees is shown in FIG. 7A. Tree definition and performance table 700 of FIG. 7A includes path information for trees 300 and 400 similar to that shown in FIG. 6A. In addition, table 700 includes a performance metric value for each path. In the embodiment of FIG. 7A, the performance metric is path delay in milliseconds. Other performance metrics can be used in other embodiments. The performance data may be obtained in various ways that will be apparent to those of ordinary skill in the art of computer networking in view of this disclosure. For example, performance information may be obtained through sending of test packets designed according to various testing protocols, and monitoring the timing and content of return test packets. In some embodiments, performance information is obtained using a network flow analyzer. Such a flow analyzer may, in an embodiment, take the form of a separate device in communication with the network controller or other device maintaining tree definition and performance table 700. Alternatively, a network flow analyzer may take the form of a flow analysis module or engine within the controller or other device maintaining table 700.

Figures 7C, 18B:
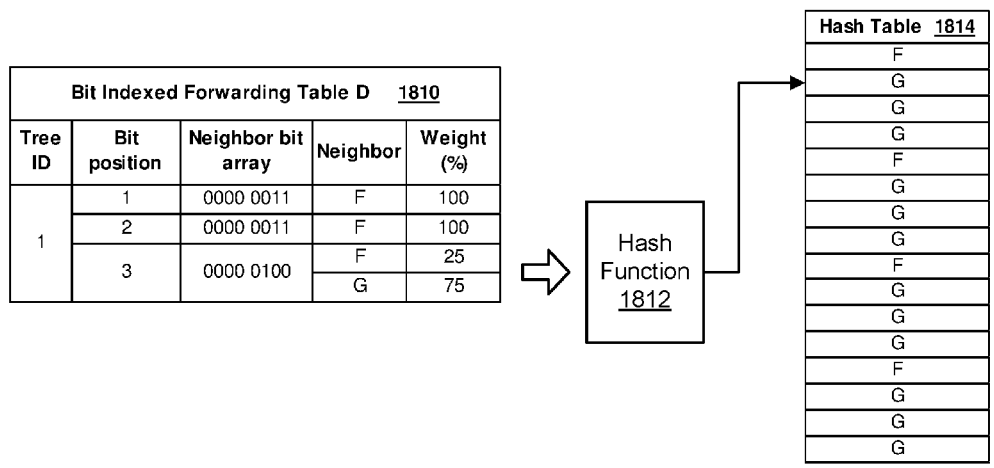

FIGS. 7A, 7B and 7C illustrate embodiments of a tree definition and performance table at three different points in time. At time T1, corresponding to FIG. 7A, table 700 includes tree 300 (as shown in FIG. 3, with a tree ID value of 0) and tree 400 (as shown in FIG. 4, with a tree ID value of 1). The configuration of table 700 is consistent with the state of network 200 as shown in FIG. 4: tree IDs 0 and 1 are programmed into the bit indexed forwarding tables of the network, and group membership table 406 is configured for use by ingress node A to encapsulate messages from groups G1 and G2 with tree ID 0 and messages from groups G3 and G4 with tree ID 1. The Performance (Path Delay) column of table 700 includes the delay, or message propagation time, in milliseconds for each path. For example, the time for a message to traverse the path from ingress node A to egress node J using tree 300 (assigned tree ID 0) is 15 milliseconds. The time for a message to traverse the path from node A to egress node M using tree 400 (assigned tree ID 1) is 24 milliseconds. In an embodiment, performance data such as that in table 700 is used to monitor compliance with a policy. One example of a policy could be that path delays for transmission using the tree assigned tree ID 0 must be 25 milliseconds or less, while path delays for transmission using the tree assigned tree ID 1 must be 50 milliseconds or less. Such a policy could be used in a network implementation in which different trees are used to provide different levels of service. Because all of the path delays shown in table 700 have values of 24 milliseconds or less, the network would be compliant with this particular policy at time T1.

An embodiment of the tree definition and performance table shown in FIG. 7A, but at a subsequent point in time T2, is shown in FIG. 7B. Tree definition and performance table 720 includes the same tree definition information as table 700 of FIG. 7A, but the performance information has changed with time, as shown by the path delay values in table 720. While path delays for most of the paths are only slightly different than at time T1, delays for the path from A to L using tree 300 and the path from A to L using tree 400 have increased to 40 milliseconds and 45 milliseconds, respectively. Comparison with other paths having nodes in common with the A-to-L path but with path delays that are not substantially changed compared to time T1 suggests that the path delay increase is associated with the portion of the path extending from node D to node L through node G. Reconsidering at time T2 the example policy described above (path delay of 25 milliseconds or less for the tree with tree ID 0, path delay of 50 milliseconds or less for the tree with tree ID 1), it can be seen that tree 300 (with tree ID 0) is now out of compliance with the policy, because one path has a path delay greater than 25 milliseconds. Tree 400 (with a tree ID value of 1) is still in compliance, however, since the policy allows its path delays to be as high as 50 milliseconds.

An embodiment of the tree definition and performance table at a still later time T3 is shown in FIG. 7C. Tree definition and performance table 740 of FIG. 7C includes definition and performance information for tree 500 (as shown in FIG. 5, with a tree ID value of 2). The configuration of table 740 is consistent with the state of network 200 as shown in FIG. 5: tree IDs 0, 1 and 2 are programmed into the bit indexed forwarding tables of the network, and group membership table 506 is configured for use by ingress node A to encapsulate messages from groups G1 and G2 with a tree ID value of 2 instead of 0. It can be seen from the path definition information of table 740, or from the depiction of tree 500 in FIG. 5, that the path from node A to node L in tree 500 goes through nodes F and K rather than node G. In the embodiment of FIG. 7C, this path has a path delay of 20 milliseconds, rather than the 40-millisecond delay of the path from node A to node L in tree 300. Switching from tree 300 to tree 500 for messages in groups G1 and G2 therefore brings the transmission of those messages back into compliance with the policy. Use of performance metric monitoring in conjunction with tree-based BIER forwarding can therefore allow effective implementation of policy based routing.

Figure 8:
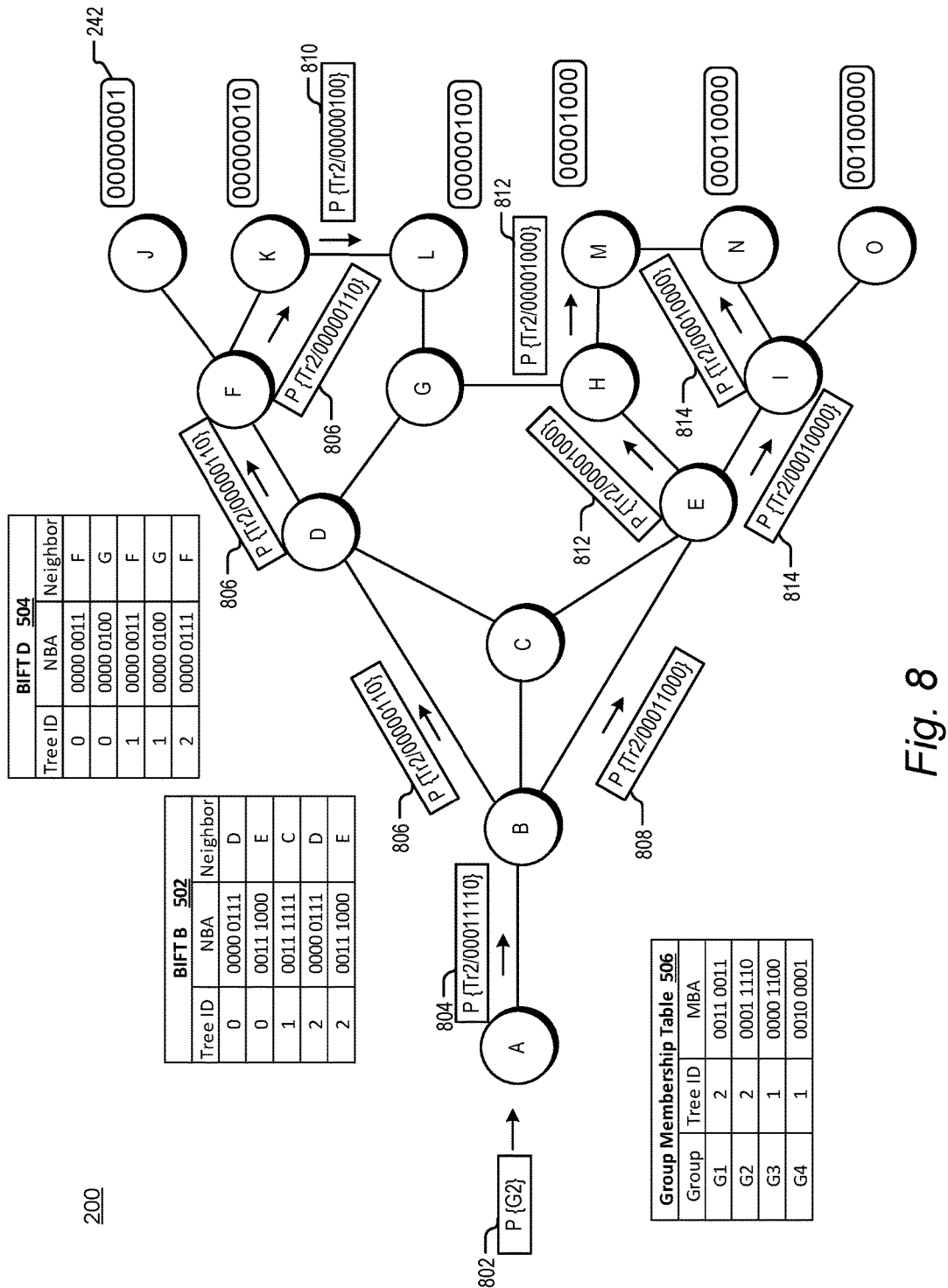
FIG. 8 is a diagram illustrating BIER-Tr forwarding through the network of FIG. 2.

An example of forwarding a multicast message through network 200 is illustrated by FIG. 8. Network 200 of FIG. 8 is configured with the bit indexed forwarding tables and group membership table shown in, and described above in connection with, FIG. 5. In the embodiment of FIG. 8, the incoming message is a packet 802 designated for the multicast group having identifier G2. In an embodiment for which packet 802 is an IP packet, for example, G2 is a group address carried by the packet. In a similar manner to that shown in FIG. 1B above, icons representing multicast messages, such as incoming packet 802, are superimposed onto the diagram of network 200, along with arrows to show direction of travel. The icons represent snapshots taken at successive times as the message (or replicas of the message) moves through the network in the direction of the arrows. Upon receiving packet 802, ingress node A accesses group address G2 in the packet, then uses group membership table 506 to select the appropriate tree ID value and message bit array to use in encapsulating the packet for BIER-Tr forwarding. This results in BIER-Tr packet 804, now carrying a tree ID value of 2 and a message bit array having set bits at bit positions 2, 3, 4 and 5 (corresponding to egress nodes K, L, M and N). In an embodiment, node A forwards packet 804 using a bit indexed forwarding table (not shown) directing that all BIER-Tr messages intended for egress nodes J through O be forwarded to node B.

In response to receiving packet 804, node B replicates and forwards the packet according to its bit indexed forwarding table 502. In an embodiment, the forwarding engine at node B first accesses the tree identifier value from incoming packet 804 to determine which forwarding table (or in this case, which portion of forwarding table 502) to use. Using the forwarding table entries for a tree ID value of 2, replica 806 of the packet is forwarded to node D and replica 808 is forwarded to node E. In the embodiment of FIG. 8, each replica packet carries a forwarded message bit array in which set bits in bit positions corresponding to egress nodes not reachable from the neighbor node the packet is being forwarded to are reset. Accordingly, bits in bit positions 4 and 5 are reset in the forwarded message bit array of replica 806, and bits in bit positions 2 and 3 are reset in the forwarded message bit array of replica 808. This modification of bits in the forwarded message bit array can help prevent packet duplication and looping, as discussed in connection with FIG. 1B above.

In response to receiving packet 806, node D forwards the packet according to its bit indexed forwarding table 504. According to the forwarding table entry for tree ID 2, a message having any of bit positions 1, 2 or 3 set in its message bit array is forwarded to node F. This results in packet 806 being forwarded to node F without modification. Node F in turn forwards packet 806 to node K. The bit indexed forwarding table for node F is not shown in FIG. 8, but inspection of tree 500 in FIG. 5 shows that node F is programmed to forward messages intended for egress nodes K or L to node K. Node K is an egress node having an assigned bit position. Determining that node K is one of the intended BIER-Tr destination nodes for incoming message 806 (because the message bit array includes a set bit in node K's assigned bit position 2), the forwarding engine at node K removes the BIER-Tr encapsulation from a replica of the message and forwards it to its intended receiver via the protocol or protocols being used outside the BIER-Tr domain implemented by network 200. In addition to being an egress node, node K acts as a forwarding node for messages directed to node L using tree 500. According to a bit indexed forwarding table at node K (not shown), replica 810 of incoming packet 806 is forwarded to node L with a forwarded message bit array modified to remove the set bit in node K's assigned bit position. At node L, its intended BIER-Tr destination, the BIER-Tr encapsulation of message 810 is removed, and the message is forwarded to its intended receiver via the protocol(s) in use outside of the BIER-Tr domain.

Forwarding of replica packet 808 received at node E proceeds in a similar manner to that described above for other parts of the BIER-Tr network. As can be seen from the embodiment shown in FIG. 6B for a forwarding table at node E, messages intended for bit position 4 (node M) are forwarded to node H, and those intended for bit position 5 (node N) are forwarded to node I. The forwarding engine at node E accordingly sends a replica 812 to node H and replica 814 to node I. Node H in turn forwards replica 812 to node M, its intended BIER-Tr destination, and node I forwards replica 814 to node N.

Figure 9A:
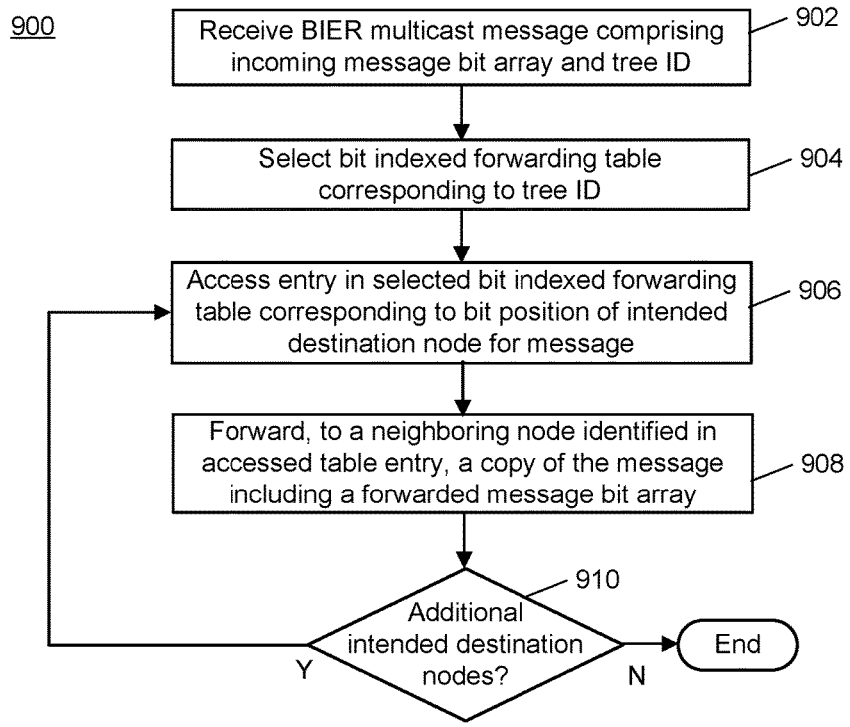
FIG. 9A is a flowchart illustrating an example of a method performed at a forwarding node of a network described herein.

An embodiment of a forwarding method for use in a BIER-Tr network is illustrated by the flowchart of FIG. 9A. In an embodiment, method 900 of FIG. 9A is carried out by a forwarding engine at a node in a BIER-Tr network. Method 900 begins in step 902, with receiving a BIER multicast message comprising an incoming message bit array and a tree ID. Such as message is also referred to as a BIER-Tr message herein. A bit indexed forwarding table corresponding to the tree ID is then selected (step 904). In an embodiment, the selected table is a portion, or subset of the entries of, a larger bit indexed forwarding table. The method continues with accessing an entry in the selected forwarding table corresponding to a bit position of an intended destination node for the received message (step 906). As noted above, accessing the forwarding table entry corresponding to the bit position of an intended destination node is done in some embodiments by comparing the message bit array with a neighbor bit array in the forwarding table entry. Alternatively, the forwarding table entry can be accessed by first determining the position of a set bit in the message bit array (i.e., a bit position of an intended egress or destination node) and then checking for a forwarding table entry corresponding to that bit position. In either case, the method continues by forwarding, to a neighbor node identified in the forwarding table entry, a copy of the message including a forwarded message bit array (step 908). The forwarded message bit array is in some embodiments a modified version of the incoming message bit array from the received message. If there are additional intended destination nodes that have not had message replicas forwarded to them yet (decision step 910), a new forwarding table entry is accessed and the replication/forwarding is repeated until there are no remaining destination nodes.

Figure 9B:
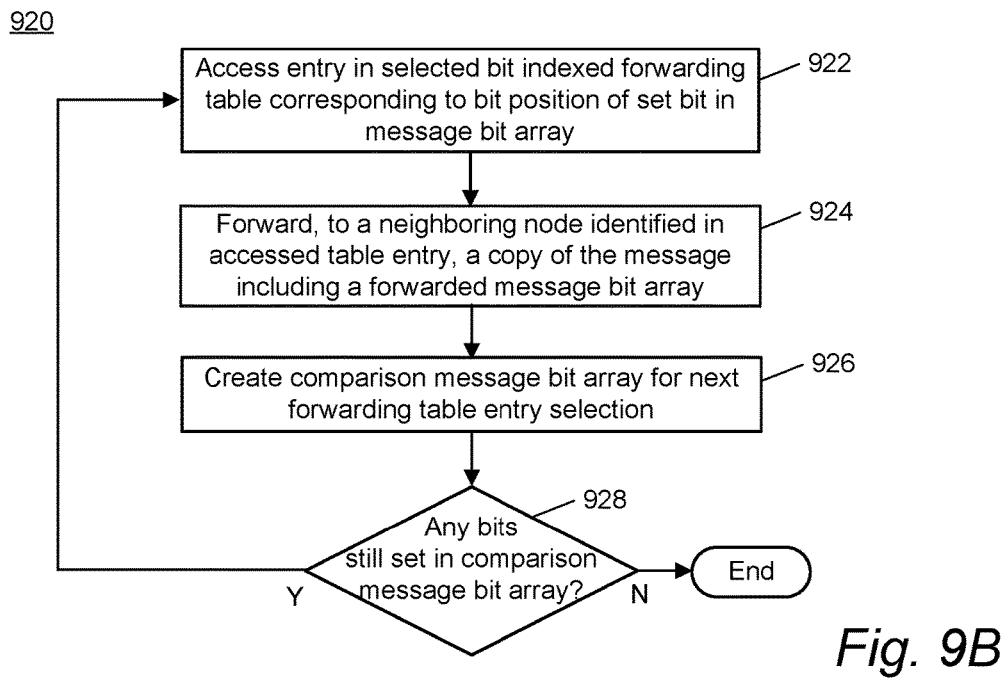
FIG. 9B is a flowchart illustrating an example of a variation of the method of FIG. 9A.

The flowchart of FIG. 9B describes a more detailed sub-method for an embodiment in which the bit indexed forwarding table is sorted by bit position, in a manner similar to that of table 620 in FIG. 6B. In an embodiment, sub-method 920 of FIG. 9B can replace steps 906 through 910 of the more general method 900 in FIG. 9A. Submethod 920 begins with accessing an entry in the selected bit indexed forwarding table corresponding to the bit position of a set bit in the message bit array (step 922). A copy of the message including a forwarded message bit array is then forwarded to the neighboring node identified in the accessed table entry (step 924). As described above in connection with, for example, replicas 806 and 808 of FIG. 8, the forwarded message bit array in some embodiments includes set bits only in bit positions of intended destination nodes that are reachable from the neighbor the message copy is being forwarded to.

Method 920 continues with creation of a comparison message bit array to be used in the next forwarding table entry selection (step 926). In methods using a forwarding table sorted by bit position, such as table 620 in FIG. 6B, there is a potential for duplication of packets in cases where multiple forwarding table entries identify the same neighbor node. This potential can be seen by examination of table 620. For a given tree ID and set ID, there are two entries having node I as the neighbor node: the entry for bit position 5 and the entry for bit position 6. If an incoming message has a message bit array with set bits in both bit positions 5 and 6, sub-method 20 may proceed by detecting the set bit in bit position 5, selecting the forwarding table entry corresponding to bit position 5, and forwarding a replica to neighbor I, where the forwarded replica also has set bits in bit positions 5 and 6. Once this replica reaches neighbor I, it will be replicated in turn to send a one copy to node N and one to node O. As method 920 continues, if the set bit in bit position 6 of the incoming message bit array is then detected, and the forwarding table entry for bit position 6 accessed for forwarding, an additional replica will be forwarded to node I, and again replicated to nodes N and O. It is therefore important to account for the fact that the message forwarded using the entry for bit position 5 carried a message bit array with a set bit for bit position 6 as well. In the embodiment of FIG. 9B, this is done by creating a comparison message bit array (in step 926) in which the destinations of the just-sent message are removed as intended destinations in the comparison message bit array. In the case of the example described above with the entry for bit position 5 in table 620, a comparison message bit array would be created having zeros in both bit positions 5 and 6 after forwarding of a replica having a message bit array with ones in those bit positions.

The comparison message bit array created in step 926 (and typically stored in a suitable set of memory locations such as a register or buffer) is then used when determining in step 928 whether any bits in the message bit array are still set. If so, the forwarding table entry selection and replica forwarding is repeated ("yes" branch of decision step 928) until no set bits remain. In an alternative embodiment, the intended destinations of a just-sent message can be accounted for in another way, such as by setting a bit in a scratch buffer (or other suitable location) for each bit position that a forwarded packet has already been directed to. In such an embodiment sub-method 920 could be modified, when checking for set bits in the incoming message bit array, to also make sure that the bit position of a set bit was not also set in the scratch buffer before accessing a forwarding table entry for that bit position.

Figure 10A:
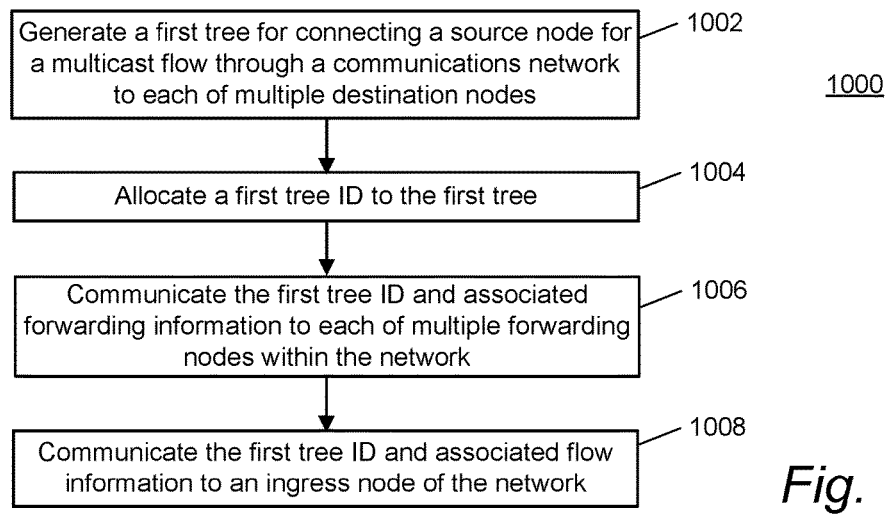
FIG. 10A is a flowchart illustrating an example of a method for configuring a network as described herein.

An embodiment of a method for configuring a tree-based network is illustrated by the flowchart of FIG. 10A. In an embodiment, method 1000 of FIG. 10A is performed by a network controller such as controller 240 of FIG. 2. Alternatively, method 1000 may be performed by a node, such as an ingress node, configured to perform certain controller functions. Method 1000 begins, at step 1002, with generating a first tree for connecting a source node for a multicast flow through a communications network to each of multiple destination nodes. In an embodiment, the communications network is a BIER-enabled network, and method 1000 is a method for configuring a BIER-Tr network. Method 1000 continues with allocating a first tree ID to the first tree (step 1004). In an embodiment, a data structure relating the allocated tree ID to information defining the set of paths comprising the tree is stored at the device performing method 1000. Tree definition table 600 of FIG. 6A is one example of such a data structure.

Method 1000 continues with communicating the first tree ID and associated forwarding information to each of multiple forwarding nodes within the network (step 1006). In an embodiment, the associated forwarding information communicated to a forwarding node along with a tree ID is information used to populate a forwarding table at the forwarding node. In a further embodiment, the forwarding information is used to populate a bit indexed forwarding table such as, for example, table 504 of FIG. 5 or table 620 of FIG. 6B. In an embodiment, the forwarding information includes identification of egress nodes reachable using a tree associated with an allocated tree ID. In a further embodiment, the forwarding information includes identification of one or more neighbor nodes via which the identified egress nodes are reachable within the tree associated with the allocated tree ID. In still further embodiments, the associated forwarding information includes bit position information for the identified egress nodes.

Method 1000 also includes communicating the first tree ID and associated flow information to an ingress node of the network (step 1008). A "flow" as used herein is a stream of one or more messages traveling between a particular source and a particular destination having a set of common properties. In an embodiment, the associated flow information communicated to an ingress node along with a tree ID is information used to populate an encapsulation table at the ingress node. In a further embodiment, the flow information is used to populate a BIER-Tr group membership table such as, for example, table 506 of FIG. 5. In an embodiment, the flow information includes multicast group and/or source information. In a further embodiment the flow information further includes identification of intended egress nodes for a given multicast flow. In still further embodiments, the associated flow information includes bit position information for the identified egress nodes.

Figure 10B:
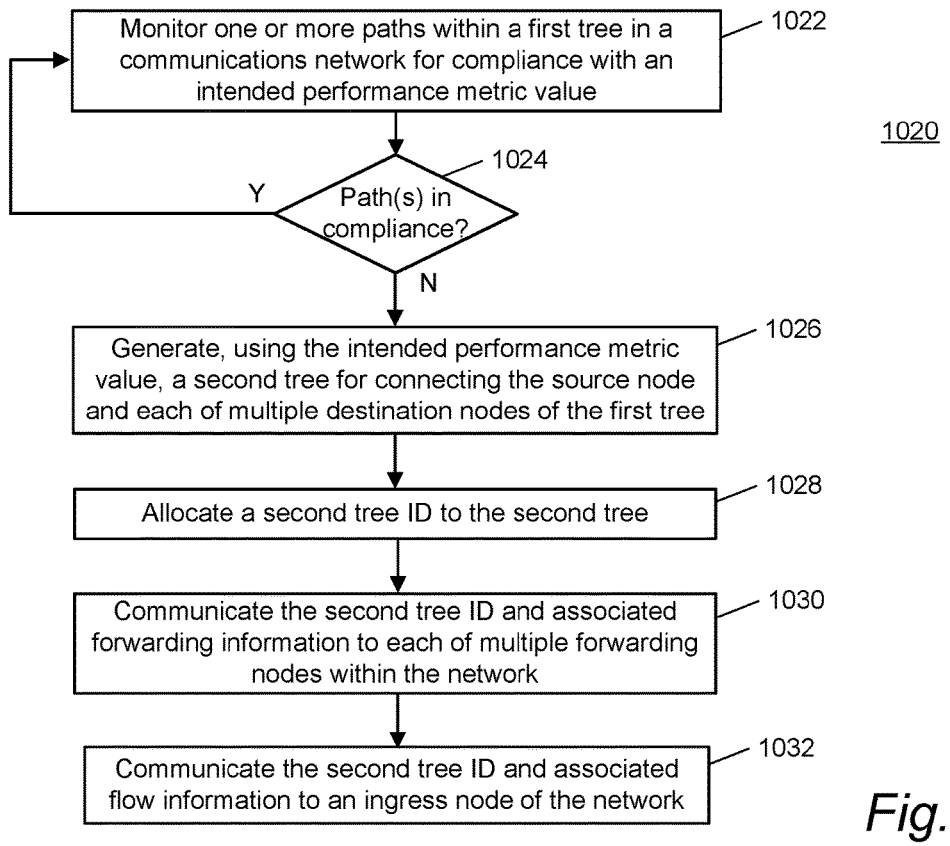
FIG. 10B is a flowchart illustrating an example of a method for configuring a network as described herein.

An embodiment of an additional method for configuring a tree-based network is illustrated by the flowchart of FIG. 10B. Like method 1000 of FIG. 10A, method 1020 of FIG. 10B is performed by a network controller in some embodiments, or by a node configured to perform certain controller functions. In an embodiment, method 1020 is performed in a network previously configured using method 1000. Method 1020 begins, at step 1022, with monitoring of one or more paths within a first tree in a communications network for compliance with an intended performance metric value. In an embodiment, a data structure relating a tree ID for the first tree to one or more performance metric values for paths within the tree is stored at the device performing network 1020. Tree definition and performance table 700 in FIG. 7A is one example of such a data structure. In an embodiment, the performance metric value is a path delay or latency value. Any performance metric of interest may be monitored in other embodiments, including, for example, bandwidth, bit error rate, or uptime, as well as any combinations of suitable performance metrics. As discussed above in connection with FIG. 7A, performance metric data may be obtained in various ways, including use of test packets and/or interaction with a network flow analyzer. In an embodiment, the intended performance metric value is associated with a policy for the network implementation.

If one or more paths are found to be out of compliance with the intended performance metric value ("no" branch of decision step 1024), a second tree is generated using the intended performance metric value (step 1026). In an embodiment, the second tree is generated in a manner predicted to provide performance in compliance with the intended performance metric. The second tree connects the source node of the first tree to each of multiple destination nodes of the first tree. In an embodiment, the second tree connects to all of the destination nodes connected by the first tree. Method 1020 continues with allocating a second tree ID to the second tree (step 1028). In an embodiment, a first tree ID has been previously allocated to the first tree. A data structure relating the allocated second tree ID to information defining the set of paths comprising the second tree is stored, in some embodiments, at the device performing method 1020. For example, a table such as tree definition table 600 of FIG. 6A or tree definition and performance table 700 of FIG. 7A may be updated, in some embodiments, to include the second tree and second tree ID.

Method 1020 continues with communicating the second tree ID and associated forwarding information to each of multiple forwarding nodes within the network (step 1030). As discussed above in connection with step 1006 of method 1000, the associated forwarding information is, in an embodiment, information used to populate a forwarding table at the forwarding node. For example, a forwarding table such as table 304 of FIG. 3 or table 404 of FIG. 4 is updated, in some embodiments, to include the second tree ID and associated neighbor node and egress node information. Method 1020 also includes communicating the second tree ID and associated flow information to an ingress node of the network (step 1032). As discussed above in connection with step 1008 of method 1000, the associated flow information is, in an embodiment, information used to populate an encapsulation table at the ingress node. For example, a bit indexed group membership table such as table 406 of FIG. 4 is updated, in some embodiments, to include the second tree ID and associated multicast group information and egress node information. In a further embodiment, a group membership table is updated to replace a first tree ID with the second tree ID, so that a flow is switched from the first tree to the second tree.

An embodiment of a method for encapsulating a message for forwarding through a tree-based network is illustrated by the flowchart of FIG. 10C. In an embodiment, the network is a BIER-Tr network and method 1040 is performed by an ingress node of the network. In an alternative embodiment, method 1040 is performed by a special-purpose device such as a video source or video transmission device. Method 1040 begins, at step 1042, with obtaining a multicast flow identifier from a received multicast message. In an embodiment in which the received message is an IP multicast packet, for example, obtaining the flow identifier comprises reading an IP group address from the destination address field of the IP packet. In some embodiments, identification of the source by reading of the IP source address of an incoming IP packet may be sufficient to identify the flow. Method 1040 continues with accessing a bit array encapsulation table to obtain a tree ID and message bit array corresponding to the multicast flow identifier (step 1044). A group membership table such as table 506 of FIG. 5 is an example of a bit array encapsulation table that can be accessed.

Method 1040 continues with encapsulation of the received multicast message with the tree identifier and message bit array (step 1046). In an embodiment, the message is also encapsulated with a set identifier. As discussed above in connection with, for example, group membership table 306 in FIG. 3, various types of encapsulation may be used to attach BIER-Tr information to a message. The encapsulated message is then transferred to a tree-based BIER forwarding engine (step 1048) for forwarding within the BIER-Tr network. In an embodiment, the forwarding engine is within an ingress node of the tree-based network. In a further embodiment, encapsulation and forwarding functions at an ingress node are combined into a single module.

IP-Based BIER Encapsulation

As noted elsewhere in this disclosure, various encapsulation mechanisms can be used to attach BIER or BIER-Tr information to a message for forwarding within a BIER or BIER-Tr domain. A new IP-based encapsulation format is described in connection with FIGS. 11A-17. The new format allows encapsulation of a conventional IP packet, such as an IPv4 or IPv6 packet, while minimizing the requirement for specialized BIER extensions to existing protocols.

An embodiment of a header format for a packet using the new encapsulation is illustrated by the diagram of FIG. 11A. In general terms, the encapsulated packet 1100 includes a payload 1102, inner IP header 1104, intervening header 1106, transport header 1108, and outer IP header 1110. The payload 1102, for purposes of FIG. 11A, includes the data payload of the IP packet being encapsulated along with any other headers inside of the inner IP header of the original packet. In an embodiment, for example, payload 1102 includes a transport header of the original IP packet. Inner IP header 1104 includes IP source address field 1112 and IP destination address field 1114 of the original IP packet. For an IP multicast packet, for example, destination address field 1114 stores an IP multicast group address for the original IP packet. In an embodiment, inner IP header 1104 also includes other fields not shown in FIG. 11A. Once the original IP packet is encapsulated to form encapsulated packet 1100, inner IP header 1104 is not used in forwarding the encapsulated packet through a BIER or BIER-Tr domain.

Intervening header 1106 is outside of inner IP header 1104, and carries the BIER-related information the packet is encapsulated with. In one embodiment, intervening header 1106 includes a service header, such as a Network Service Header (NSH). In another embodiment, intervening header 1106 includes a metadata header. Intervening header 1106 may, in various embodiments, take the form of any extensible header allowing BIER-related information to be stored. An extensible header as used herein is a header designed so that users or developers can configure or expand its capabilities. In the embodiment of FIG. 11A, intervening header 1106 includes a tree ID field 1116, a set ID field 1118 and a message bit array field 1120. Encapsulated packet 1100 is configured to allow forwarding in a tree-based BIER network including multiple sets of egress nodes having assigned BIER bit positions. An encapsulation format similar to that of FIG. 11A may also be used for BIER networks not employing tree identifiers. In such an embodiment, tree ID field 1116 may be omitted or, alternatively, left unused. In a BIER or BIER-Tr network not configured to use sets of egress nodes, set ID field 1118 may similarly be omitted or left unused. The BIER-related information within intervening header 1106 is accessed by forwarding nodes within the BIER or BIER-Tr network, and the message bit array in message bit array field 1120 may be modified as the encapsulated message is forwarded.

Transport header 1108 is a transport header adapted for use with outer IP header 1110. In an embodiment transport header 1108 is a User Datagram Protocol (UDP) header. Headers for other transport layer protocols such as Transmission Control Protocol (TCP) may also be suitable in other embodiments. Outer IP header 1110 includes a source address field 1122 and destination address field 1124. In an embodiment, an IP address of the ingress node of the BIER or BIER-Tr network is written to source address field 1122 of outer IP header 1110. In a further embodiment, an IP address assigned to an egress interface of the ingress node is written to source address field 1122. Destination address field 1124 is written to by each forwarding node in the BIER or BIER-Tr network. In an embodiment, an IP address of the neighbor node identified by the appropriate entry of the forwarding node's bit indexed forwarding table is written to destination address field 1124. In a further embodiment, an IP address assigned to an ingress interface of the neighbor node identified by the forwarding table is written to destination address field 1124.

A more detailed embodiment of an intervening header implemented as an NSH is illustrated in FIG. 11B. Network service headers are described further in, for example, "Network Service Header," by P. Quinn and U. Elzur, Eds., Internet-Draft, Sep. 20, 2016, available at https://tools.ietf.org/pdf/draft-ietf-sfc-nsh-12.pdf, which document is hereby incorporated by reference as if completely set forth herein. In an embodiment, an NSH includes a base header, a service path header, and one or more context headers. In the embodiment of FIG. 11B, NSH header 1130 includes a base header 1132, service path header 1134 and context header 1136. The context header includes the BIER-related information. In some embodiments, header 1130 includes additional context headers not shown. In addition to carrying BIER-related information, NSH 1130 may include service path information in one or more of headers 1132, 1134 and 1136, or in additional headers not shown.

A more detailed embodiment of an intervening header implemented as a metadata header is illustrated in FIG. 11C. Metadata headers are described further in, for example, "Common Metadata Header Format for IP/MPLS Networks," by J. Guichard, S. Spraggs, C. Pignataro, Ed., and S. Bryant, Internet-Draft, Jun. 12, 2013, available at https://tools.ietf.org/html/draft-guichard-metadata-header-00, which document is hereby incorporated by reference as if completely set forth herein. In an embodiment, a metadata header or component includes a metadata channel header and a metadata channel which carries the metadata. In the embodiment of FIG. 11C, metadata header 1140 includes a metadata channel header 1142 and metadata channel 1144, where the metadata channel includes the BIER-related information. In addition to carrying BIER-related information, metadata header 1140 may include metadata for other purposes, such as service chaining.

The header diagrams of FIGS. 11A-11C, along with any other such diagrams included in this disclosure, are intended to illustrate certain kinds of data being provided without otherwise limiting the format or arrangement of such data. As an example, the tree ID, set ID and message bit array fields shown within intervening header embodiments may be arranged in a different order in other embodiments. The header sequences shown may also, in some embodiments, include additional headers or fields not shown. For example, a field, flag, or other indicator may be included in some embodiments to indicate that a message is a BIER message or a BIER-Tr message. In other embodiments, use of BIER or BIER-Tr may be determined via the presence of certain types of BIER-related information, or via the absence of certain other types of forwarding information.

Figure 12A:
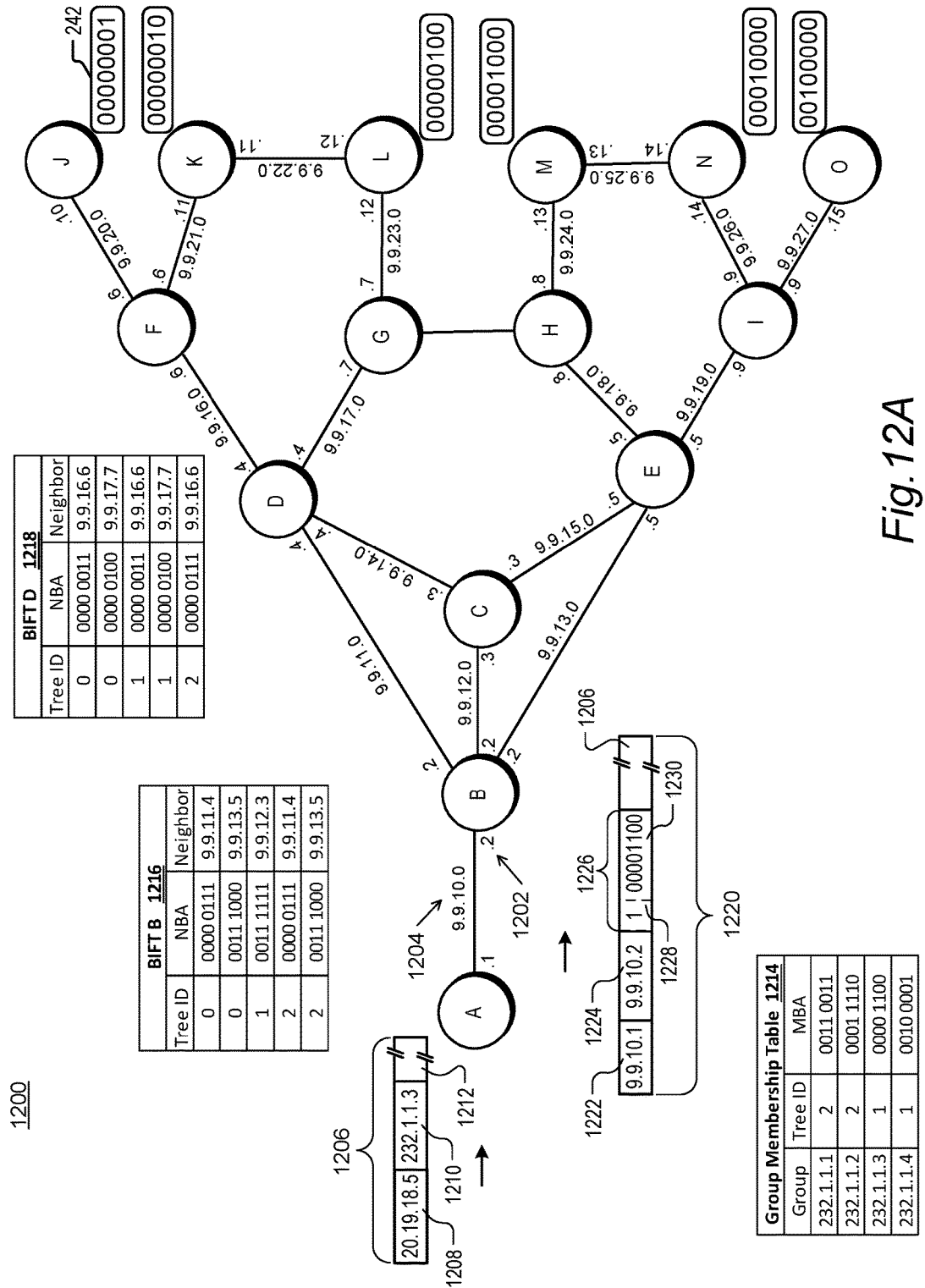
FIG. 12A is a simplified block diagram illustrating certain components of an example network configured for an IP-based message encapsulation.

An example of a network configured for tree-based BIER using the new IP-based encapsulation described above is shown in FIG. 12A. Network 1200 of FIG. 12A includes the nodes and topology of network 200 of FIG. 2A. In an embodiment, network 1200 is configured and managed using a controller (not shown), such as controller 240 of FIG. 2. An IP addressing scheme is employed in network 1200 to facilitate use of IP-based BIER encapsulation. In the embodiment of FIG. 12A, each node is assigned a different numeral for the host part 1202 of the IP address of each of that node's interfaces. For example, node B is assigned a host part numeral of 2, denoted by a "0.2" marked at each of its interfaces. Similarly, node N is assigned a host part number of 14. Each link between nodes is assigned a different network prefix 1204. For example, the network prefix for the link between nodes A and B is 9.9.10.0, while that between nodes I and N is 9.9.26.0. In the address assignment scheme of FIG. 12A, the IP address of each interface within network 1200 is a combination of the appropriate network prefix with the node's host number. For example, the interface at node A for the link between nodes A and B is assigned IP address 9.9.10.1, while the interface at node B for the same link is assigned IP address 9.9.10.2. The interface at node B for the link between nodes B and D is 9.9.11.2, and so on throughout the network. It is noted that the addressing scheme of FIG. 12A is merely exemplary, and other IP addressing schemes may be used. Although network 1200 is configured with IPv4 addresses, IPv6 addresses may also be used in other embodiments, as may future IP versions compatible with the encapsulation concepts disclosed herein.

In the embodiment of FIG. 12A, network 1200 is configured to use the same trees as network 200 shown in FIGS. 3-5: tree 300 having a tree ID value of 0, tree 400 with a tree ID value of 1 and tree 500 with a tree ID value of 2. This tree assignment is reflected in the bit indexed forwarding tables shown in FIG. 12A: table 1216 for node B and table 1218 for node D. Forwarding table 1216 includes information similar to that of table 502 of FIG. 5, except that identifiers of neighbor nodes C, D and E in table 502 are replaced in table 1216 with the respective IP addresses assigned to the ingress interfaces of each of these nodes on its link with node B. For example, the identifier for neighbor node D in table 502 is replaced in table 1216 with 9.9.11.4, which is the IP address assigned to the interface of node D at the link between nodes D and B. Similarly, forwarding table 1218 includes information similar to that of table 504 of FIG. 5, except that identifiers for neighbor nodes F and G in table 504 are replaced in table 1218 with the respective IP addresses assigned to the ingress interfaces of each of these nodes on its link with node D. For example, the identifier for neighbor node F in table 504 is replaced in table 1218 with 9.9.16.6, which is the IP address assigned to the interface of node F at the link between nodes F and D. It is noted that in some embodiments of tables 502 and 504 of FIG. 5, the neighbor node identifiers used may also take the form of IP addresses.

Group membership table 1214 of FIG. 12A is used at ingress node A in encapsulating an incoming IP packet with BIER or BIER-Tr information. Table 1214 includes similar information to table 506 of FIG. 5, except that the group identifiers in table 506 are replaced in table 1214 with examples of IP group addresses carried by incoming packets. For example, the multicast group identifier G1 of table 506 is replaced in table 1214 with IP group address 232.1.1.1. The IP group addresses shown in table 1214 correspond to addresses carried in destination address field 1114 of inner IP header 1104 of the encapsulated packet 1100 illustrated in FIG. 11A.

FIG. 12A includes an illustration of an incoming IP packet 1206 arriving at ingress node A of tree-based BIER network 1200. Packet 1206 includes a payload portion 1212, similar to payload portion 1102 of packet 1100 of FIG. 11A, as well as an IP source address field 1208 and IP destination address field 1210. Source address field 1208 and destination address field 1210 are similar to source address field 1112 and destination address field 1114, respectively, of packet 1100 of FIG. 11A. In the embodiment of FIG. 12A, destination address field 1210 of incoming packet 1206 carries multicast group address 232.1.1.3, which appears in group membership table 1214 at node A. Incoming IP packet 1206 is therefore encapsulated with a tree ID value of 1 and a message bit array of 0000 1100, according to the appropriate entry in table 1214, resulting in encapsulated BIER-Tr message 1220. In addition to the original IP packet 1206, message 1220 includes an intervening header 1226 with a tree ID field 1228 and message bit array field 1230. Intervening header 1226 is similar to intervening header 1106 of FIG. 11A, except that header 1226 does not carry a set identifier in this embodiment. The tree ID and message bit array fields of intervening header 1226 carry the values for these quantities obtained from group membership table 1214.

Encapsulated message 1220 also carries outer IP source address field 1222 and outer IP destination address field 1224. Fields 1222 and 1224 are similar to fields 1122 and 1124 of packet 1100 of FIG. 11A. In the embodiment of FIG. 12A, the IP address of the egress interface at node A for the link between nodes A and B is written into source address field 1222. This source address remains in place for the duration of message 1220's path through BIER-Tr domain 1200. Outer destination address field 1224 carries the IP address of the next-hop destination for the message. In the embodiment of FIG. 12A, a forwarding engine at node A therefore writes into field 1224 the IP address for the ingress interface at node B on the link between nodes A and B. In a further embodiment, this destination address is obtained from a bit indexed forwarding table at node A (not shown). Message 1220 is then forwarded through the BIER-Tr domain to the destinations identified in its message bit array, as described further below in connection with FIGS. 12B and 12C.

Figure 12B:
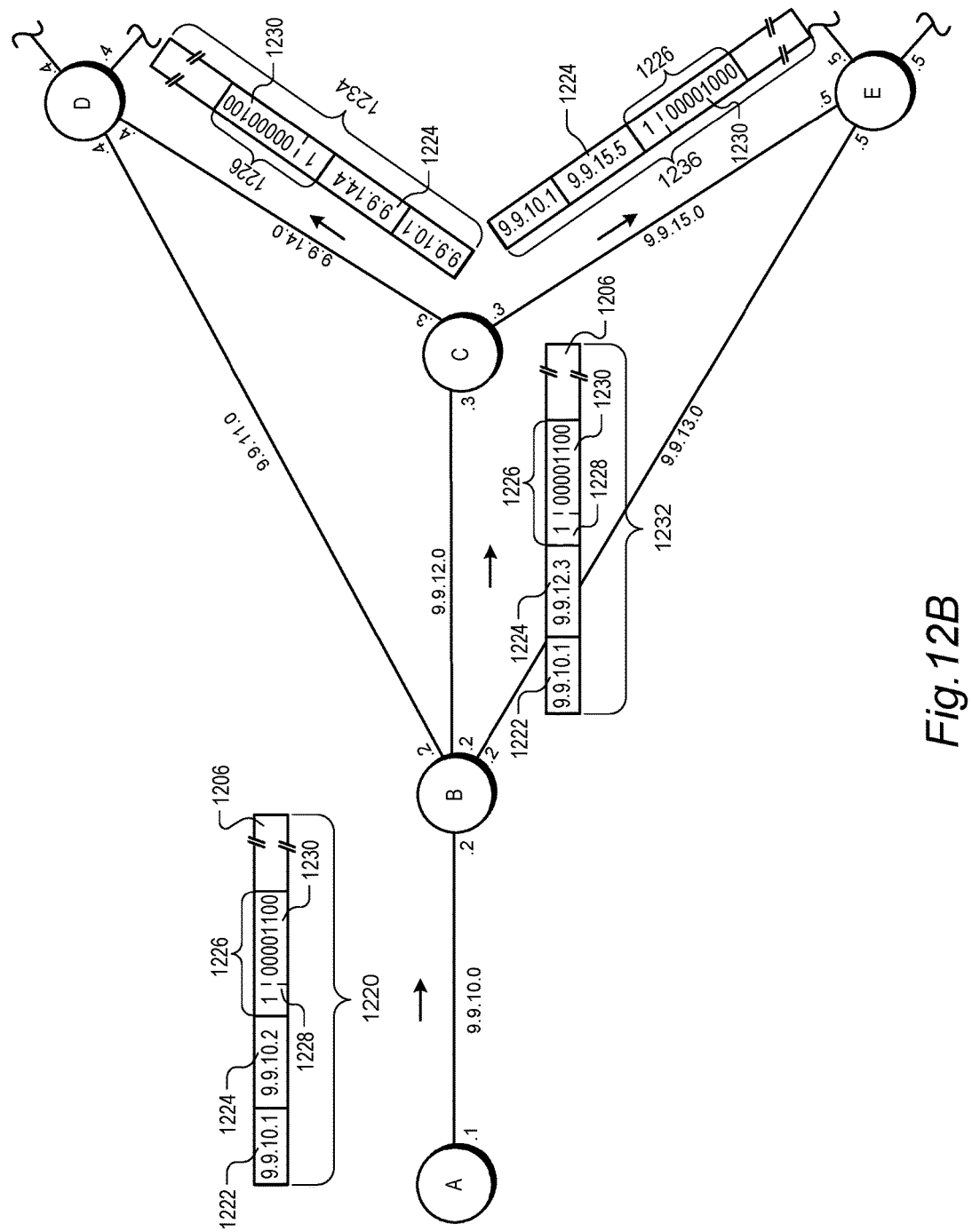
FIGS. 12B and 12C are diagrams illustrating BIER forwarding of IP-encapsulated messages through portions of the network of FIG. 12A.

A first portion of network 1200, including nodes A through E, is depicted in FIG. 12B with increased spacing between nodes to allow illustration of message forwarding using the IP-based encapsulation disclosed herein. As also shown in FIG. 12A, encapsulated message 1220 is directed from ingress node A to node B. When node B receives message 1220, a forwarding engine accesses the BIER-related information in intervening header 1226 along with the bit indexed forwarding table at node B to determine where to forward the message. Because the received message carries a tree ID value of 1, the entry in forwarding table 1216 (shown in FIG. 12A) having a tree ID value of 1 is accessed. This forwarding table entry directs messages for all of the BIER destination nodes to node C, specifying the IP address of the ingress interface of node C on the link between nodes B and C. The forwarding engine at node B accordingly replaces the outer IP destination address in field 1224 with the IP address of the node C interface to form encapsulated message 1232. Message 1232 is then sent to node C. In an embodiment, the IP-encapsulated messages described herein are sent from node to node using each node's unicast IP routing process.

When node C receives message 1332, it accesses the message's BIER-related information and its bit indexed forwarding table in a manner similar to that described for node B above. An example of a bit indexed forwarding table at node C is shown in FIG. 13A. Table 1300 of FIG. 13A is sorted by bit position in a manner similar to that shown for table 620 of FIG. 6B. Table 1300 includes entries only for the tree ID value of 1, because node C is not included in any trees except for tree 400 (having tree ID value 1) in the embodiment of network 1200. The message bit array of incoming message 1332 includes set bits in bit positions 3 and 4, so the corresponding entries of table 1300 are accessed by the forwarding engine at node C. According to the forwarding table, one replica of message 1332 is sent to node D, using the IP address of the ingress interface to node D on the link between nodes C and D. The forwarding engine at node C replaces the outer IP destination address in field 1224 with the IP address of the node D interface to form encapsulated message 1234. Another replica of the message is to be sent to node E according to the forwarding table, so the IP address of the ingress interface at node E on the link between nodes C and E is written to field 1224 to form encapsulated message 1236. In the embodiment of FIG. 12B, the message bit arrays in messages 1234 and 1236 are modified to reset bits corresponding to egress nodes not reachable from the node the message is being forwarded to. This modification is also described in connection with the discussion of FIG. 1B above.

Figure 12C:
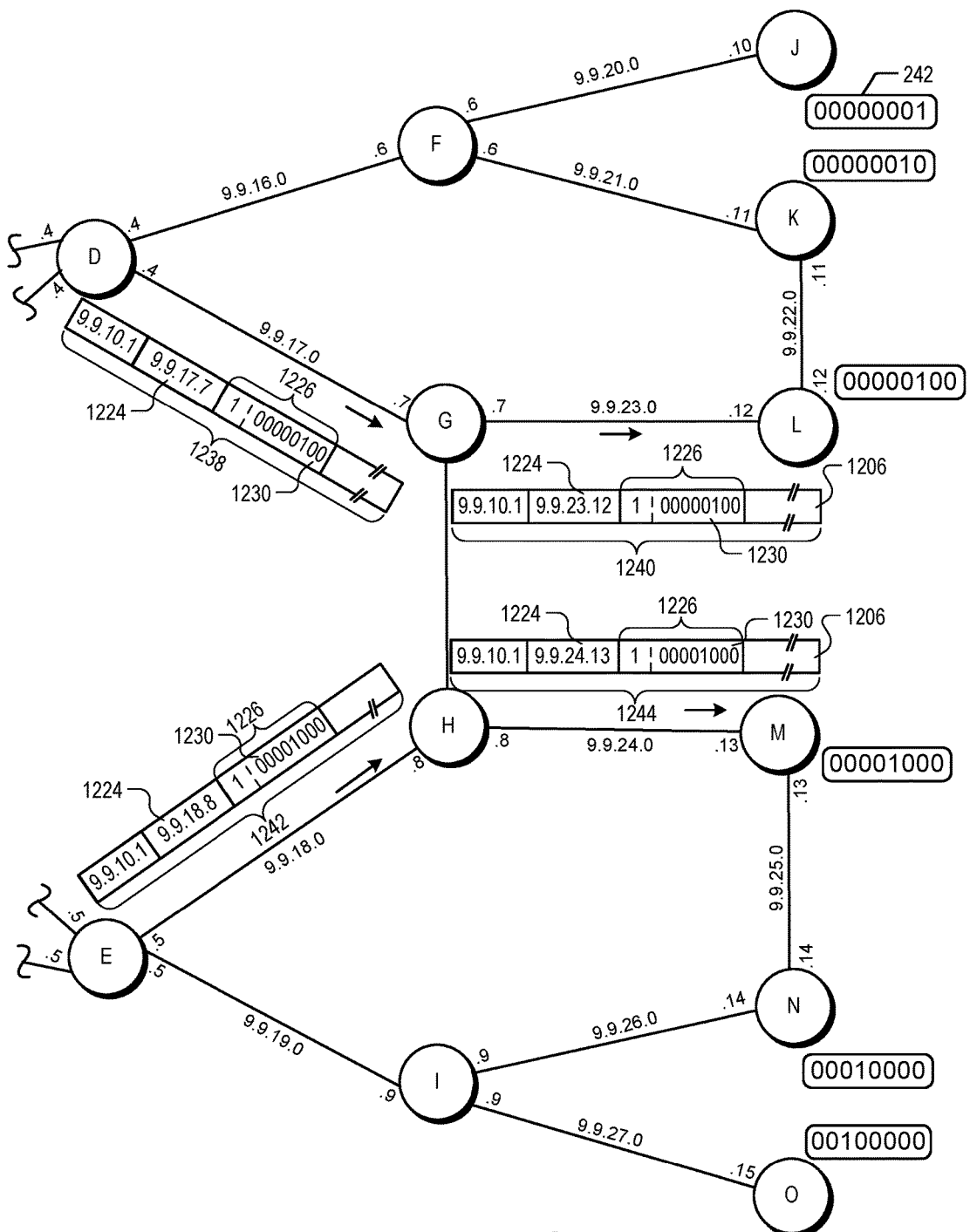

A second portion of network 1200, including nodes D through O, is depicted in FIG. 12C and used to illustrate a continuation of the forwarding process illustrated in FIG. 12B. When message 1234 of FIG. 12B arrives at node D, it is forwarded to node G using the IP address of the ingress interface at node G on the link between nodes D and G. This is in accordance with the entry for a tree ID value of 1 and a reachable bit position of 3 in forwarding table 1218 for node D, shown in FIG. 12A. The forwarding engine at node D replaces the outer IP destination address with the IP address for the node G interface to form encapsulated message 1238. An example of a bit indexed forwarding table for node G is shown in FIG. 13B. Table 1320 shows that for any of the trees defined for network 1200, node G has the task of forwarding to node L any message intended for that node, as indicated by a set bit at bit position 3 in the message bit array carried by the message. The forwarding engine at node G therefore replaces the destination address in field 1224 with the IP address assigned to the ingress interface at node L on the link between nodes G and L, to form message 1240. Upon receiving message 1240, node L determines that it is the BIER-Tr domain egress node for the message. The forwarding engine at node L then removes the BIER-Tr encapsulation, which includes removing intervening header 1226 and the outer IP header containing source address field 1222 and destination address field 1224, and forwards the original IP packet 1206 to its intended receiver. Further forwarding of packet 1206 may in some embodiments involve additional decapsulation of the packet, depending on the protocols in use outside of BIER-Tr domain 1200.

Forwarding of replica message 1236 from node E to egress node M proceeds in much the same manner as the forwarding from node D to node L described above. Message 1236 is forwarded to node H in accordance with the bit indexed forwarding table at node E. The forwarding table at node E (not shown) includes similar information to that in table 620 of FIG. 6B, except that a forwarding table for network 1200 includes IP addresses in place of other neighbor node identifiers. The forwarding engine at node E replaces the outer IP destination address with the IP address of the ingress interface at node H on the link between nodes E and H, to form encapsulated message 1242. An example of a forwarding table at node H of network 1200 is shown in FIG. 13C. Table 1340 shows that for any of the trees defined for network 1200, node H has the task of forwarding to node M any message intended for that node, as indicated by a set bit at bit position 4 in the message bit array carried by the message. The forwarding engine at node H therefore replaces the destination address in field 1224 with the IP address assigned to the ingress interface at node M on the link between nodes H and M, to form message 1244. Upon receiving message 1244, node M determines that it is the BIER-Tr domain egress node for the message. The forwarding engine at node M then removes the BIER-Tr encapsulation from the message and forwards original IP packet 1206 to its intended receiver.

Figure 14A:
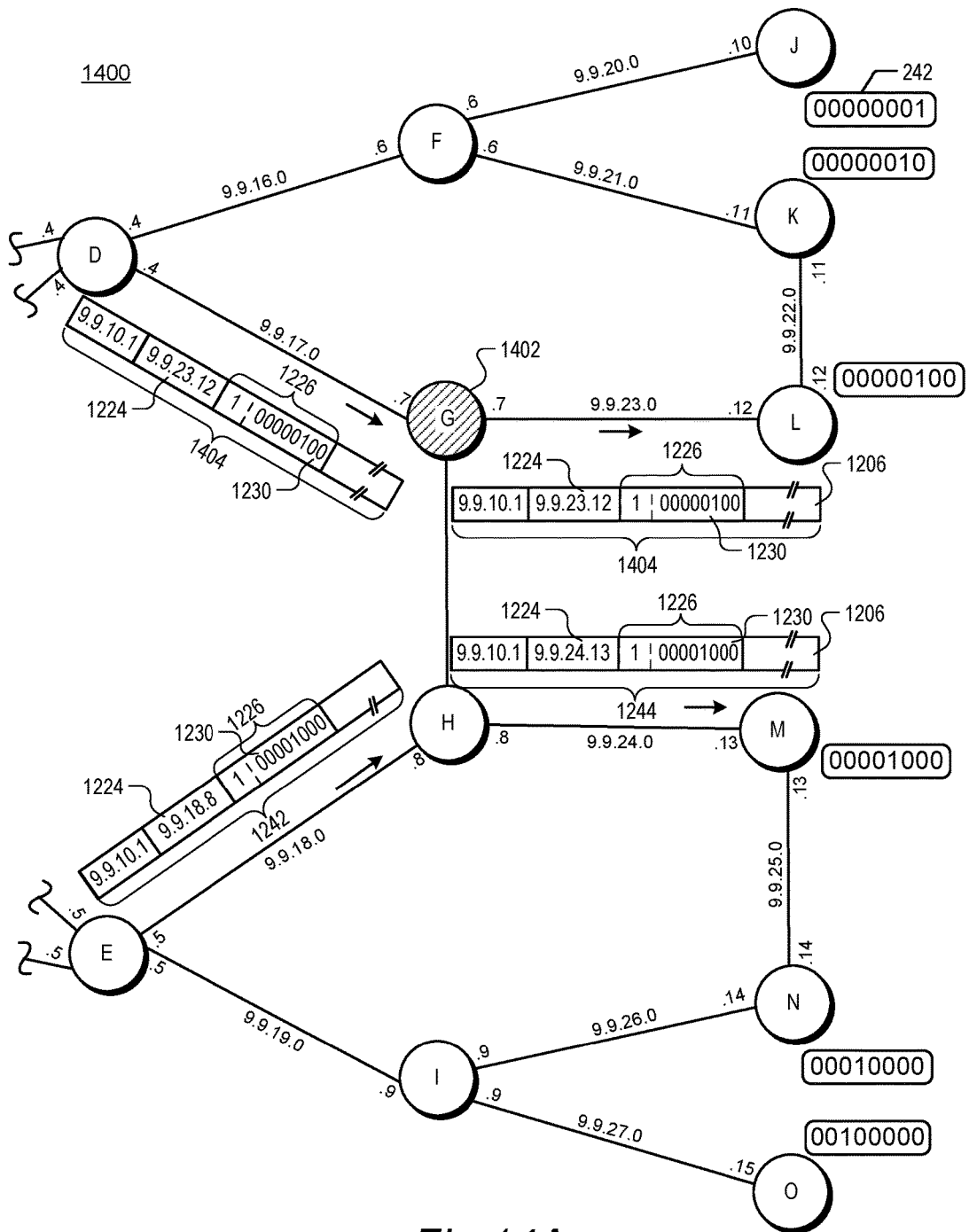
FIG. 14A is a diagram illustrating BIER forwarding of IP-encapsulated messages through a portion of a network having a non-BIER-enabled node.

A portion of an alternative embodiment of a BIER-Tr network is depicted in FIG. 14A. Network 1400 of FIG. 14A is identical to network 1200 of FIGS. 12A-12C, except that node 1402 with router ID "G" in network 1400 is not BIER-enabled. For example, node G in network 1400 does not have a bit indexed forwarding table, and does not have the capability to access a tree ID, set ID or message bit array in an incoming message and make forwarding decisions based on such information. The non-BIER-enabled status of node G is indicated by cross-hatching in FIG. 14A. The IP-based BIER encapsulation method disclosed herein allows non-BIER-enabled nodes to be accommodated within a BIER or BIER-Tr network.

In the embodiment of FIG. 14A, it is assumed that the portion of network 1400 not shown, the part connecting ingress node A to nodes D and E via nodes B and C, is identical to the corresponding portion of network 1200. Forwarding of incoming IP packet 1206 shown in FIG. 12A therefore proceeds in the same way as that shown in FIGS. 12A and 12B until replica message 1234 sent from node C reaches node D. Node D does not replace the outer IP destination address with the IP address of the ingress interface at node G, because node G is not capable of accessing the BIER-related information to perform further forwarding. Instead, node D writes to destination address field 1224 the IP address of the ingress interface at node L on the link between nodes G and L, forming encapsulated message 1404. Node D then uses its normal IP routing process to send message 1404 to node L via node G. Node G can forward message 1404 like any other IP packet, and the BIER-related information can again be accessed and evaluated when message 1404 reaches node L.

An example of a bit indexed forwarding table for node D of network 1400 is shown in FIG. 14B. Table 1420 of FIG. 14B is sorted by bit position, in a manner similar to that described above for table 620 of FIG. 6B. The entry for a tree ID value of 1 and a bit position of 3 is the relevant entry in table 1420 for forwarding of message 1234 (as shown in FIG. 12B) when it arrives at node D, based on the tree ID and message bit array information carried by the message. This entry identifies IP address 9.9.23.12, the address of the ingress interface at node L, as the destination address to be used for the forwarded message. This is in contrast to the corresponding entry of node D forwarding table 1218 for network 1200, shown in FIG. 12A. Because node G is BIER-enabled in network 1200, table 1218 directs message 1234 to IP address 9.9.17.7, or the ingress interface at node G.

Returning to FIG. 14A, forwarding of message 1236 (shown in FIG. 12B) after it arrives at node E proceeds in the same way as described above in connection with FIG. 12C. In the embodiment of FIG. 14A, no message replication is needed at node G. In an embodiment for which the network topology and tree being used are such that replication is needed at a non-BIER-enabled node, the replication is performed at the BIER-enabled node for which the non-BIER-enabled node is the next hop along the tree. For example, if a tree being used in network 1400 were such that node G would need to send a replica to node H in addition to node L, the replica having a destination address for node H could be sent from node D via node G, in addition to the replica having a destination address for node L. Node D could also take care of any alterations of the message bit array in each replica message to avoid duplication and looping. Although only one node within network 1400 is non-BIER-enabled, BIER or BIER-Tr networks could include multiple non-BIER-enabled nodes in alternative embodiments. In an embodiment in which multiple adjacent next-hop nodes along a path are non-BIER-enabled, the BIER-enabled node prior to the group of non-BIER-enabled nodes sets the IP address of the next BIER-enabled node along the path as the destination address of the encapsulated message, and uses IP routing to send the message via the non-BIER-enabled nodes.

Figure 15:
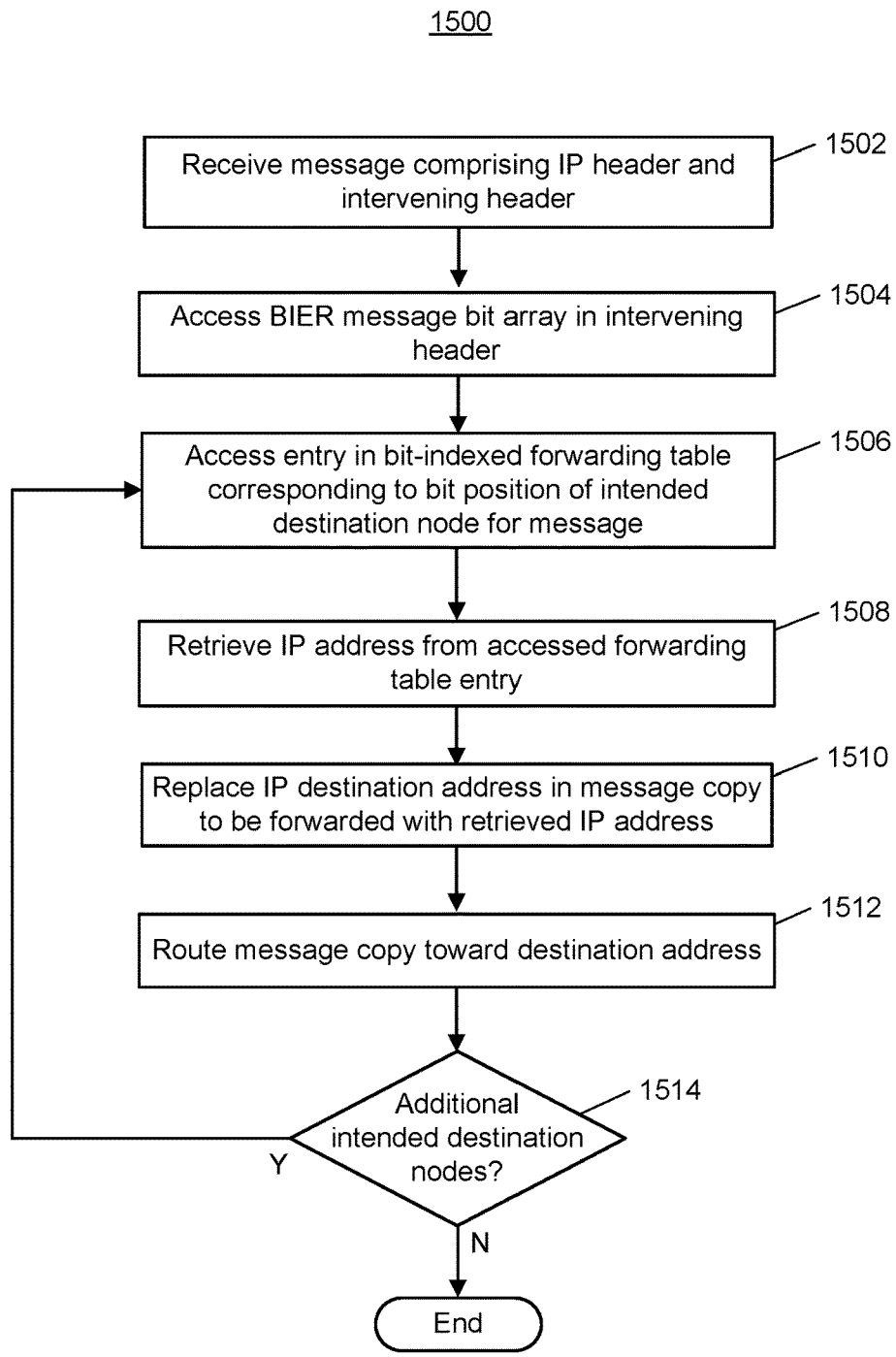
FIG. 15 is a flowchart illustrating an example of a method performed at a forwarding node of a network described herein.

An embodiment of a forwarding method for use in a BIER network employing the IP-based encapsulation described herein is illustrated by the flowchart of FIG. 15. In an embodiment, method 1500 of FIG. 15 is carried out by a forwarding engine at a BIER-enabled node in a BIER or BIER-Tr network. Method 1500 begins in step 1502 with receiving a message comprising an IP header and an intervening header. A message bit array in the intervening header is accessed (step 1504). In a tree-based BIER embodiment, the forwarding method would also include accessing a tree ID in the intervening header. In an embodiment in which BIER egress nodes are assigned set identifiers as well as bit positions, the forwarding method would also include accessing a set ID in the intervening header.

Method 1500 continues with accessing an entry in a bit indexed forwarding table corresponding to the bit position of an intended destination node for the message (step 1506). As noted above, accessing the forwarding table entry corresponding to the bit position of an intended destination node is done in some embodiments by comparing the message bit array with a neighbor bit array in the forwarding table entry. Alternatively, the forwarding table entry can be accessed by first determining the position of a set bit in the message bit array (i.e., a bit position of an intended egress or destination node) and then checking for a forwarding table entry corresponding to that bit position. In a tree-based BIER embodiment, accessing the entry would include selecting a forwarding table, or forwarding table portion, corresponding to the tree ID carried by the received message. In an embodiment in which BIER egress nodes are assigned set identifiers as well as bit positions, accessing the forwarding table entry would also include accessing an entry corresponding to the set ID carried by the message. The IP address from the accessed forwarding table entry is retrieved (step 1508), and written to the IP destination address field in the message copy to be forwarded (step 1510). Examples of the IP destination address field include field 1124 in FIG. 11A and field 1224 in FIGS. 12A-12C.

The message copy is then routed toward the location corresponding to the IP address in its destination address field (step 1512). In an embodiment, the message is routed using the forwarding node's unicast IP routing process. In some embodiments, the message bit array in the intervening header of the forwarded message is modified from the message bit array of the received message. For example, if set bits in the message bit array correspond to bit positions of destination nodes not reachable from the neighbor node the forwarded message is addressed to, those bits may be reset in the message bit array of the forwarded message. If there are additional intended destination nodes that have not had message replicas forwarded to them yet ("yes" branch of decision step 1514), a new forwarding table entry is accessed and the replication/forwarding is repeated until there are no remaining destination nodes.

Figure 16:
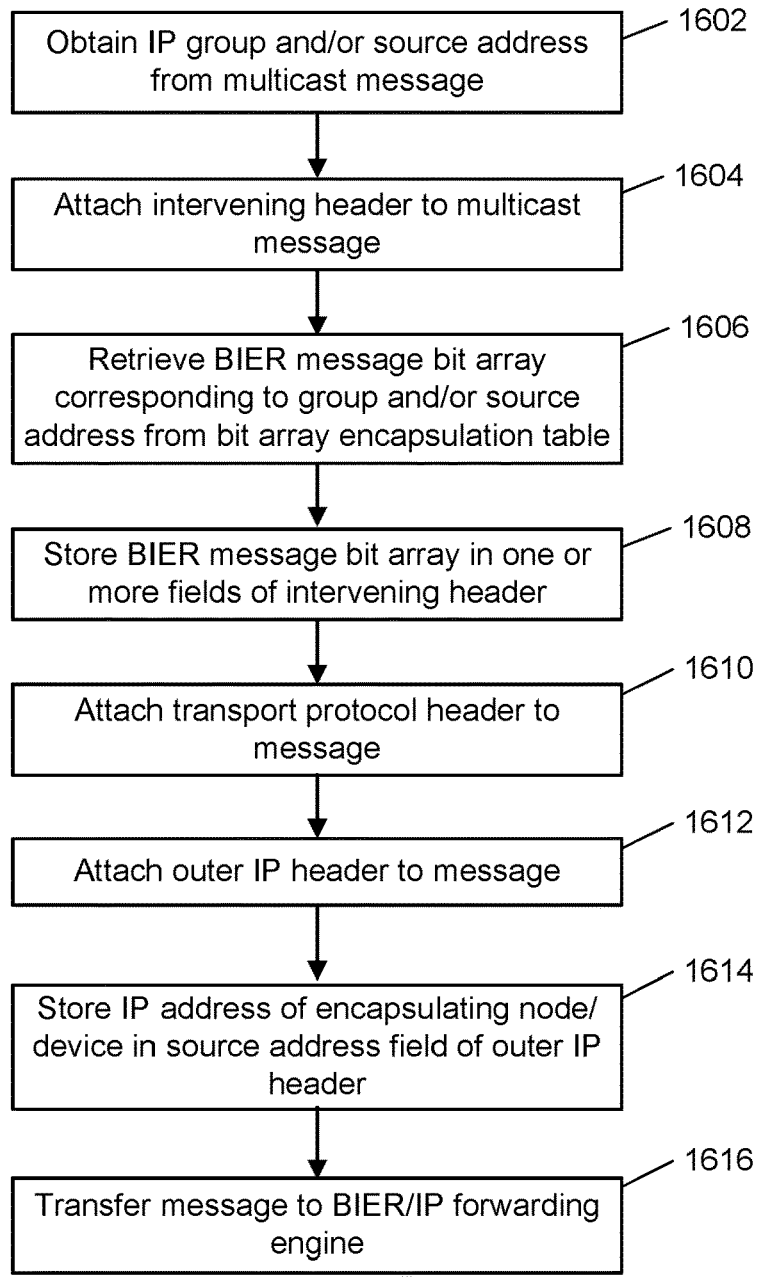
FIG. 16 is a flowchart illustrating an example of a method for encapsulating a message for forwarding through a network as described herein.

An embodiment of a method for encapsulating a message for forwarding through a BIER domain or network employing the IP-based encapsulation described herein is illustrated by the flowchart of FIG. 16. In an embodiment, method 1600 of FIG. 16 is performed by an ingress node of the network. In an alternative embodiment, method 1600 is performed by a special-purpose device such as a video source or video transmission device. Method 1600 begins, at step 1602, with obtaining an IP group and/or source address from an incoming multicast message. An example of an incoming multicast message is IP message 1206 of FIG. 12A. In an embodiment, a multicast group address is read from a destination address field of the incoming multicast message, and used to identify the multicast group for encapsulation purposes. In some embodiments, the IP source address may be sufficient to identify the multicast group. Method 1600 continues with attaching an intervening header to the multicast message (step 1604), where "attaching" the intervening header comprises including the header in an encapsulated message including the incoming multicast message. As discussed above in connection with FIGS. 11A-11C, the intervening header may be a service header or a metadata header in some embodiments. In general, the intervening header is an extensible header suitable for storage of BIER-related information. The intervening header is attached outside of the incoming message, in a manner similar to that illustrated in FIG. 11A.

Method 1600 continues with retrieving from a bit array encapsulation table a BIER message bit array corresponding to the group and/or source address of the incoming message (step 1606). A group membership table such as table 1214 of FIG. 12A is an example of a bit array encapsulation table. An embodiment of the encapsulation method for a tree-based BIER network also includes retrieving a tree ID from the bit array encapsulation table. An embodiment of the encapsulation method for a network in which egress nodes are assigned set identifiers as well as bit positions also includes retrieving a set ID from the bit array encapsulation table. The retrieved message bit array is stored in one or more fields of the intervening header (step 1608). In embodiments in which a tree ID and/or set ID is also retrieved from a bit array encapsulation table, the tree ID and/or set ID is stored in the intervening header as well.

A transport protocol header is attached to the multicast message in step 1610 of method 1600. In an embodiment, the transport protocol header is a UDP header. Other transport protocol headers may be used in other embodiments. In an embodiment, the transport protocol header is attached outside of the attached intervening header, in a manner similar to that shown in FIG. 11A. An outer IP header is attached to the message at step 1612, where the outer IP header includes source and destination IP address fields. An IP address of the encapsulating node or device is stored in the source address field of the outer IP header (step 1614). Field 1208 of FIG. 12A is an example of the source address field of the outer IP header. In an embodiment, the IP address stored is the IP address of an egress interface of an ingress node for the BIER network. The encapsulated message is then transferred to a forwarding engine configured for forwarding of BIER messages having IP-based encapsulation (step 1616). In an embodiment, the forwarding engine is at an ingress node of the BIER network. In one embodiment in which encapsulation method 1600 is performed by a device other than an ingress node of the BIER network, transferring the message to a BIER/IP forwarding engine includes writing an IP address for a BIER network ingress node to the destination address field of the outer IP header of the encapsulated message.

Figure 17:
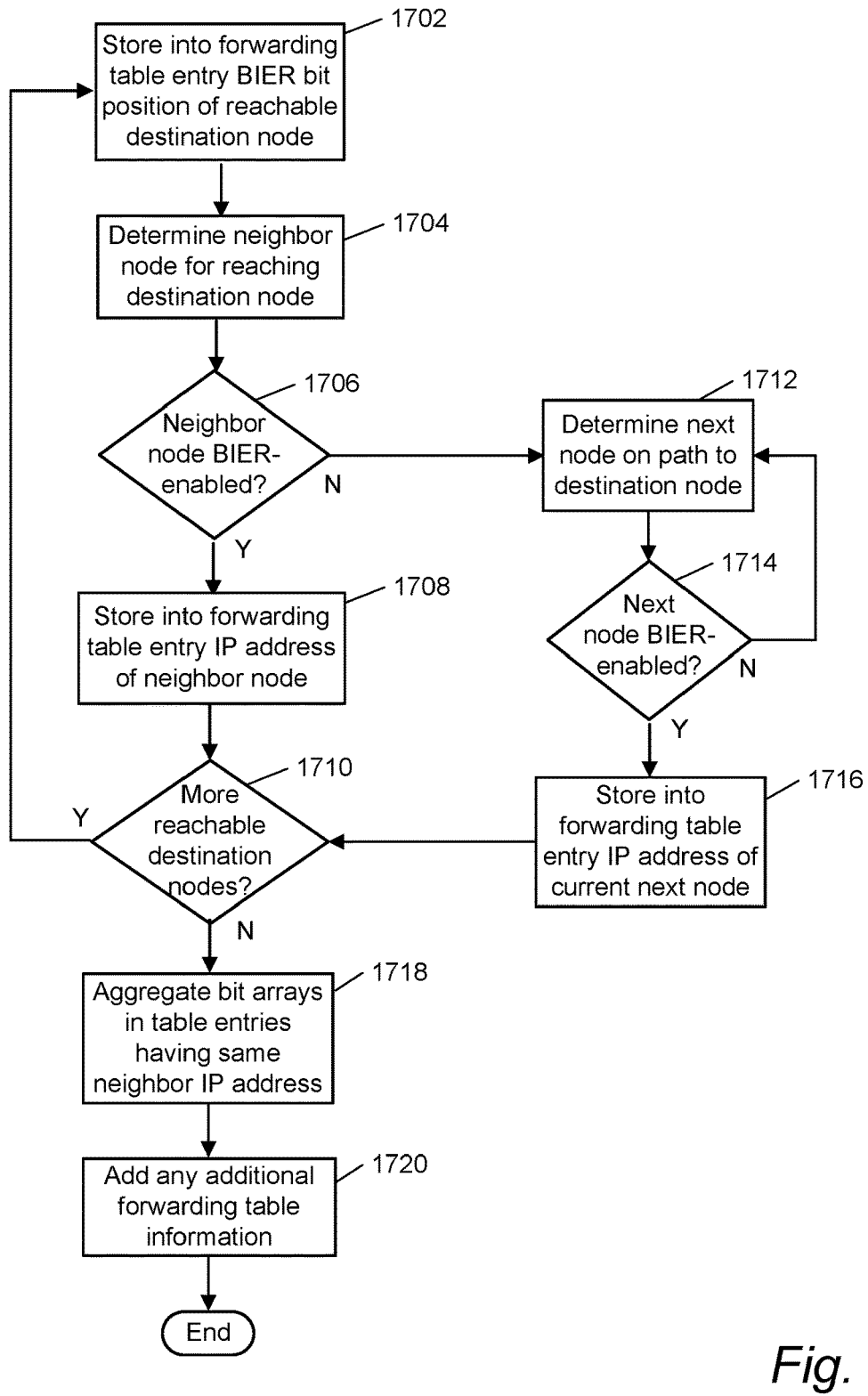
FIG. 17 is a flowchart illustrating an example of a method for populating a forwarding table for use with a network as described herein.

An embodiment of a method for populating a forwarding table in a BIER network configured for IP-based encapsulation is illustrated by the flowchart of FIG. 17. In an embodiment, method 1700 of FIG. 17 is performed by a network controller such as controller 240 of FIG. 2. In an alternative embodiment, method 1700 is performed by a BIER-enabled forwarding node. In a further embodiment, the method is performed by a BIER-enabled forwarding node using topology information and BIER-related information advertised by other nodes in the BIER network. Method 1700 begins, at step 1702, with storing into a forwarding table entry, at a forwarding node in the BIER network, the BIER bit position of a destination node reachable from the forwarding node. In an embodiment, storing the bit position into a forwarding table entry comprises setting a bit in a neighbor bit array within the forwarding table entry. In another embodiment, storing the bit position comprises storing a bit position number into a bit position column or field of the forwarding table entry.

Method 1700 continues with determining the neighbor node, or next-hop node, from the forwarding node for reaching the destination node (step 1704). If the neighbor node is BIER-enabled ("yes" branch of decision step 1706), an IP address of the neighbor node is stored into the forwarding table entry (step 1708). In an embodiment, the IP address stored is an IP address assigned to the ingress interface of the neighbor node on the link between the forwarding node and the neighbor node. If the neighbor node is not BIER-enabled ("no" branch of decision step 1706), subsequent nodes along the path to the destination node are checked until a BIER-enabled node is found (steps 1712 and 1714). In an embodiment, information as to which nodes are BIER-enabled is maintained by a network controller. In another embodiment, a BIER-enabled node can determine whether another node in the network is BIER-enabled using information received in advertisements, such as IGP advertisements, from other nodes in the network. When the next BIER-enabled node along the path to the destination node is found ("yes" branch of decision step 1714), an IP address of the next BIER-enabled node is stored into the forwarding table entry (step 1716). In an embodiment, the IP address is an IP address assigned to the ingress interface of the next BIER-enabled node on a link between that node and the preceding (non-BIER-enabled) node along the path.

The steps described above are repeated for any additional reachable destination nodes from the forwarding node ("yes" branch of decision step 1710). When forwarding table entries corresponding to all reachable nodes have been populated ("no" branch of decision step 1710), method 1700 continues with aggregating bit arrays in table entries having the same neighbor IP address (step 1718). In an embodiment, the forwarding table being populated is to be sorted by bit position, in a manner similar to, for example, table 620 of FIG. 6B or tables 1300, 1320 and 1340 of FIGS. 13A-13C. In such an embodiment, neighbor bit arrays are aggregated so that an entry for a neighbor having multiple reachable destination nodes includes a bit array with multiple set bits, but multiple table entries are maintained for such neighbor nodes (one for each bit position of a set bit in the neighbor bit array). This situation is illustrated by, for example, the first three entries of table 1300 of FIG. 13A. In an alternative embodiment, the forwarding table being populated is to be sorted by neighbor, in a manner similar to, for example, tables 1216 and 1218 of FIG. 12A. In this type of table, neighbor bit arrays for entries having the same neighbor IP address are aggregated, and only one entry is retained for each neighbor (for a given tree ID and set ID). Any additional forwarding table information such as, for example, interface information is then added to the forwarding table (step 1720).

Method 1700 of FIG. 17 represents one example of a way to populate a forwarding table that can account for non-BIER enabled nodes in a BIER network using the IP-based encapsulation described herein; other ways to populate such a table will be apparent to one of ordinary skill in the art of networking in light of this disclosure. For example, while method 1700 operates by looping through reachable destination nodes, another embodiment of a method could operate by looping through neighbor nodes instead. In a further embodiment, a full neighbor bit array including set bits for all destination nodes reachable via the neighbor could be stored for each neighbor when performing the loop. Various modifications and variations of any of the methods and flowcharts described herein will be apparent to one of ordinary skill in the art in view of this disclosure. For example, certain steps of the methods described herein may be performed in a different order without substantially affecting the outcome of the method.

Forwarding Table Implemented Load Balancing

Figure 18A:
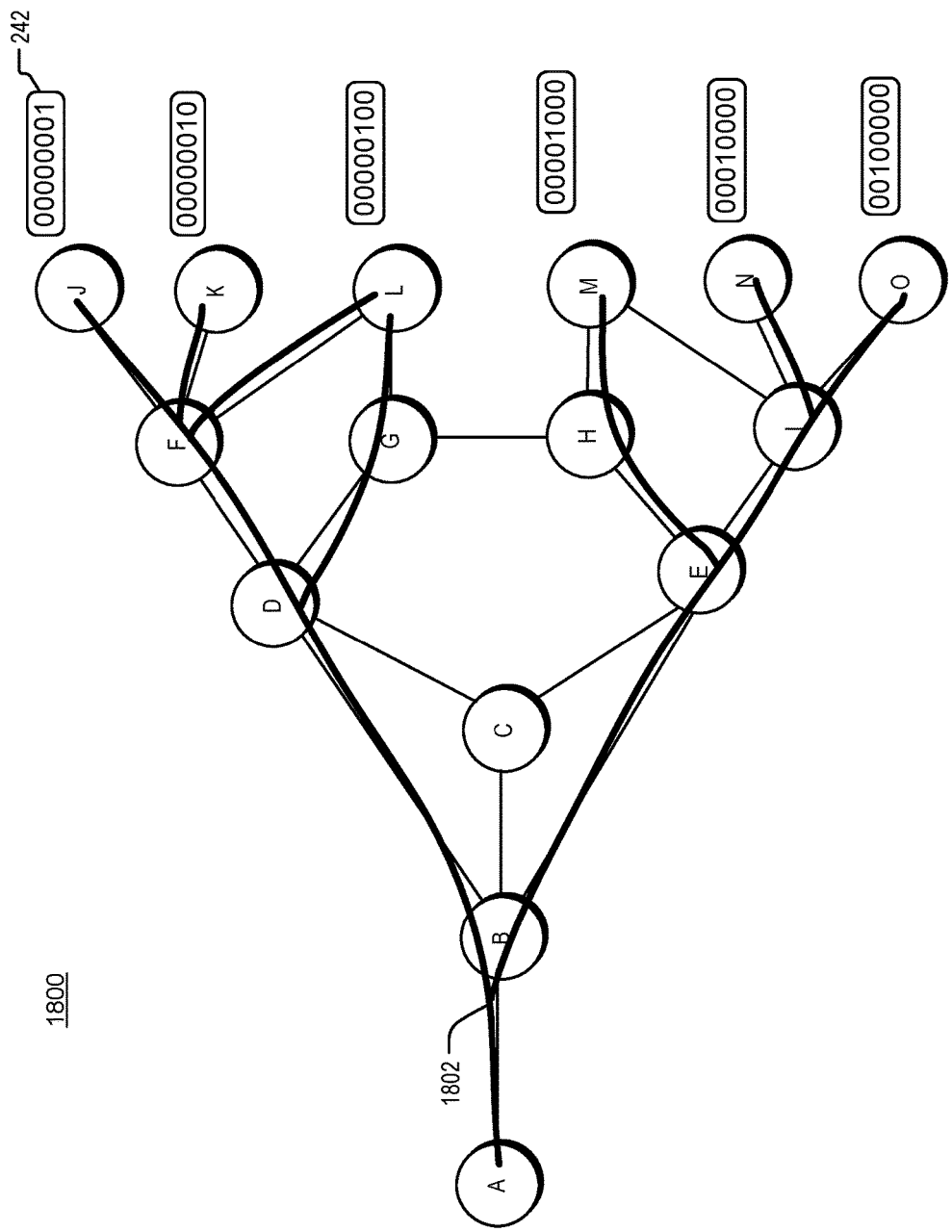
FIG. 18A illustrates an implementation of a multicast tree in a network.

An additional embodiment of a network that can be configured for tree-based forwarding is illustrated in FIG. 18A. Network 1800 of FIG. 18A includes the member nodes and egress node bit position assignments of other example networks described herein, such as networks 200 and 1200 described above. Network 1800 may also include a network controller (not shown in FIG. 18A). The nodes in network 1800 are interconnected slightly differently than in the other networks described above, however. Instead of the links between nodes K and L and between nodes M and N that are included in networks 200 and 1200, network 1800 includes links between node F and L and between nodes I and M. When forwarding according to tree 1802 (shown superimposed onto the diagram of network 1800), alternative paths, which may be equal-cost paths in some embodiments, may be taken from node D to node L. One of the alternate paths passes through node F and the other through node G.

An embodiment of a mechanism for implementing load-sharing between the two alternate paths of FIG. 18A can be implemented using a forwarding table arrangement such as that shown in FIG. 18B. In addition to information included in other forwarding tables described herein, forwarding table 1810 for node D of network 1800 includes a Weight column indicating the percentage of traffic to a destination associated with a given bit position that is to pass through the neighbor identified in a forwarding table entry. For example, tree 1802 includes only one path to each of nodes J (bit position 1) and K (bit position 2), each passing through neighbor node F, so the corresponding entries in table 1810 indicate a weight of 100 percent. All of the traffic from node D to node J passes through node F, as does all of the traffic from node D to node K. For node L (bit position 3), tree 1802 includes alternate paths through neighbors F and G, as noted above. Table 1810 therefore includes two entries for bit position 3, one entry identifying neighbor F and the other identifying neighbor G. In the embodiment of FIG. 18B, the path through node F is designated as carrying 25 percent of the traffic to node L, with the path through node G carrying the remaining 75 percent.

To implement the designated load-sharing between the two entries for bit position 3 in table 1810, the table arrangement of FIG. 18B uses a hash function 1812 to select whether a given message intended for node L is forwarded to neighbor F or neighbor G. The hash function uses a hash table 1814 comprising, in this embodiment, sixteen entries, or "buckets." The apportionment of 25 percent of forwarded traffic to neighbor F is implemented by writing an identifier for neighbor F in four of the sixteen buckets, with an identifier for neighbor G written to the remaining buckets. In an embodiment, the hash function is used to perform a randomized selection from among the 16 buckets, resulting in selection of neighbor F for 25 percent of the forwarded messages. In a further embodiment, the hash function comprises a function of a value of an entropy field from a header of the message to be forwarded. In a still further embodiment, the hash function comprises applying a modulo operator to the value of an entropy field and the number of buckets. For example, the result of Entropy % 16 can be used, in an embodiment, as an index to select a bucket from hash table 1812, where Entropy is the value of an entropy field, % is the modulo operator, and 16 is the number of buckets.

The load balancing method described above can be used with any suitable BIER encapsulation method. In an embodiment using the IP-based BIER encapsulation method described in this disclosure, neighbor node identifiers in tables 1810 and 1814 would be replaced with corresponding IP addresses for the respective neighbor nodes.

Network Devices

Figure 19A:
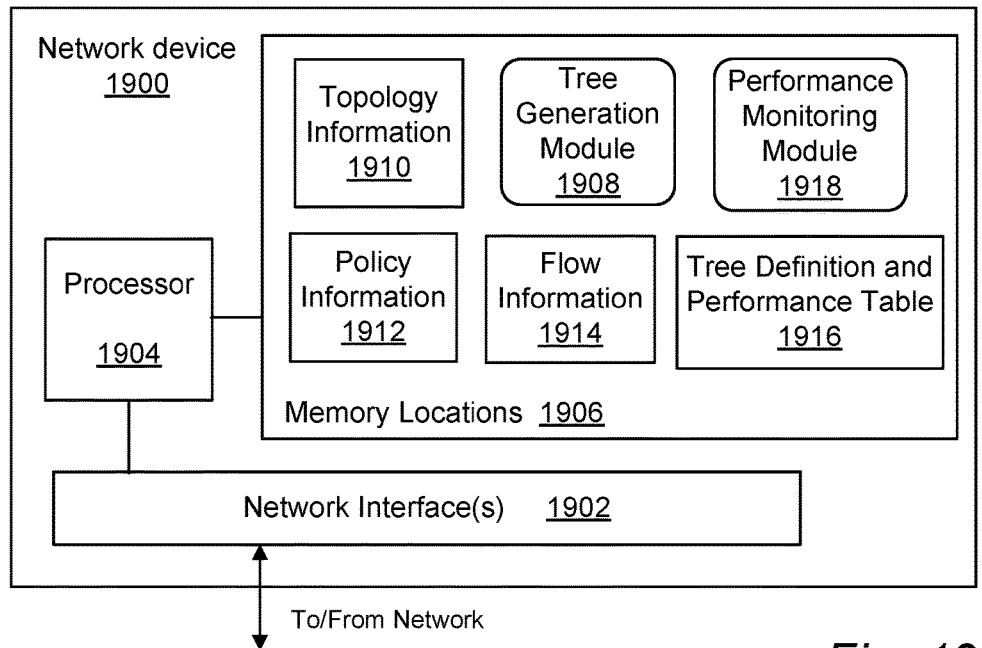
FIGS. 19A-19C are simplified block diagrams illustrating certain components of example network devices that may be employed in or with the networks described herein.

FIG. 19A is a simplified block diagram illustrating certain components of an embodiment of a network device that may be used with one of the networks described herein that is configured for tree-based operation. In an embodiment, network device 1900 comprises a network controller such as controller 240 of FIG. 2. Alternatively, network device 1900 may be associated with a network node, such as an ingress node, that is configured to carry out certain controller functions. In the embodiment of FIG. 19A, network device 1900 includes one or more network interfaces 1902, a processor 1904 and a collection of memory locations 1906. Memory locations 1906 store a tree generation module 1908, topology information 1910, policy information 1912, flow information 1914, a tree definition and performance table 1916, and a performance monitoring module 1918.

Network interface 1902 is configured for both sending and receiving both messages and control information, such as IGP advertisements, within a network. In an embodiment, network interface 1902 comprises multiple interfaces and can accommodate multiple communications protocols and control protocols, including those for communication between network nodes or between a network node and a network controller. Each interface may be a physical interface or a logical interface. Memory locations 1906 include a plurality of storage locations addressable by processor 1904 for storing software programs and data structures associated with the methods described herein. As such, memory locations 1906 may be implemented using any combination of built-in volatile or non-volatile memory, including random-access memory (RAM) and read-only memory (ROM) and integrated or peripheral storage devices such as magnetic disks, optical disks, solid state drives or flash drives.

In the embodiment of FIG. 19A, memory locations 1906 store tree generation module 1908. Tree generation module 1908 includes computer executable instructions that when executed by processor 1904 are operable to perform operations such as generating a tree for multicast flow through a network, allocating a tree identifier to the tree, communicating the tree ID and associated forwarding information to forwarding nodes of the network, and communicating the tree ID and associated flow information to an ingress node of the network. In the embodiment of FIG. 19A, tree generation module 1908 uses topology information 1910 in generating a tree. In an embodiment, topology information 1910 identifies nodes in the network and their interconnections, and is communicated to network device 1900 by one or more of the network nodes. In a further embodiment, the topology information is communicated using link state advertisements or other control-plane messages. Topology information 1910 may in some embodiments be in the form of a data structure, such as a routing table. Tree generation module 1908 may also use policy information 1912 in generating a tree, especially in cases where a tree is generated to replace a tree found to be noncompliant with a policy. In an embodiment, policy information 1912 includes rules or requirements as to performance metric values for paths or trees within the network. Rules or requirements within policy information 1912 may in some embodiments be associated with particular receivers, sources, and/or other features of the network.

Information defining trees generated by tree generation module 1908 is stored in tree definition and performance table 1916 in the embodiment of FIG. 19A. In an embodiment, tree definition and performance table 1916 is a data structure relating a tree ID to the node sequences forming the paths of the tree, and including performance data for one or more of the paths. Table 700 of FIG. 7A is one example of a tree definition and performance table. In an alternative embodiment of a network device not including performance monitoring module 1918, tree definition information may be stored in a data structure not including performance information, such as tree definition table 600 of FIG. 6A. In an embodiment, tree generation module 1908 derives from the tree definition information in table 1916 forwarding information that is communicated to each forwarding node within the tree along with associated tree identifier information. In a further embodiment, the communicated tree identifier and forwarding information is used to populate respective forwarding tables at the forwarding nodes. In the embodiment of FIG. 19A, tree generation module 1908 uses flow information 1914 in assigning particular flows to particular trees, and in communicating tree identifiers and associated flow information to an ingress node of the network. Flow information 1914 includes, in an embodiment, multicast group identifiers and identification of receivers and/or network egress nodes associated with particular multicast groups. In a further embodiment, multicast group identifiers comprise IP multicast group addresses and/or source addresses. In an embodiment, the communicated tree ID and flow information is used to populate a bit array encapsulation table at the ingress node.

Memory locations 1906 of network device 1900 also store performance monitoring module 1918. Performance monitoring module 1918 includes computer executable instructions that when executed by processor 1904 are operable to perform operations such as obtaining performance data relating to one or more paths within a tree and determining whether a path is in compliance with an intended performance metric value. In some embodiments, operations carried out by performance monitoring module 1918 include transmission, reception and evaluation of test packets. Performance monitoring module 1918 may in some embodiments be associated with or in communication with a network flow analyzer or network flow analysis module. In an embodiment, performance monitoring module 1918 uses policy information 1912 in determining whether a path is in compliance with an intended performance metric value. Performance monitoring module 1918 also uses tree definition and performance table 1916, in some embodiments, in determining whether a path is in compliance with an intended performance metric value (or with a rule or policy). Alternatively or in addition, performance monitoring module 1918 causes performance information to be written to tree definition and performance table 1916. Multiple alternatives and variations to network device 1900 will be apparent to one of ordinary skill in the art in view of this disclosure. In an embodiment of a network not configured for policy-based routing, for example, a network device similar to device 1900 but without policy information 1912, performance monitoring module 1918, or performance information within its tree definition table could be employed.

Figure 19B:
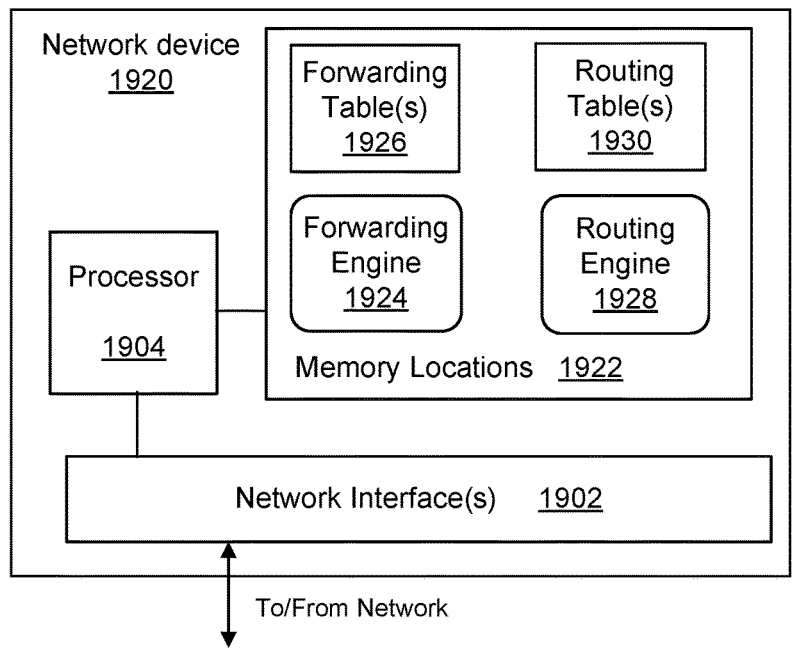

Certain components of an embodiment of a network device associated with a forwarding node of a network are illustrated by the simplified block diagram of FIG. 19B. In an embodiment, network device 1920 of FIG. 19B is associated with a node in a network configured for BIER or tree-based BIER, such as networks 200, 1200 or 1800. In addition to network interface 1902 and processor 1904 as described above for network device 1900, network device 1920 includes a collection of memory locations 1922 storing a forwarding engine 1924, one or more forwarding tables 1926, a routing engine 1928, and one or more routing tables 1930. Memory locations 1922 are similar to memory locations 1906 described above in connection with network device 1900, except for differences in the modules and data stored.

Forwarding engine 1924 includes computer executable instructions that when executed by processor 1904 are operable to perform operations associated with forwarding of received messages. In an embodiment, forwarding engine 1924 performs BIER forwarding operations using a BIER forwarding table included in forwarding tables 1926. In such an embodiment, operations performed by forwarding engine 1924 include, for example, accessing a message bit array of a received BIER message, accessing an entry in a BIER forwarding table corresponding to a bit position of an intended destination node for the message, and sending a message copy with a forwarded message bit array to the neighbor node in the accessed forwarding table entry. In a further embodiment, forwarding engine 1924 performs tree-based BIER forwarding operations using a BIER-Tr forwarding table included in forwarding tables 1926. In such an embodiment, operations performed by forwarding engine 1924 further include, for example, selecting the BIER forwarding table (or forwarding table portion) corresponding to a tree ID carried by the received BIER message. The BIER forwarding table in such an embodiment further includes one or more tree identifiers.

In some embodiments, forwarding engine 1924 is configured to forward BIER or BIER-Tr messages encapsulated using an IP-based BIER encapsulation as described herein. In such an embodiment, operations performed by forwarding engine 1924 include accessing a message bit array in an intervening header of a received message, accessing an entry in a BIER forwarding table corresponding to a bit position of an intended destination node for the message, retrieving an IP address from the accessed forwarding entry, replacing an IP destination address with the retrieved IP address in the message copy to be forwarded, and routing the message copy toward the node corresponding to the destination address. In a further embodiment, routing of the message copy comprises using a unicast IP forwarding table. In an embodiment using IP-based BIER encapsulation, an entry in the BIER forwarding table includes an IP address associated with the nearest BIER-enabled node on a path from the forwarding node to an egress node corresponding to a bit position of the forwarding table entry.

In an embodiment, embodiments of forwarding tables 1926 including tree identifiers for tree-based forwarding are populated using tree identifier and egress node information provided by a network controller. In a further embodiment, forwarding tables for BIER forwarding are populated using BIER-related information, such as bit positions, provided by a network controller. In an alternative embodiment, bit position information is received from other nodes rather than from a controller. Routing engine 1928 includes computer executable instructions that when executed by processor 1904 are operable to perform operations such as receiving network topology information via communications such as IGP advertisements or network controller communications, generating a bit indexed routing table 1930 reflecting network topology, router identifiers, and bit positions, and generating a bit indexed forwarding table 1926 from the routing table. In an embodiment, routing engine 1926 is configured to generate non-BIER routing and forwarding tables, such as, for example, IP or MPLS/IP routing and forwarding tables or information bases.

Figure 19C:
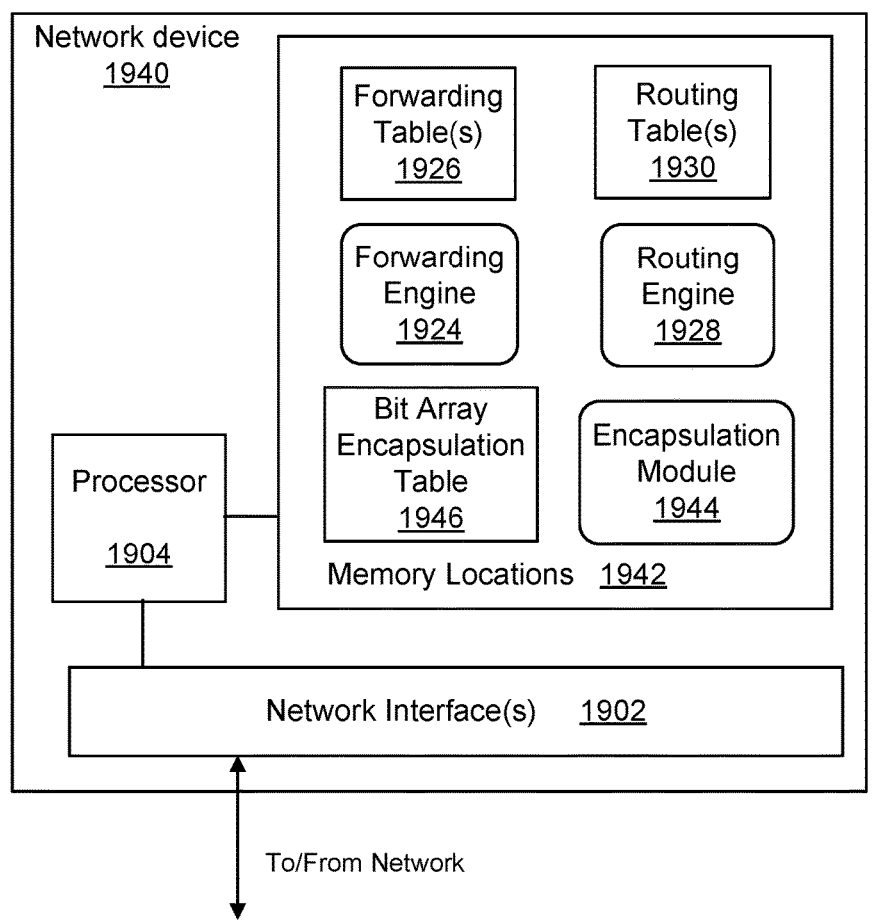

Certain components of an embodiment of a network device associated with an ingress node of a network are illustrated by the simplified block diagram of FIG. 19C. In an embodiment, network device 1940 of FIG. 19C is associated with an ingress node in a network configured for BIER or tree-based BIER, such as networks 200, 1200 or 1800. Network device 1940 includes network interface 1902 and processor 1904, as described above for network device 1900, as well as forwarding engine 1924, forwarding tables 1926, routing engine 1928 and routing tables 1930, as described above for network device 1920. In addition, network device 1940 includes a collection of memory locations 1942 storing an encapsulation module 1944 and a bit array encapsulation table 1946. Memory locations 1942 are similar to memory locations 1906 and 1922 described above in connection with network devices 1900 and 1920, respectively, except for differences in the modules and data stored.

Encapsulation module 1944 includes computer executable instructions that when executed by processor 1904 are operable to perform operations associated with encapsulation of messages for travel through a network or domain. In an embodiment, encapsulation module 1944 performs operations associated with BIER or BIER-Tr encapsulation of incoming messages. In such an embodiment, operations performed by encapsulation module 1944 include, for example, obtaining a multicast group identifier from a received message, accessing a bit array encapsulation table to obtain a message bit array corresponding to the multicast flow identifier, encapsulating the received message with the message bit array, and transferring the encapsulated message to a BIER forwarding engine. In an embodiment of an encapsulation module for a tree-based BIER network, operations performed by encapsulation module 1944 further include obtaining from the bit array encapsulation table a tree identifier and encapsulating the received message with the tree identifier as well as the message bit array.

In some embodiments, encapsulation module 1944 is configured to encapsulate messages using an IP-based BIER encapsulation as described herein. In such an embodiment, operations performed by encapsulation module 1944 include, for example, obtaining an IP group or source address from a received IP multicast message, attaching an intervening header to the received message, retrieving from a bit array encapsulation table a BIER message bit array corresponding to the group or source address, storing the BIER message bit array in the intervening header, attaching transport and outer IP headers to the message, storing an IP address of the encapsulating node or device in a source address field of the outer IP header, and transferring the message to a BIER forwarding engine configured for use of IP-based BIER encapsulation. In a further embodiment for use with a tree-based BIER network, operations performed by the encapsulation module further include, for example, retrieving a tree identifier from the bit array encapsulation table and storing the tree identifier in the intervening header.

Bit array encapsulation table 1946 relates multicast flow identifiers retrieved from incoming multicast messages with the message bit arrays used to encapsulate the messages for BIER forwarding. Examples of bit array encapsulation tables include group membership tables 124, 306, 406, 506 and 1214 of FIGS. 1B, 3, 4, 5 and 12A, respectively. In embodiments for use in tree-based networks, bit array encapsulation table 1946 also associates a tree identifier with each multicast flow identifier. In embodiments for use in implementing the IP-based BIER encapsulation described herein, bit array encapsulation table 1946 relates an IP group or source address to a message bit array.

Multiple alternatives and variations to network device 1940, as well as to other network devices described herein, will be apparent to one of ordinary skill in the art in view of this disclosure. In an embodiment in which an IP-based encapsulation is performed at a specialized device such as a video source or transmitter, for example, a network device similar to device 1940 but without BIER forwarding and routing engines and tables could be employed. As another example, the functions of processor 1904 in devices 1900, 1920 and/or 1040 may be implemented using a combination of multiple processors. Moreover, embodiments of a network device contemplated herein may include additional components not shown. For example, network devices associated with nodes in a BIER or BIER-Tr domain may be adapted to use approaches and protocols not involving BIER in addition to using BIER. Such a network device may be adapted to use, for example, IP routing or MPLS with LDP in addition to BIER. Software modules and engines described herein may take various forms understood to one of ordinary skill in the art in view of this disclosure. A single module or engine described herein may in some embodiments be implemented by a combination of multiple files or programs. Alternatively or in addition, one or more functions associated with modules or engines delineated separately herein may be combined into a single file or program.

Figure 20:
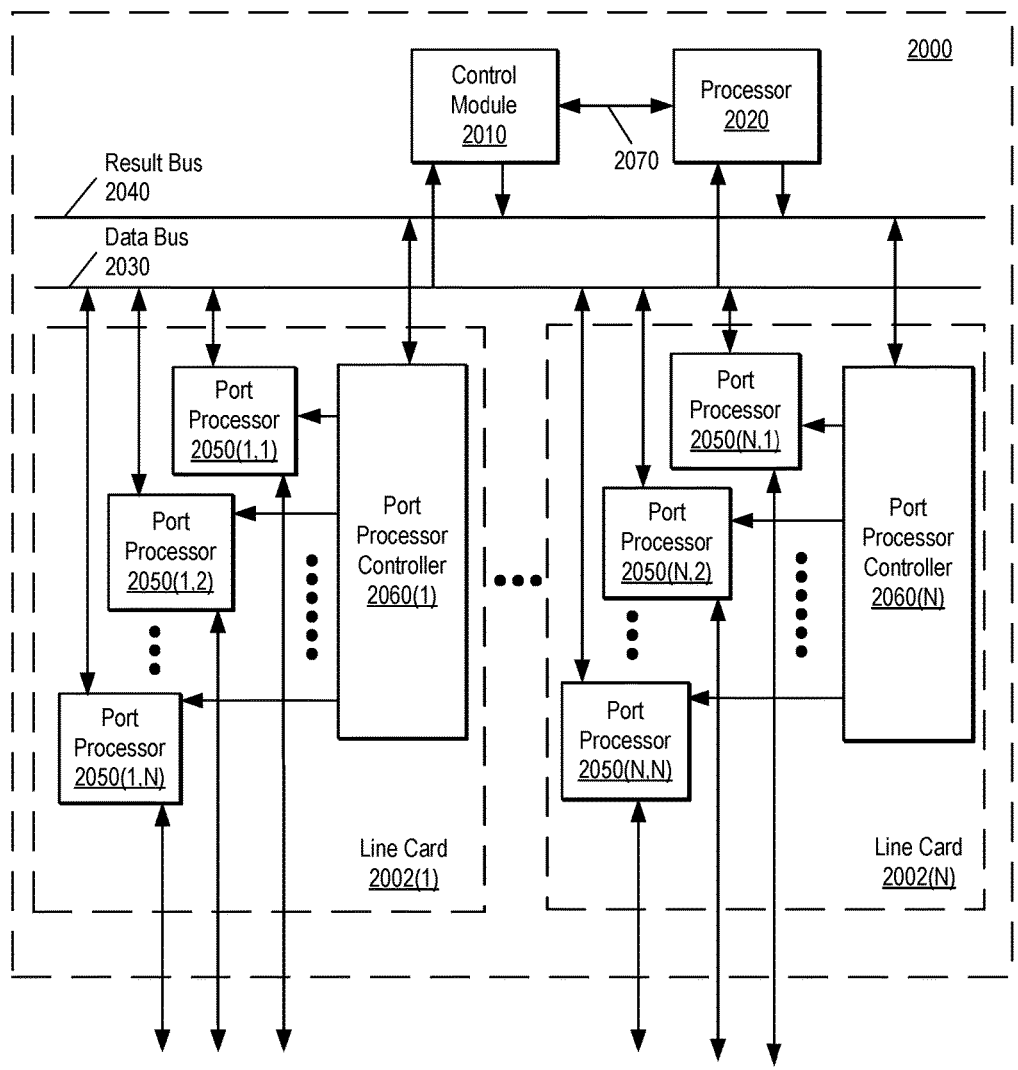
FIG. 20 is a simplified block diagram illustrating certain components of an example network device that may be employed in the networks described herein.

FIG. 20 is a block diagram providing an additional illustration of a network device that may act as, or be associated with, a node in one of the networks described herein. FIG. 20 depicts (at least in part) one configuration of a network device or a network routing element (e.g., a hub, router, switch, or similar device) 2000. In this depiction, network device 2000 includes a number of line cards (line cards 2002(1)-2002(N)) that are communicatively coupled to a control module 2010 and route processor 2020 via a data bus 2030 and result bus 2040. In an embodiment, line cards 2002(1)-2002(N), along with data bus 2030 and result bus 2040, form at least a portion of a network interface such as network interface(s) 1902 of FIGS. 19A-19C. Control module 2010 may in an embodiment include engines, modules and data structures such as forwarding engine 1924, routing engine 1928, encapsulation module 1944, bit array encapsulation table 1946, forwarding table(s) 1926 and routing table(s) 1928 of FIGS. 19A-19C. Line cards 2002(1)-(N) include a number of port processors 2050(1, 1)-(N, N) which are controlled by port processor controllers 2060(1)-(N). Control module 2010 and processor 2020 are not only coupled to one another via data bus 2030 and result bus 2040, but are also communicatively coupled to one another by a communications link 2070. It is noted that in alternative embodiments, each line card can include its own forwarding engine.

When a message (e.g., a packet) is received at network device 2000, the message may be identified and analyzed in the following manner. Upon receipt, a message (or some or all of its control information) is sent from the one of port processors 2050(1, 1)-(N, N) at which the message was received to one or more of those devices coupled to data bus 2030 (e.g., others of port processors 2050(1, 1)-(N, N), control module 2010 and/or route processor 2020). Handling of the message can be determined, for example, by control module 2010. For example, a forwarding engine within control module 2010 may determine that the message should be forwarded to one or more of port processors 2050(1, 1)-(N, N). This can be accomplished by indicating to corresponding one(s) of port processor controllers 2060(1)-(N) that the copy of the message held in the given one(s) of port processors 2050(1,1)-(N,N) should be forwarded to the appropriate one of port processors 2050(1,1)-(N,N). Network devices described herein, such as network devices 1900, 1920, 1940 and 2000, include one or more processors such as processor 1904 and route processor 2020, which may take the form of, for example, microprocessors, PLDs (Programmable Logic Devices), or ASICs (Application Specific Integrated Circuits). These processors are configured to execute program instructions stored in computer readable storage media of various types, including RAM (Random Access Memory), ROM (Read Only Memory), Flash memory, MEMS (Micro Electro-Mechanical Systems) memory, and the like.

Figure 21:
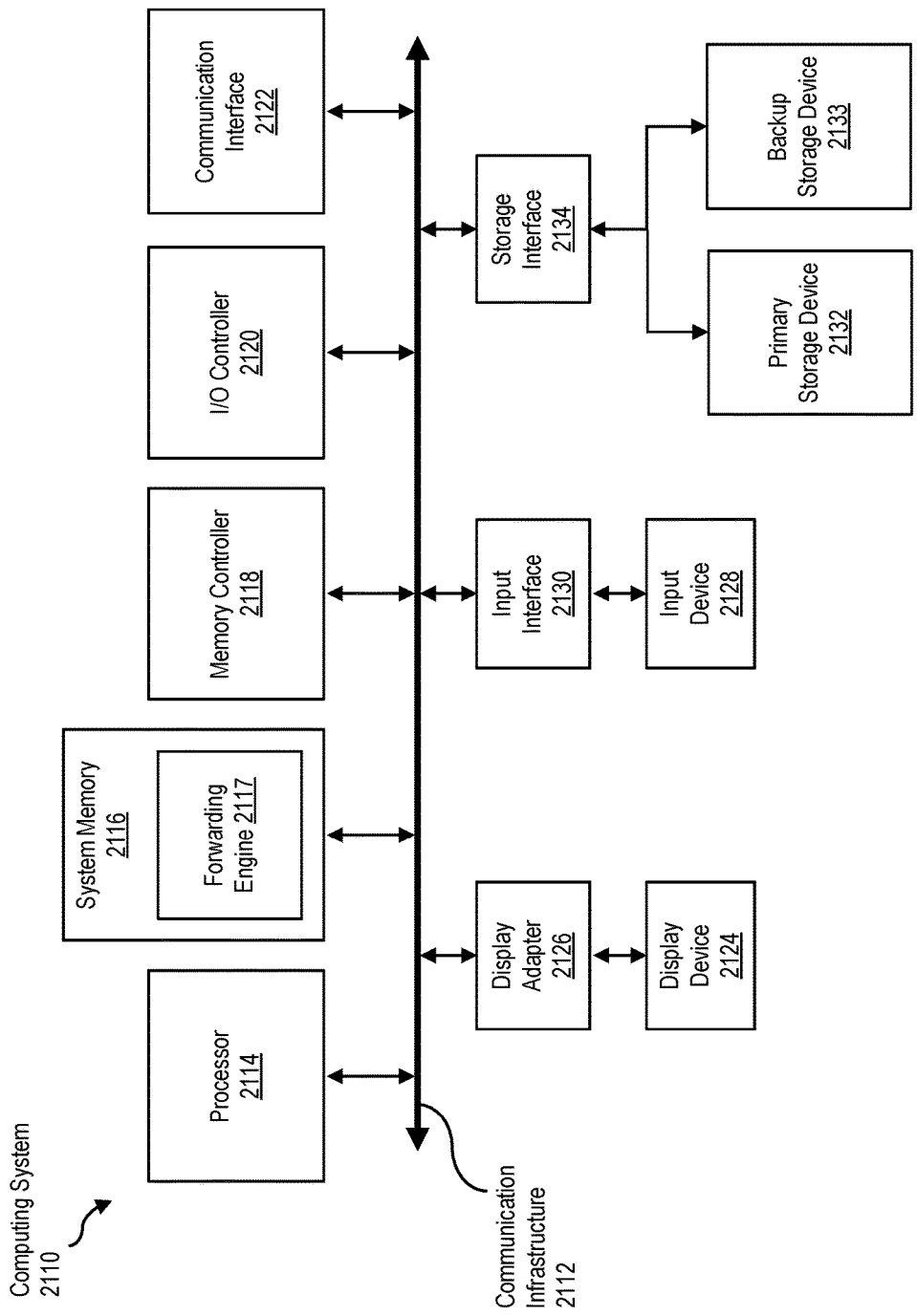
FIG. 21 is a simplified block diagram depicting a computer system suitable for implementing embodiments of the devices and systems described herein.

FIG. 21 depicts a block diagram of a computing system 2110 suitable for implementing aspects of the systems described herein. In the embodiment of FIG. 21, computing system 2110 implements a forwarding engine 2117. Embodiments of the computing system of FIG. 21 can, alternatively or in addition, implement various other engines and modules described in this disclosure. Computing system 2110 broadly represents any single or multi-processor computing device or system capable of executing computer-readable instructions. Examples of computing system 2110 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 2110 may include at least one processor 2114 and a system memory 2116. By executing the software that implements a forwarding engine 2117, computing system 2110 becomes a special purpose computing device that is configured to perform message forwarding in manners described elsewhere in this disclosure.

Processor 2114 generally represents any type or form of processing unit capable of processing data or interpreting and executing instructions. In certain embodiments, processor 2114 may receive instructions from a software application or module. These instructions may cause processor 2114 to perform the functions of one or more of the embodiments described and/or illustrated herein. System memory 2116 generally represents any type or form of volatile or non-volatile storage device or medium capable of storing data and/or other computer-readable instructions. Examples of system memory 2116 include, without limitation, random access memory (RAM), read only memory (ROM), flash memory, or any other suitable memory device. The ROM or flash memory can contain, among other code, the Basic Input-Output System (BIOS) which controls basic hardware operation such as the interaction with peripheral components. Although not required, in certain embodiments computing system 2110 may include both a volatile memory unit (such as, for example, system memory 2116) and a non-volatile storage device (such as, for example, primary storage device 2132, as described further below). In one example, program instructions executable to implement a forwarding engine configured to forward messages using bit indexed explicit replication (BIER) may be loaded into system memory 2116.

In certain embodiments, computing system 2110 may also include one or more components or elements in addition to processor 2114 and system memory 2116. For example, as illustrated in FIG. 21, computing system 2110 may include a memory controller 2118, an Input/Output (I/O) controller 2120, and a communication interface 2122, each of which may be interconnected via a communication infrastructure 2112. Communication infrastructure 2112 generally represents any type or form of infrastructure capable of facilitating communication between one or more components of a computing device. Examples of communication infrastructure 2112 include, without limitation, a communication bus (such as an Industry Standard Architecture (ISA), Peripheral Component Interconnect (PCI), PCI express (PCIe), or similar bus) and a network.

Memory controller 2118 generally represents any type or form of device capable of handling memory or data or controlling communication between one or more components of computing system 2110. For example, in certain embodiments memory controller 2118 may control communication between processor 2114, system memory 2116, and I/O controller 2120 via communication infrastructure 2112. In certain embodiments, memory controller 2118 may perform and/or be a means for performing, either alone or in combination with other elements, one or more of the operations or features described and/or illustrated herein. I/O controller 2120 generally represents any type or form of module capable of coordinating and/or controlling the input and output functions of a computing device. For example, in certain embodiments I/O controller 2120 may control or facilitate transfer of data between one or more elements of computing system 2110, such as processor 2114, system memory 2116, communication interface 2122, display adapter 2126, input interface 2130, and storage interface 2134.

Communication interface 2122 broadly represents any type or form of communication device or adapter capable of facilitating communication between computing system 2110 and one or more additional devices. For example, in certain embodiments communication interface 2122 may facilitate communication between computing system 2110 and a private or public network including additional computing systems. Examples of communication interface 2122 include, without limitation, a wired network interface (such as a network interface card), a wireless network interface (such as a wireless network interface card), a modem, and any other suitable interface. In at least one embodiment, communication interface 2122 may provide a direct connection to a remote server via a direct link to a network, such as the Internet. Communication interface 2122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 2122 may also represent a host adapter configured to facilitate communication between computing system 2110 and one or more additional network or storage devices via an external bus or communications channel Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like. Communication interface 2122 may also allow computing system 2110 to engage in distributed or remote computing. For example, communication interface 2122 may receive instructions from a remote device or send instructions to a remote device for execution.

As illustrated in FIG. 21, computing system 2110 may also include at least one display device 2124 coupled to communication infrastructure 2112 via a display adapter 2126. Display device 2124 generally represents any type or form of device capable of visually displaying information forwarded by display adapter 2126. Similarly, display adapter 2126 generally represents any type or form of device configured to forward graphics, text, and other data from communication infrastructure 2112 (or from a frame buffer) for display on display device 2124. Computing system 2110 may also include at least one input device 2128 coupled to communication infrastructure 2112 via an input interface 2130. Input device 2128 generally represents any type or form of input device capable of providing input, either computer or human generated, to computing system 2110. Examples of input device 2128 include, without limitation, a keyboard, a pointing device, a speech recognition device, or any other input device.

As illustrated in FIG. 21, computing system 2110 may also include a primary storage device 2132 and a backup storage device 2133 coupled to communication infrastructure 2112 via a storage interface 2134. Storage devices 2132 and 2133 generally represent any type or form of storage device or medium capable of storing data and/or other computer-readable instructions. For example, storage devices 2132 and 2133 may include a magnetic disk drive (e.g., a so-called hard drive), a floppy disk drive, a magnetic tape drive, an optical disk drive, a flash drive, or the like. Storage interface 2134 generally represents any type or form of interface or device for transferring data between storage devices 2132 and 2133 and other components of computing system 2110. A storage device like primary storage device 2132 can store information such as routing tables and forwarding tables.

In certain embodiments, storage devices 2132 and 2133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 2132 and 2133 may also include other similar structures or devices for allowing computer software, data, or other computer-readable instructions to be loaded into computing system 2110. For example, storage devices 2132 and 2133 may be configured to read and write software, data, or other computer-readable information. Storage devices 2132 and 2133 may be a part of computing system 2110 or may in some embodiments be separate devices accessed through other interface systems. Many other devices or subsystems may be connected to computing system 2110. Conversely, all of the components and devices illustrated in FIG. 21 need not be present to practice the embodiments described and/or illustrated herein. The devices and subsystems referenced above may also be interconnected in different ways from that shown in FIG. 21.

Computing system 2110 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 2110 for storage in memory via a network such as the Internet or upon a carrier medium. The computer-readable medium containing the computer program may be loaded into computing system 2110. All or a portion of the computer program stored on the computer-readable medium may then be stored in system memory 2116 and/or various portions of storage devices 2132 and 2133. When executed by processor 2114, a computer program loaded into computing system 2110 may cause processor 2114 to perform and/or be a means for performing the functions of one or more of the embodiments described and/or illustrated herein. Additionally or alternatively, one or more of the embodiments described and/or illustrated herein may be implemented in firmware and/or hardware. For example, computing system 2110 may be configured as an application specific integrated circuit (ASIC) adapted to implement one or more of the embodiments disclosed herein.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    receiving, at a first node in a bit indexed explicit replication (BIER) network domain, a multicast message comprising an inner internet protocol (IP) header, an intervening header, and an outer IP header, wherein
        the BIER network domain comprises a BIER-enabled ingress node and a BIER-enabled destination node,
        the intervening header carries information used in BIER forwarding,
        the inner IP header carries a source IP address and a destination IP address for an IP packet encapsulated by the intervening header,
        an IP source address field within the outer IP header carries an IP address of the BIER-enabled ingress node, and
        the first node is configured to use an IP destination address field within the outer IP header for forwarding of the multicast message to either a BIER-enabled node or a non-BIER-enabled node;
    accessing a BIER message bit array stored in the intervening header of the multicast message, wherein each destination node among multiple possible destination nodes for the multicast message is represented by a relative bit position in the message bit array;
    retrieving an IP address from an entry in a bit indexed forwarding table stored at the first node, wherein the entry corresponds to an intended destination node for the multicast message;
    replacing an IP destination address in the IP destination address field within the outer IP header of a copy of the multicast message with the retrieved IP address; and
    sending the copy of the multicast message toward a second node in the BIER network domain, wherein the retrieved IP address is assigned to the second node.

2. The method of claim 1, wherein retrieving the IP address from the entry in the bit indexed forwarding table comprises selecting the entry based, at least in part, on a bit value in the message bit array.

3. The method of claim 1, further comprising accessing a tree identifier stored in the intervening header of the multicast message, wherein the tree identifier is assigned to a tree comprising a set of paths connecting the BIER-enabled ingress node to each of the multiple possible destination nodes for the multicast message.

4. The method of claim 3, wherein retrieving the IP address from the entry in the bit indexed forwarding table comprises selecting the entry based, at least in part, on a value of the tree identifier.

5. The method of claim 4, wherein selecting the entry based, at least in part, on the value of the tree identifier comprises selecting a bit indexed forwarding table corresponding to the value of the tree identifier.

6. The method of claim 1, wherein sending the copy of the multicast message comprises sending the copy of the multicast message via a non-BIER-enabled neighbor node which is not configured to use a respective bit indexed forwarding table.

7. The method of claim 1, wherein accessing the BIER message bit array comprises accessing the message bit array from an intervening header comprising an IP-compatible service header.

8. The method of claim 1, wherein accessing the BIER message bit array comprises accessing the message bit array from an intervening header comprising an IP-compatible metadata header.

9. The method of claim 1, wherein retrieving the IP address comprises retrieving the IP address from an entry in the bit indexed forwarding table for which an intended destination node for the multicast message is also a reachable destination node from the second node.

10. The method of claim 1, wherein retrieving the IP address comprises retrieving an IP address assigned to an ingress interface of the second node.

11. A network device associated with a first node in a bit indexed explicit replication (BIER) network domain, the network device comprising:
    one or more network interfaces adapted for communication within the network;
    a plurality of storage locations adapted to store a bit indexed forwarding table for the first node; and
    a processor operably coupled to the one or more network interfaces and adapted to
        receive a multicast message comprising an inner internet protocol (IP) header, an intervening header, and an outer IP header, wherein
            the BIER network domain comprises a BIER-enabled ingress node and a BIER-enabled destination node,
            the intervening header carries information used in BIER forwarding,
            the inner IP header carries a source IP address and a destination IP address of an IP packet encapsulated by the intervening header,
            an IP source address field within the outer IP header carries an IP address of the BIER-enabled ingress node, and
            the first node is configured to use an IP destination address field within the outer IP header for forwarding of the multicast message to either a BIER-enabled node or a non-BIER-enabled node,
        access a BIER message bit array stored in the intervening header of the multicast message, wherein each destination node among multiple possible destination nodes for the multicast message is represented by a relative bit position in the message bit array,
        retrieve an IP address from an entry in the bit indexed forwarding table, wherein the entry corresponds to an intended destination node for the multicast message, replace an IP destination address in the IP destination address field within the outer IP header of a copy of the multicast message with the retrieved IP address, and send the copy of the multicast message toward a second node in the BIER network domain, wherein the retrieved IP address is assigned to the second node.

12. The network device of claim 11, wherein the processor is further adapted to retrieve the IP address by selecting the entry in the bit indexed forwarding table based, at least in part, on a bit value in the message bit array.

13. The network device of claim 11, wherein the processor is further adapted to access a tree identifier stored in the intervening header of the multicast message, wherein the tree identifier is assigned to a tree comprising a set of paths connecting the BIER-enabled ingress node to each of the multiple possible destination nodes for the multicast message.

14. The network device of claim 13, wherein the processor is further adapted to retrieve the IP address by selecting the entry in the bit indexed forwarding table based, at least in part, on a value of the tree identifier.

15. The network device of claim 14, wherein the processor is further adapted to select the entry in the bit indexed forwarding table based, at least in part, on a value of the tree identifier by selecting a bit indexed forwarding table corresponding to the value of the tree identifier.

16. The network device of claim 11, wherein the processor is further adapted to send the copy of the multicast message via a non-BIER-enabled neighbor node which is not configured to use a respective bit indexed forwarding table.

17. The network device of claim 11, wherein the processor is further adapted to access the BIER message bit array from an intervening header comprising an IP-compatible service header.

18. The network device of claim 11, wherein the processor is further adapted to access the BIER message bit array from an intervening header comprising an IP-compatible metadata header.

19. The network device of claim 11, wherein the processor is further adapted to select the entry.

20. The network device of claim 11, wherein the processor is further adapted to retrieve the IP address by retrieving an IP address assigned to an ingress interface of the second node.

* * * * *